US007259710B2

(12) United States Patent
Kisliakov

(10) Patent No.: US 7,259,710 B2
(45) Date of Patent: Aug. 21, 2007

(54) USER INPUT DEVICE

(75) Inventor: Andrew Kisliakov, Burwood (AU)

(73) Assignee: Canon Information Systems Research Australia Pty Ltd (AU)

( * ) Notice: Subject to any disclaimer, the term of this patent is extended or adjusted under 35 U.S.C. 154(b) by 771 days.

(21) Appl. No.: 10/635,491

(22) Filed: Aug. 7, 2003

(65) Prior Publication Data
US 2004/0075642 A1 Apr. 22, 2004

(30) Foreign Application Priority Data
Aug. 7, 2002 (AU) .............. 2002950791
Aug. 7, 2002 (AU) .............. 2002950793

(51) Int. Cl.
G08C 19/12 (2006.01)

(52) U.S. Cl. .............. 341/176; 340/825.69; 348/734; 711/115

(58) Field of Classification Search .............. 341/176; 340/825.69, 825.72; 348/734; 711/115
See application file for complete search history.

(56) References Cited

U.S. PATENT DOCUMENTS

| 4,623,887 A | 11/1986 | Welles, II .............. 340/825.57 |
| 4,626,848 A | 12/1986 | Ehlers .................... 340/825.69 |
| 4,825,200 A | 4/1989 | Evans et al. .................... 341/23 |
| 4,959,810 A | 9/1990 | Darbee et al. .............. 398/112 |
| 5,002,062 A | 3/1991 | Suzuki ........................ 128/696 |
| 5,228,077 A | 7/1993 | Darbee .................. 379/102.01 |
| 5,353,016 A | 10/1994 | Kurita et al. .......... 340/825.22 |
| 5,414,426 A | 5/1995 | O'Donnell et al. ......... 341/176 |
| 5,552,917 A | 9/1996 | Darbee et al. .............. 398/107 |
| 5,601,489 A | 2/1997 | Komaki ........................ 463/44 |
| 5,880,769 A | 3/1999 | Nemirofsky et al. ........ 725/139 |
| 5,907,350 A | 5/1999 | Nemirofsky ................. 725/23 |
| 5,949,492 A | 9/1999 | Mankovitz ................... 348/473 |
| 5,973,475 A | 10/1999 | Combaluzier ............... 320/107 |
| 6,014,593 A | 1/2000 | Grufman ..................... 700/136 |
| 6,223,348 B1 | 4/2001 | Hayes et al. ................. 725/152 |
| 6,229,694 B1 | 5/2001 | Kono ......................... 361/683 |
| 6,602,001 B1* | 8/2003 | Hatano et al. .............. 398/106 |
| 2001/0017616 A1 | 8/2001 | Kobayashi .................. 345/173 |
| 2001/0054647 A1* | 12/2001 | Keronen et al. ............ 235/492 |
| 2003/0209607 A1 | 11/2003 | Kisliakov .................... 235/492 |
| 2003/0212635 A1 | 11/2003 | Kisliakov .................... 705/41 |
| 2003/0212895 A1 | 11/2003 | Kisliakov .................... 713/185 |

FOREIGN PATENT DOCUMENTS

| AU | 28896/95 | 2/1996 |
| DE | 3637684 | 5/1987 |
| EP | 0 469 581 | 2/1992 |
| JP | 59-123986 | 7/1984 |
| JP | 04-88547 | 3/1992 |
| JP | U03-71329 | 6/2000 |
| WO | 95/35534 | 12/1995 |

* cited by examiner

Primary Examiner—Timothy Edwards, Jr.
(74) Attorney, Agent, or Firm—Fitzpatrick, Cella, Harper & Scinto

(57) ABSTRACT

A user input device (300) configured with a communication protocol for communicating transmission data with predetermined apparatus (700, 601) is disclosed. The device (300) comprises a receiving means for receiving protocol data and an associated format function. The protocol data and the format function in combination describe a further communication protocol for communicating with the predetermined apparatus (700, 601). The device (300) also comprises a central processing unit (805) for selecting the received protocol data and the format function and for configuring the device (300) to communicate with the predetermined apparatus (700, 601). The protocol data defines properties of the further communication protocol and the format function is adapted to configure at least a portion of the transmission data for communication with the apparatus (700, 601) according to the further communications protocol.

22 Claims, 57 Drawing Sheets

| User Interface Element | User Interface Element Object Fields ||||||
|---|---|---|---|---|---|---|
| | Flags | X1 | Y1 | X2 | Y2 | Data |
| △ | 0x20 | 0005 | 0005 | 0006 | 0006 | xxxx |
| ▽ | 0x20 | 0005 | 0007 | 0006 | 0008 | xxxx |
| ⊙ | 0x20 | 0003 | 0006 | 0004 | 0007 | xxxx |
| ⊡ | 0x20 | 0003 | 0008 | 0004 | 0009 | xxxx |
| ▷ | 0x20 | 0005 | 0008 | 0006 | 0009 | xxxx |
| ◁ | 0x20 | 0001 | 0008 | 0002 | 0009 | xxxx |
| ▷▷ | 0x20 | 0007 | 0008 | 0008 | 0009 | xxxx |
| □ | 0x20 | 0007 | 0006 | 0008 | 0007 | 0015 |

Fig. 15(b)

| User Interface Element | User Interface Element Object Fields ||||| |
|---|---|---|---|---|---|---|
| | Flags | X1 | Y1 | X2 | Y2 | Data |
| 1 | 0x20 | 0003 | 0001 | 0004 | 0002 | xxxx |
| 2 | 0x20 | 0005 | 0001 | 0006 | 0002 | 0x32 |
| 3 | 0x20 | 0007 | 0001 | 0008 | 0002 | xxxx |
| 4 | 0x20 | 0003 | 0003 | 0004 | 0004 | xxxx |
| 5 | 0x20 | 0005 | 0003 | 0006 | 0004 | xxxx |
| 6 | 0x20 | 0007 | 0003 | 0008 | 0004 | xxxx |
| 7 | 0x20 | 0003 | 0004 | 0004 | 0005 | xxxx |
| 8 | 0x20 | 0005 | 0004 | 0006 | 0005 | xxxx |
| 9 | 0x20 | 0007 | 0004 | 0008 | 0005 | xxxx |
| 0 | 0x20 | 0003 | 0006 | 0004 | 0007 | xxxx |
| OK | 0x20 | 0001 | 0008 | 0002 | 000A | xxxx |
| C | 0x20 | 0003 | 0008 | 0004 | 000A | xxxx |
| CL | 0x20 | 0005 | 0008 | 0006 | 000A | xxxx |
| ◀ | 0x20 | 0007 | 0008 | 0008 | 000A | xxxx |
| ▷ | 0x20 | 0007 | 0006 | 0008 | 0007 | xxxx |
| ◁ | 0x20 | 0005 | 0006 | 0006 | 0007 | xxxx |
| △ | 0x20 | 0006 | 0005 | 0007 | 0006 | xxxx |
| ▽ | 0x20 | 0006 | 0007 | 0007 | 0008 | xxxx |

USER INPUT DEVICE

TECHNICAL FIELD OF THE INVENTION

The present invention relates generally to the field of signal processing and, in particular, to a user input device.

BACKGROUND

Infrared (IR) remote control devices (or remote controls) are known, and can be used to control electronic appliances such as televisions, video recorders, stereo systems, set-top boxes, personal computers etc. For example, wireless keyboards and wireless mice can be used to operate a personal computer.

Infrared data transmission in such remote control devices is typically achieved by alternating an Infrared Light Emitting Diode (LED) between two states (i.e., an OFF state and an ON state). In the OFF state, the LED is kept powered down and in the ON state, the LED is rapidly powered on and off at a predetermined frequency. This predetermined frequency is known as the 'carrier frequency'.

Several methods can be used to encode data based on the above-mentioned ON and OFF states. One such method is referred to as 'pulse code modulation', where each bit of a data transmission is encoded by a fixed length duration in one of the two states. Typically, the OFF state represents a '1' bit, and the ON state represents a '0' bit. Another method of encoding data is referred to as 'pulse frequency modulation' where each symbol consists of an ON pulse followed by an OFF pulse. The length of the ON pulse is static while the length of the OFF pulse varies depending on the value of the symbol. Still another method of encoding data based on the above-mentioned two states is referred to as 'pulse position modulation' where each symbol is encoded by the position of an ON pulse within a longer, fixed length, OFF period. One variation of the pulse position modulation is referred to as 'four pulse position modulation, where the ON pulse can occur in one of four positions, thus encoding two bits per data symbol.

Most protocols for infrared transmission utilize a carrier frequency within the range of 32 to 56 kHz. Such protocols also vary in message format, according to the presence and size of data bits, device identifier bits, parity and check bits, sequence bits and start/stop conditions. Remote controlled appliances are typically designed to operate using one particular protocol, and are generally supplied with a remote control device designed to work specifically with that appliance. As a result, many households have several remote control devices to operate individual devices within the same room.

One known method for alleviating the need for different remote control devices for each particular appliance is to combine the functionality of all such remote control devices into one "universal" remote control device. The simplest type of universal remote control device is nothing more than a single remote control device capable of controlling more than one type of appliance. However, such a remote control device adds the demand that all appliances controlled by the remote control device must use the protocol used by the remote control device. In many cases, various appliances are purchased from different manufacturers and vendors. Thus, a particular universal remote control device will generally be unable to control all such appliances.

A reconfigurable remote control device is an advanced version of a universal remote control device, where the functionality of at least some input keys of the remote control device can be reconfigured after the remote control device has been purchased. One such reconfigurable remote control device transmits data using only one protocol. However, the input keys of the remote control device can be reconfigured with different codes as required. Other reconfigurable remote control devices can be configured to transmit data using one of several known protocols.

Most conventional universal remote control devices utilize a keyboard method of input data entry. Some additionally use liquid crystal displays (LCD) in order to provide feedback to the user, such as indicating the current function of certain keys.

Some universal remote control devices provide a touch-sensitive LCD to replace at least some portion of a keyboard configured on the remote control device. However, most retain at least several "hard" keys. The LCD provides the opportunity for a user or manufacturer to customize not only the functions provided by the remote control device, but also the method of interfacing used by the remotely controlled appliance or device itself.

While some reconfigurable remote control devices can only be reconfigured using a limited range of protocols and codes known by each particular remote control device, there are several known methods that can be employed to load additional protocols onto such remote control devices. One such method is commonly referred to as 'learning'. One universal remote control device, which utilizes the learning method, is equipped with a receiver, configured to detect transmissions by other remote control devices. In order to program a code onto this universal remote control device, the user must select "learning mode" on the remote control device (i.e., the learning remote control device), and then use another remote control device which already knows the particular code to transmit the required code to the learning remote control device. The learning universal remote control device then stores a representation of the received code in an on-board memory device, ready to be played back at a later stage.

The main disadvantage of the above 'learning' method is that programming the remote control device using the method is tedious and time consuming since a lot of keys need to be pressed. Additionally, a user must also have another pre-configured remote control device available in order to provide all of the codes to program onto the learning remote control device. If a new universal remote control device is purchased at a later date, the learning process has to be repeated again. Further, if the codes to be learned contain data that varies from message to message, such as sequence bits or numbers, then a remote control device using the learning method is not always able to recognise such sequence bits. Thus, these bits are not able to be reproduced in the correct manner, by the remote control device, when re-transmitting the codes.

Another known method of reconfiguring a remote control device provides the remote control device with the ability to read data from a removable storage medium, such as a control card or smart card. The card has sets of code data and programming stored thereon. The code data is configured to allow the remote control device to operate various appliances (e.g. a television, VCR, cable box, Internet access device or other electronic device). The remote control device is provided or sold to a user essentially "empty" of such code data. The card allows a one-time transfer of a single device code (i.e., code data needed to remotely operate a particular electronic device) from the card into on-board, non-volatile memory of the remote control device. However, such a remote control device is limited as to the number of device codes that can be stored in the non-volatile memory. Further, these stored device codes cannot be easily changed or replaced once the device codes have been loaded into the non-volatile memory. Still further, the user interface of such a remote control device is fixed and cannot be readily changed according to the circumstances of use. In the reconfiguring methods described above, several disadvantages are evident. Firstly, a lot of data is required to program a universal remote control device with a particular range of functions that is required to operate a number of appliances remotely. Such data is required since each button of a universal remote control device typically describes an entire transmission sequence for the particular button at a low level, leading to a lot of data repetition and redundancy. The data repetition and redundancy raises the cost of manufacturing and purchasing such a remote control device since faster processors, more memory and more powerful batteries must be used to power such remote control devices. Secondly, the user interface of a keypad based universal remote control device is fixed, and cannot be readily changed according to the circumstances of use. Thirdly, software code stored on universal remote control devices cannot be easily changed.

Some reconfigurable remote control devices are pre-configured to have existing functions or protocols activated infrequently. For example, a function may be activated on such a remote control device upon purchase of the remote control device. One such remote control device utilizes a bar code displayed on an appliance in a location that is accessible to the remote control device. The remote control device is equipped with a bar code reader and upon reading a bar code from the appliance corresponding to a known configuration, the remote control device is reconfigured to enable remote operation of that appliance. The bar code label contains a data pattern, which identifies the type of appliance and the remote control encoding format to which the appliance responds. If the remote control unit detects a recognizable bar code pattern during the period that the bar code reader is enabled, then the remote control unit proceeds to analyze the identification data. If the appliance type and infrared format are supported by the remote control device, then the remote control reconfigures its programming to match the new appliance. If the device or equipment is not supported by the remote control device, then the remote control device simply remains unchanged in its previous configuration.

Another known remote control device uses a method where prior to receiving a first remote "power on" command, a remotely controlled appliance periodically emits an infra-red "squawk" signal, which encodes information used to identify the appliance. When a "power on" button is pressed on the associated remote control device, the remote control device briefly listens for such a squawk signal before sending the currently configured power on code. If such a squawk signal is detected, the remote control device reconfigures itself to enable operation of the appliance and then sends the correct power on signal to the appliance, prompting the appliance to stop sending further "squawk" signals.

However, the appliance barcode remote control device and the 'squawk' signal remote control device both require that an associated remote control device have prior knowledge of all appliances that can be supported by the remote control device. Any reprogramming of the associated remote control device needs to be performed using one of the methods described above. Additionally, such remote control devices may not be able to be used with existing appliances that are not suitable configured.

Another known method for activating a remote control device to operate with a particular protocol works by configuring the remote control device in order to enter a mode where a single command is transmitted using all known protocols, one at a time. When the user of such a remote control device detects the correct response by the controlled appliance, the remote control device is instructed by a further user selection to stop probing and to send all subsequent commands using the protocol, which instigated the correct response. Such a remote control device is simple to implement, but requires the user to go through an unintuitive protocol selection process, which can also interfere with other appliances.

Still another known remote control device comprises a transparent touch sensitive surface. A control card with a printed user interface on its upper surface can be placed underneath the transparent touch sensitive surface. The remote control device switches to a different operating mode based on a physical property (e.g., a notch) of the card. While providing added versatility, this remote control device is limited to a fixed set of cards. Further, the remote control device is limited to a fixed set of protocols, which are pre-installed on the remote control device. Still further, this remote control device is limited to a predetermined fixed set of functions.

Some appliances or devices are configured to accept data from multiple remote control devices simultaneously. For example, in a multi-player game, each player can hold a remote control device, sending the same set of inputs to a single receiving appliance. The remote control devices generally distinguish themselves from each other by means of a user identifier, which is included as part of each message that is transmitted from the remote control device to the receiving device. User identifiers on such remote control devices are typically changed by means of a switch located somewhere on the surface of the remote control device. The switch is capable of being set to one of two or more settings.

An infrared remote control device must store enough characteristics of an infrared protocol to be able to faithfully reproduce the protocol at some later time. The required information may be stored on an individual button-by-button basis, or as part of a global structure referenced by individual buttons. In the case of a global protocol structure, each button has some associated information to be used in conjunction with the global information in order to produce a unique code. One known method of representing protocol information utilizes a series of instructions, either executed directly or interpreted by a program being executed on a microprocessor. Another known method of representing protocol information counts the number of pulses during each ON period, and records the number of pulses together with the duration of each OFF period. These periods are then grouped into categories having similar sizes, and stored as a sequence of category identifiers.

In each of the infrared remote control devices described above, the amount of data required to be stored on the remote control device for every possible protocol can be large. Some remote control devices are configured to compress the data, for example, by forming categories during a learning process. However, inaccuracies can result during this process which can prevent a protocol from being faithfully reproduced later.

One known remote control device maintains a range of protocols, which are represented by means of a set of properties. Some properties, specifically bit patterns and data formats, are expressed as pointers to one of a finite set of data structures that define these values. While such a remote control device generally provides a compressed format for storing the protocol data, a finite number of bit pattern types and data formats are supported. Thus, a new protocol depends on a compatible format being found.

Control cards, which can be used with remote control devices, as discussed above, often include some form of readable storage means such as a magnetic strip, an optical code (e.g. a bar code) or an on-board memory chip, for storing data (e.g. a personal identification number) associated with the card. Such control cards can be generically referred to as memory cards. However, control cards including a storage means in the form of an on-board memory chip are generally referred to as 'smart cards'. The data stored in the storage means is generally read by some form of terminal device, which includes a set of electrical contacts, for example.

Some smart cards include a microprocessor integrally formed within the smart card. These smart cards are generally referred to as microprocessor or central processing unit (CPU) cards.

There are several existing smart card systems, which utilize CPU smart cards including a user interface. One of these existing smart card systems utilizes a reader device including a transparent touch panel positioned above the CPU card so that user interface elements printed on a surface of the smart card are visible underneath the transparent touch screen. The reader device is configured to determine the position of a touch on the transparent panel and use data structure information stored within a memory of the card to determine which user interface elements have been pressed. The reader device then sends a data string associated with the selected user interface elements to a remote application.

In one such existing smart card system, the reader device contains an infrared transmitter, which is used to transmit information received from the card to a set-top box connected to a service provider. Due to the large variety of infrared set-top boxes available, which do not necessarily use the same data transmission protocol, each card reader device must be pre-configured to match a certain set-top box. Once such a reader has been configured for one particular set top box, the software code (i.e.,firmware) resident on the reader cannot be easily changed.

In addition, in order to fully utilize the functionality of a particular smart card, software applications must be created or modified in order to recognize the format of messages sent by a reader device associated with the particular card. The message format is typically implemented above the infra-red protocol layer. None of the existing smart card systems include a mechanism which is able to emulate conventional input devices such as a keyboard or mice, and which would enable a smart card used with such a system to work with existing applications without significant modification to the application.

The reader device of the existing smart card system discussed above, while containing an infrared transmitter, is unable to control the multitude of other appliances that use infrared remote control devices. Thus, the smart card reader device is merely another remote control device to be added to the pile of conventional remote control devices which now exists in most households. This is despite the growing trend towards universal remote control devices as described above.

Finally, the reader device described above, while having the potential to operate in a variety of different modes, with different settings, does not provide a mechanism for operating modes and settings to be reconfigured as necessary by a user of the existing smart card system.

Accordingly, the reader device discussed above is generally limited in application to a predetermined number of pre-installed data transmission protocols. These data transmission protocols cannot be easily changed and additional protocols cannot be easily added. Further, the functionality of the reader device discussed above cannot be easily changed. Thus, a need clearly exists for a reader device, which is capable of transmitting data using one of several protocols, where the protocols can be easily changed and additional protocols can be easily added. Further, a need clearly exists for a reader device, the functionality of which can be easily changed in order to allow the control of many different electronic appliances.

SUMMARY OF THE INVENTION

It is an object of the present invention to substantially overcome, or at least ameliorate, one or more disadvantages of existing arrangements.

According to one aspect of the present invention there is provided a remote control device configured with a first communication protocol for communicating transmission data with at least one of a plurality of predetermined apparatus, said remote control device comprising:

a receiving means for receiving protocol data and an associated format function, said protocol data and said format function in combination describing a second communication protocol for communicating with one or more of said plurality of predetermined apparatus; and a central processing unit for selecting said received protocol data and said format function and for configuring the remote control device to communicate with said one or more of said plurality of predetermined apparatus, wherein said protocol data defines properties of said second communication protocol and said format function is adapted to configure at least a portion of said transmission data for communication with said at least one apparatus according to said second communications protocol.

According to another aspect of the present invention there is provided a device for communicating transmission data with at least one of a plurality of predetermined apparatus, said device comprising:

a memory having one or more portions of protocol data stored therein, each said portion having an associated format function, said protocol data and said format function of each portion, in combination, at least describing a communications protocol for communicating with one or more of said plurality of predetermined apparatus; and a central processing unit for selecting at least one of said portions of protocol data, and said associated format function, describing at least one of said protocols and for configuring the remote control device to communicate with said one or more of said plurality of predetermined apparatus, wherein said protocol data of said selected portion defines properties of said at least one protocol and said format function of said selected portion is adapted to configure at least a portion of said transmission data for communication to said at least one apparatus according to said at least one protocol.

According to still another aspect of the present invention there is provided a read device for reading an interface card, said card having indicia formed thereon and being configured for insertion into said read device, said read device comprising:

a memory having one or more portions of protocol data stored therein, each said portion having an associated format function, said protocol data and said format function of each portion, in combination, at least describing a communications protocols for communicating with one or more of a plurality of predetermined apparatus; and a central processing unit for selecting at least one of said portions of said protocol data, and said format function, describing at least one of said protocols in order to configure the remote control device to communicate with said one or more of said plurality of apparatus, and for communicating a message to said at least one of said apparatus, according to said at least one protocol, upon receiving specific data related to a selection of at least one of said indicia.

According to still another aspect of the present invention there is provided a method of configuring a remote control device device, said remote control device being configured with a first communications protocol for communicating with at least one of a plurality of predetermined apparatus, said method comprising the steps of:

selecting protocol data and an associated format function stored in a memory operatively associated with said remote control device, said protocol data and said format function in combination describing a second communication protocol for communicating transmission data to at least one other of said plurality of predetermined apparatus; and configuring said read device to communicate with said at least one other apparatus according to said second communications protocol, said protocol data defining properties of said second communication protocol and said format function being adapted to configure at least a portion of said transmission data for communication with said at least one other apparatus according to said second communications protocol.

According to still another aspect of the present invention there is provided a method of configuring a read device for communicating transmission data with at least one of a plurality of external devices, said read device being adapted to accept an interface card, said card having indicia formed thereon and a memory configured adjacent said indicia, said memory having one or more portions of protocol data stored therein, each said portion having an associated format function, said protocol data and said format function of each portion, in combination, describing at least one of a plurality of communications protocol for communicating with at least one of said plurality of predetermined external devices, said method comprising the steps of:

determining specific data related to a selection of at least one of said indicia;

selecting protocol data and an associated format function representing a particular one of said plurality of communications protocols depending on said specific data; and configuring said read device to communicate with at least one other of said external devices according to said selected portion, wherein said protocol data of said selected portion defines properties of said particular protocol and said format function of said selected portion is adapted to configure at least a portion of said transmission data for communication to said one or more of said external devices according to said particular protocol.

According to still another aspect of the present invention there is provided a method of configuring a remote control device configured with a first communications protocol for communicating transmission data with at least one of a plurality of predetermined apparatus, said read device being adapted to accept an interface card, said card having indicia formed thereon and a memory configured adjacent said indicia, said memory having protocol data and a format function stored therein at least defining a second communications protocol for communicating said transmission data with one or more of said apparatus, said method comprising the steps of:

providing said card to a user for insertion into said read device, wherein a processor of said read device is configured to perform the following steps:

determine specific data related to a selection of at least one of said indicia;

select said protocol data and said format function depending on said specific data; and configure said read device to communicate with said one or more of said apparatus according to said second communications protocol, wherein said protocol data defines properties of said second communications protocol and said format function of said portion is adapted to configure at least a portion of said transmission data for communication with said at least one apparatus according to said second communications protocol.

According to still another aspect of the present invention there is provided a card reader for reading an electronic card receivable therein, said card reader being adapted for communicating with data controlled equipment, said card having indicia formed thereon and a memory having data stored therein, said data at least describing configuration properties of said card reader, said card reader comprising:

a central processing unit for selecting a portion of said data stored in said memory of said card upon receiving specific data related to a selection of at least one of said indicia following said card being inserted into said card reader, and for reconfiguring said card reader according to said selected portion of said data.

According to still another aspect of the present invention there is provided a card reader for reading an electronic card receivable therein, said card having indicia formed thereon and a memory having data and one or more format functions stored therein, said data and said format functions at least describing a plurality of communications protocols for communicating with predetermined data controlled equipment, said card reader comprising:

a central processing unit for selecting a portion of said data and an associated one of said format functions stored in said memory of said card upon receiving specific data related to a selection of at least one of said indicia following said card insertion, and for reconfiguring said card reader for communication with data controlled equipment according to said selected portion of said data.

According to still another aspect of the present invention there is provided a card reader for reading an electronic card received therein, said card reader being adapted for communicating with data controlled equipment, said card having indicia formed thereon and an electronic memory having data stored therein, said data at least describing configuration properties of said card reader, said card reader comprising:

a touch sensitive substantially transparent membrane having an upper surface configured to be depressible in order to enable selection of one or more of said indicia; and a central processing unit for reading at least a portion of said data from said memory according to said indicia selection, and for processing at least a portion of said data stored in said memory to reconfigure said card reader according to said selected portion of said data.

According to still another aspect of the present invention there is provided a method of configuring a card reader, said card reader being configured for reading an electronic card and for communicating with data controlled equipment, said electronic card having indicia formed thereon and an electronic memory having data stored therein, said data at least describing configuration properties of said card reader, said method comprising the steps of:

selecting at least a portion of said data stored on said card upon receiving specific data related to a selection of at least one of said indicia following said insertion; and reconfiguring said card reader according to said selected portion of said data.

BRIEF DESCRIPTION OF THE DRAWINGS

One or more embodiments of the present invention will now be described with reference to the drawings, in which:

FIG. 15(b) shows user interface element objects associated with the smart card of FIG. 15(a);

DETAILED DESCRIPTION INCLUDING BEST MODE

Figure 1A:
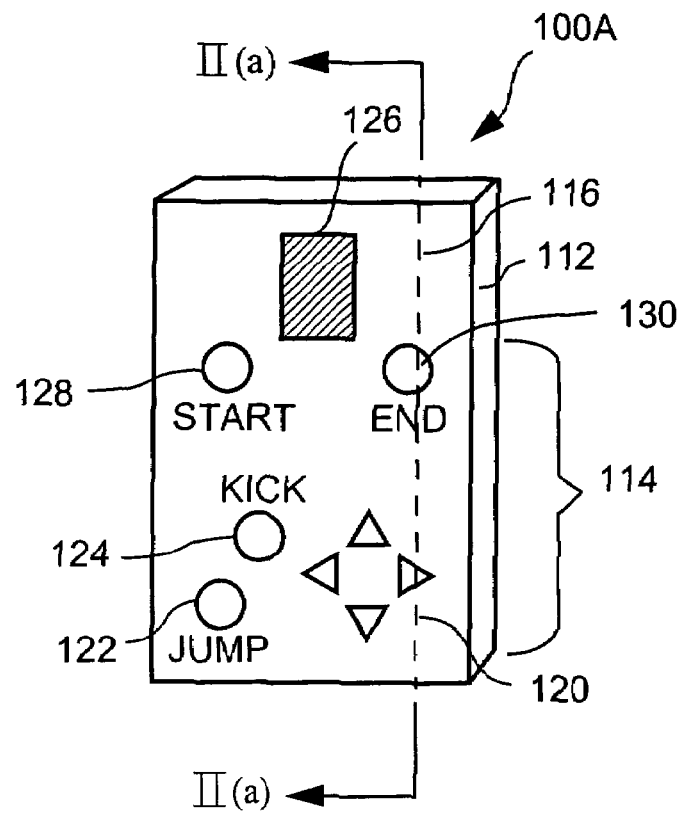
FIG. 1(a) is a perspective view of a smart card configured for use with a computer game.

Where reference is made in any one or more of the accompanying drawings to sub-steps and/or features, which have the same reference numerals, those sub-steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Excepting where explicitly distinguished, in the following description, the term "data string" means 'a sequence of bits (i.e. '1' or '0')' and can include American Standard Code for Information Interchange (ASCII) data, floating point data, and binary representations of integer values, for example.

The arrangements disclosed herein have been developed primarily for use with remote control appliances, automatic tellers and network access systems, and will be described hereinafter with reference to these and other applications. The arrangements described herein can be used for accessing services such as home shopping, home-banking, video-on-demand, interactive applications such as games and interactive trading cards, and information access such as city guides, television program guides and educational material. The arrangements disclosed herein can also be used for controlling appliances remotely. However, it will be appreciated that the invention is not limited to any of the above mentioned fields of use.

For ease of explanation the following description has been divided into Sections 1.0 to 8.7, each section having associated subsections.

1.0 Smart Card Interface System Overview

1.1 Smart Cards

FIG. 1(a) shows a smart card 100A including a planar substrate 112 with various user interface elements 114 (i.e. predetermined areas, or iconic representations) printed or otherwise formed on an upper face 116 thereof, for example using an adhesive label. For the smart card 100A, the user interface elements 114 are in the form of a four way directional controller 120, a "jump button" 122, a "kick button" 124, a "start button" 128 and an "end button" 130 printed on a front face 116 thereof. Other forms of user interface elements, such as promotional or instructional material, can be printed alongside the user interface elements 114. For example, advertising material 126 can be printed on the front face 116 of the smart card 100A or on a reverse face (not shown) of the smart card 100A. In still other forms of the smart card 100A, the memory chip 219 can be replaced by a storage means such as a magnetic strip (not shown) formed on one surface of the smart card 100A.

Figure 2A:
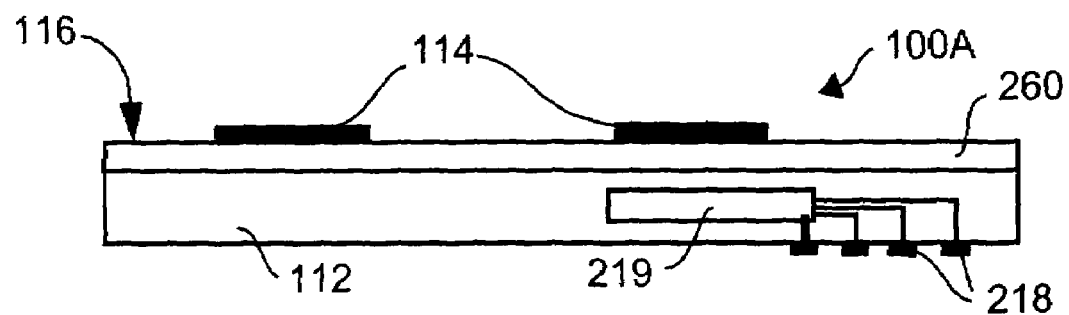
FIG. 2(a) is a longitudinal cross-sectional view taken along the line II(a)-II(a) of the card shown in FIG. 1(a)

As seen in FIG. 2(a), the front face 116 of the smart card 100A may be formed by an adhesive label 260 upon which is printed the user interface in the form of the user interface elements 114, in this case corresponding to the "End Button" and the Right arrow "button" of the directional controller 120. The label 260 is affixed to the planar substrate 112. A home user can print a suitable label for use with a particular smart card 100A by using a printer. Alternatively, the user interface elements 114 can be printed directly onto the planar substrate 112 or separate adhesive labels can be used for each of the user interface elements 114.

As also seen in FIG. 2(a), the smart card 100A includes storage means in the form of an on-board memory chip 219 for storing data associated with the user interface elements 114. The smart card 100A having a memory chip 219 as described above is generally referred to as a "memory card". Thus, the smart card 100A will hereinafter be referred to as the memory card 100A. The memory card 100A also includes electrical data contacts 218 connected to the memory chip 219 and via which reading of the memory chip 219 and writing to the memory chip 219 may be performed.

Alternatively, in other forms of the memory card 100A, the memory chip 219 can be replaced by storage means in the form of machine-readable indicia such as an optical code (e.g. a barcode) printed on a reverse face (not shown) of the memory card 100A.

Memory cards such as the memory card 100A can be utilized in applications where strong security of the memory card 100A and data stored in the chip 219 of the memory card 100A, is not required. The memory card 100A can also be used in applications where it is desired to maintain the cost of manufacturing the memory card 100A to a minimum. Such smart cards can be used for example, where the memory card 100A is given away to promote a service and/or to provide access to the service. The memory card 100A can also be used as a membership card, which provides access to a specific service.

Figure 1B:
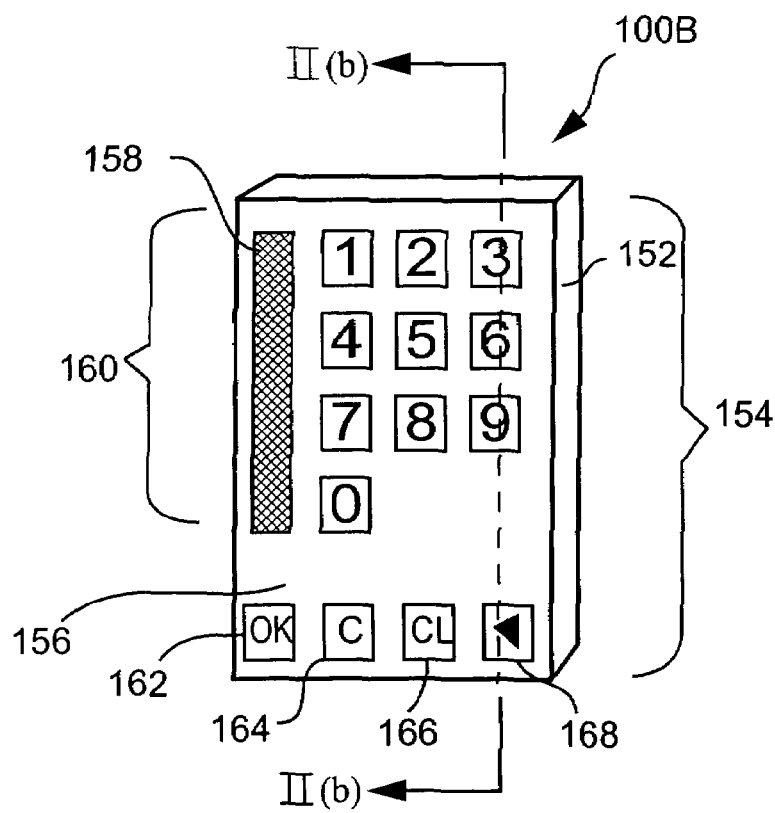
FIG. 1(b) is a perspective view of another smart card configured for use in numerical data entry.

FIG. 1(b) shows another smart card 100B again including a planar substrate 152 with various user interface elements 154 printed on a front face 156 thereof. In the smart card 100B the user interface elements 154 are in the form of a numerical keypad 160, an "OK button" 162, a "cancel button" 164, a "clear button" 166 and a "backspace button" 168 printed on the front face 156 thereof. Again, other forms of user interface elements, such as promotional or instructional material, can be printed alongside the user interface elements 154 such as advertising material 158.

Figure 2B:
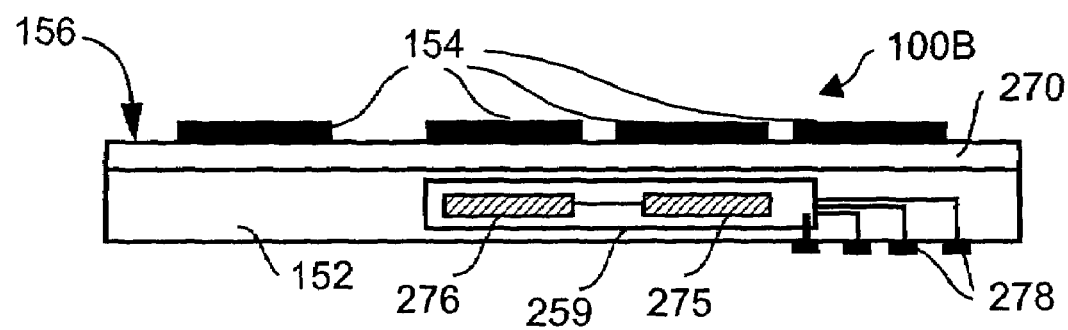
FIG. 2(b) is a longitudinal cross-sectional view taken along the line II(b)-II(b)

As seen in FIG. 2(b), the front face 156 of the smart card 100B is formed by an adhesive label 270 affixed to the planar substrate 152 in a similar manner to the memory card 100A. Again, a user interface in the form of user interface elements 154, in this case corresponding to the "number 3", "number 6" and "number 9" buttons of the numerical keypad 160 and the "backspace button" 168, is printed on the adhesive label 270.

As also seen in FIG. 2(b), the smart card 100B includes a microprocessor 259 having an integrally formed central processing unit (CPU) 275 and storage means 276. The storage means 276 generally includes volatile random access memory (RAM) (not shown) and non-volatile flash (ROM) memory (not shown), and can be used to store data associated with the user interface elements 154, application software code associated with the smart card 100B and/or information (e.g. a personal identification number) associated with the user and/or manufacturer of the smart card 100B. The smart card 100B will hereinafter be referred to as the CPU card 100B. The CPU card 100B also includes electrical data contacts 278 connected to the microprocessor 259 and which perform a similar role to the contacts 218 of FIG. 2(a). In particular, the electrical data contacts 278 can be used to send instructions to the microprocessor 259 and to receive data resulting from the execution of those instructions on the microprocessor 259.

CPU cards such as the CPU card 100B can be utilized in applications where enhanced user authentication and/or higher levels of security of the CPU card 100B and data stored in the storage means 276, is required.

It will be appreciated by a person skilled in the relevant art, that the user interfaces in the form of the user interface elements 114 and 154 can be interchanged for the smart cards 100A and 100B. Further, the user interfaces able to be printed by a user and/or manufacturer for the smart cards 100A and 100B can take many forms. Memory cards such as the memory card 100A and CPU cards such as the CPU card 100B, having a user interface formed on one surface of the card can be referred to as 'User Interface Cards. However, excepting where explicitly distinguished, in the following description, the memory card 100A and the CPU card 100B will be generically referred to as the smart card 100.

1.2 Smart Card Reader

Figure 3:
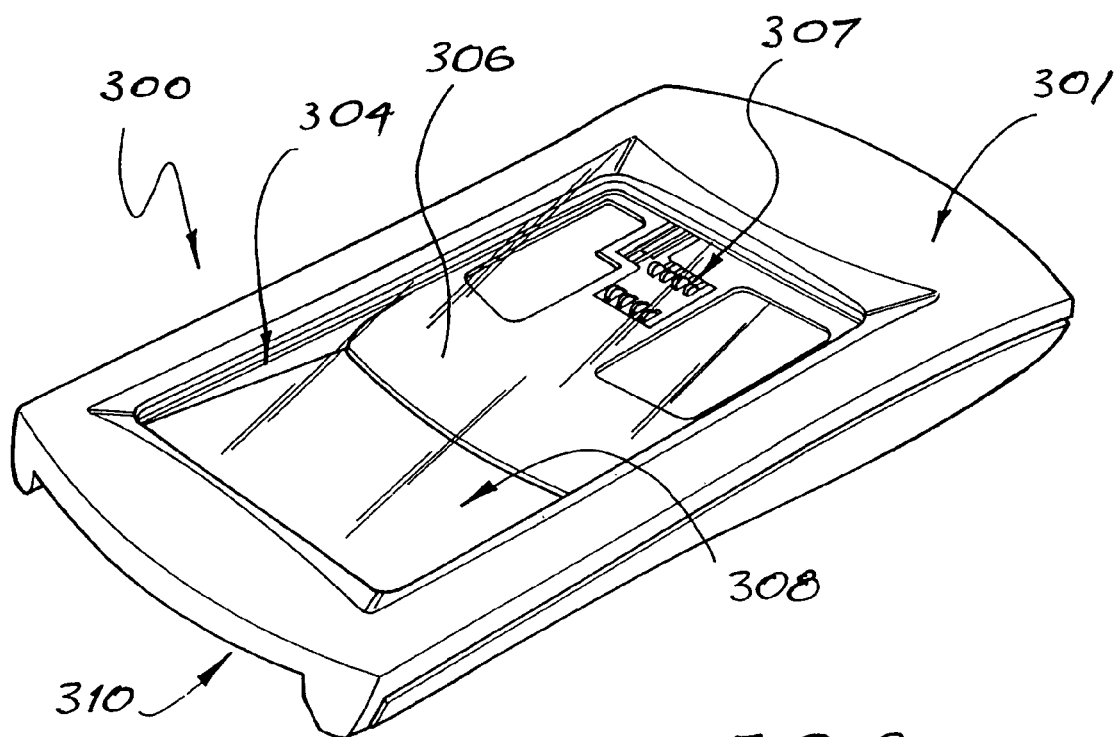
FIG. 3 is a perspective view of a reader device configured for use with the smart cards of FIGS. 1(a) and 1(b) of the card shown in FIG. 1(b)

FIG. 3 shows a smart card reader 300 configured for use with both the memory card 100A and the CPU card 100B. The configuration of the electrical data contacts 218 and 278 of the memory card 100A and the CPU card 100B, respectively, correspond to exposed contacts 307 of the smart card reader 300, as shown in FIG. 3. The reader 300 is formed of a housing 301 incorporating a receptacle 304 into which the smart card 100 may be inserted, a viewing area 306 and an access opening 310 configured to accept a smart card 100. An upper boundary of the viewing area 306 is defined by sensor means in the form of a substantially transparent pressure sensitive membrane 308 or simply "touch panel" spaced above the exposed contacts 307 so as to form the receptacle 304. It will be appreciated by a person skilled in the relevant art that alternative technology can be used as the touch panel 308. For example, the touch panel 308 can be resistive or temperature sensitive.

Figure 4:
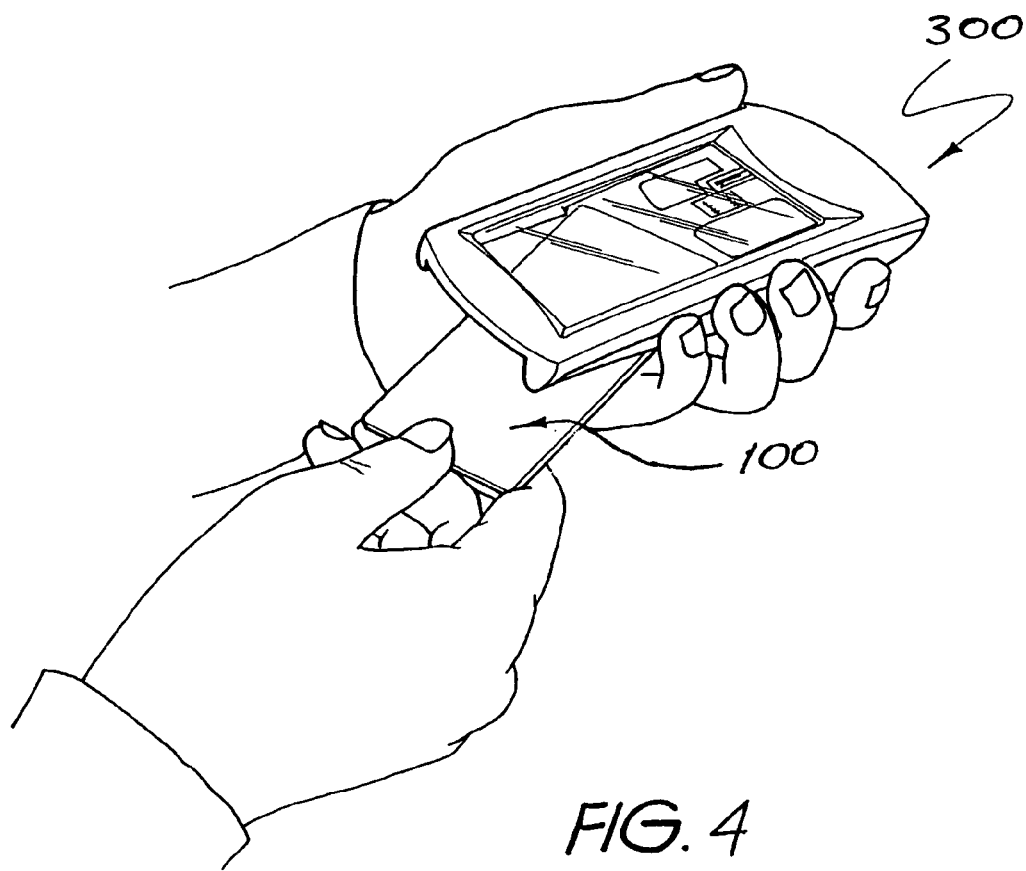
FIG. 4 shows a user inserting a smart card into the reader of FIG. 3.

In use, a smart card 100 is inserted by a user into the smart card receptacle 304, through the access opening 310, as shown in FIG. 4. When the smart card 100 is fully inserted into the reader 300, the touch panel 308 fully covers the upper face 116, 156 of the smart card 100. The viewing area 306 preferably has substantially the same dimensions as the upper face 116, 156 of the smart card 100 such that the upper face 116,156 is, for all intents and purposes, fully visible within the viewing area 306 through the touch panel 308. In this position, the data contacts 218,278 of the card 100 engage the exposed contacts 307 so that circuitry (not shown) within the reader 300 can communicate with the memory chip 219 or microprocessor 259 of the card 100.

Figure 5:
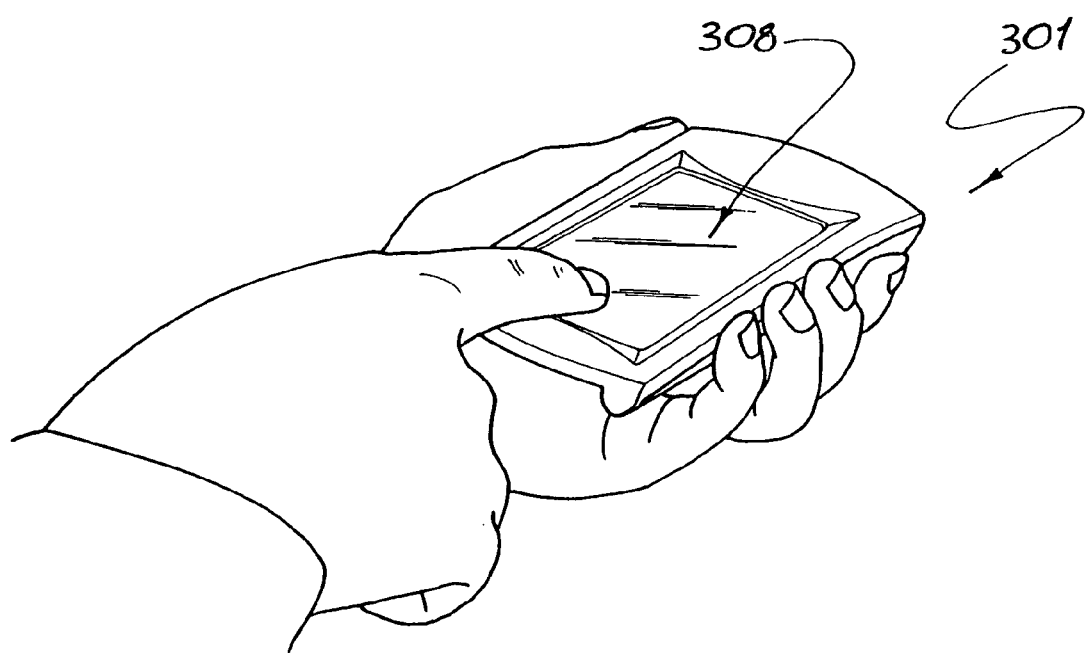
FIG. 5 shows a user operating the reader of FIG. 3 after the smart card has been fully inserted.

When the card 100 is fully inserted into the reader 300, a user can press areas of the touch panel 308, as shown in FIG. 5, overlying the user interface elements 114, 154. For the memory card 100A, the reader 300 deduces which of the user interface elements 114 the user has selected by sensing the pressure on the touch panel 308 and referring to the data stored in the memory chip 219. For example, if the user places pressure on the touch panel 308 adjacent the "kick button" 124, the reader 300 is configured to assess the position at which the pressure was applied, refer to the stored data, and determine that the "kick button" 124 was selected.

In contrast, for the CPU card 100B, the CPU 275 determines which of the user interface elements 154 the user has selected by processing coordinates received from the reader 300 upon the reader 300 sensing pressure on the touch panel 308, and then the CPU 275 referring to the data stored in the storage means 276 of the microprocessor 259. In this case, it is not necessary for the reader 300 to be able to read and to be made aware of the data stored in the storage means 276 of the microprocessor 259. The operation of the CPU card 100B in relation to the reader 300 will be explained in more detail in Sections 2.0 to 8.6 below.

Information resulting from a user selecting one of the user interface elements 114,154 can be used to control an external device, for example, an associated automatic teller machine (of conventional construction and not shown). It will be appreciated from above that the user interface elements 114, 154 are not, in fact buttons. Rather, the user interface elements 114 are user selectable features which, by virtue of their corresponding association with the data stored in the memory chip 219 or storage means 276, and the function of the touch panel 308, operate to emulate buttons traditionally associated with remote control devices.

The reader 300 includes an infrared (IR) transmitter (not shown in FIG. 3), for transmitting information in relation to user interface elements 114, 154 selected by the user. Thus, the reader 300 is generally referred to as an 'infra-red' reader. Alternatively, the reader 300 can any include any other form of transmitter such as a radio frequency (RF) transmitter. Upon selection of one of the user interface elements 114,154, the reader 300 causes information related to the selection to be transmitted to a remote console (not shown in FIG. 5) where a corresponding infra-red or radio frequency remote module can detect and decode the information for use in controlling some function, such as a banking application executing on the automatic teller machine discussed above.

Any suitable transmission method can be used to communicate information from the reader 300 to a remote module, including direct hard wiring. Moreover, the remote module itself can incorporate a transmitter, and the reader 300 a receiver for communication in an opposite direction to that already described. The communication from the remote module to the reader 300 can include, for example, handshaking data, setup information, or any other form of information desired to be transferred from the remote module to the reader 300.

Figure 10:
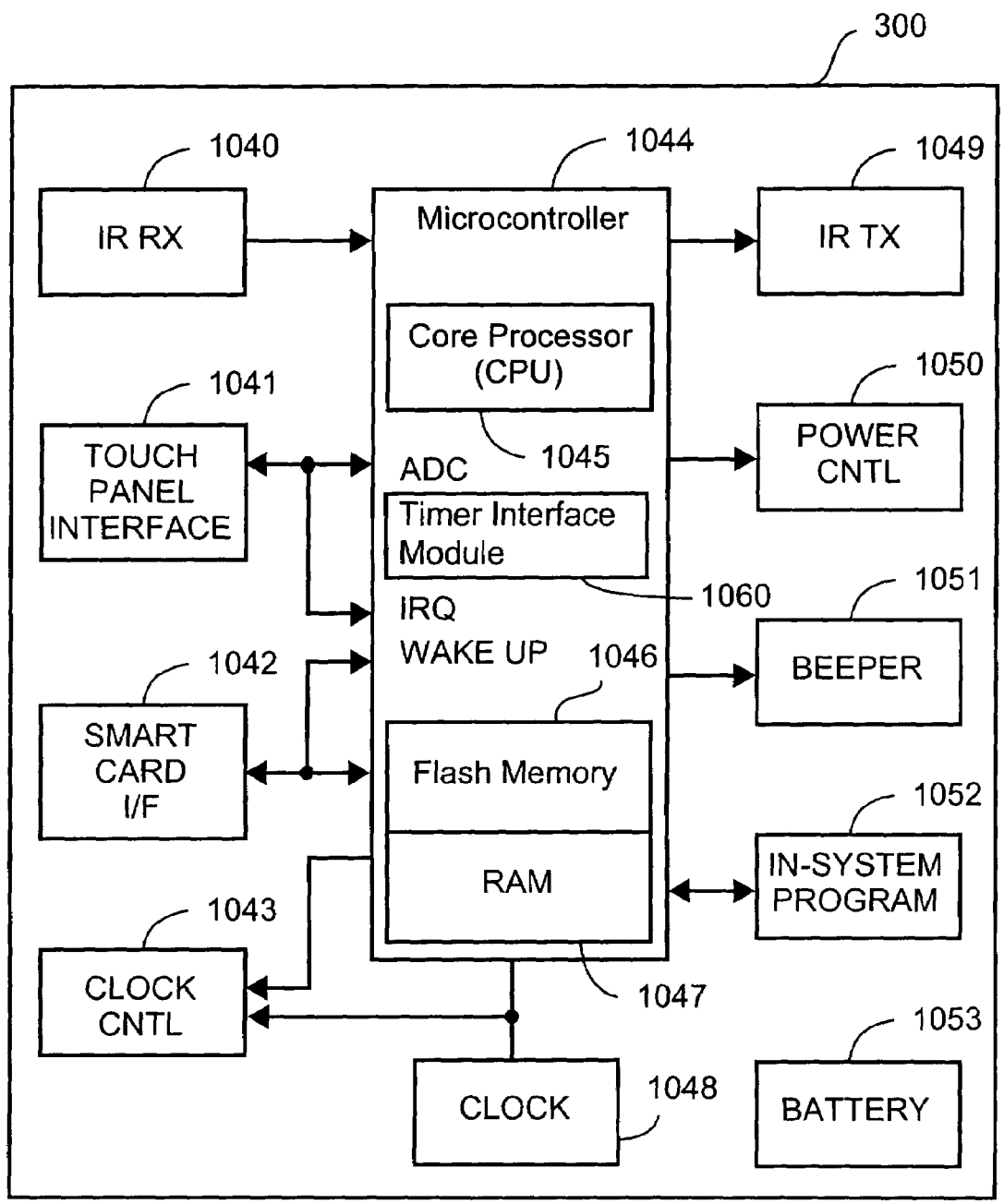
FIG. 10 is a schematic block diagram showing the internal configuration of the reader of FIG. 3.

FIG. 10 is a schematic block diagram showing the internal configuration of the reader 300 in more detail. The reader 300 includes a microcontroller 1044 for controlling the reader 300, for coordinating communications between the reader 300 and a remote module, and for storing mapping information and firmware, for example. The microcontroller 1044 includes random access memory (RAM) 1047 and flash (ROM) memory 1046. The microcontroller 1044 also includes a core processor unit (CPU) 1045. The microcontroller 1044 is connected to a clock source 1048 and a clock controller 1043 for coordinating the timing of events within the microcontroller 1044. The CPU 1045 is supplied with electrical power from a battery 1053, the operation of the former being controlled by a power controller 1050. Alternatively, in one implementation, the CPU 1045 can be supplied with power via a universal serial bus cable (not shown) connected to a reader associated with the power coming from a personal computer or similar device. The microcontroller 1044 is also connected to a beeper 1051 for giving audible feedback about card entry status.

Infra-red (IR) communications, as discussed above, can be implemented using two circuits connected to the microcontroller 1044, an infra-red transmitter (TX) 1049 for infra-red transmission and an infra-red remote module (RX) 1040 for infra-red reception. The touch panel 308 of the reader 300 communicates with the microcontroller 1044 via a touch panel interface 1041 and the electrical contacts 307.

An in-system-programming interface 1052 can also be connected to the microcontroller 1044, to enable programming of the microcontroller 1044 with firmware by way of the microprocessor flash 1046.

The microcontroller 1044 of the reader 300 preferably includes an associated 'timer interface module (TIM)' 1060 contained within the microcontroller 1044. The timer interface module 1060 preferably contains a counter, which can be programmed to overflow when the value of the counter reaches a specified value. Additionally, the timer interface module 1060 can be configured to change the value on an infrared transmission pin (not shown) associated with the microcontroller 1044 when the counter reaches the overflow value and another value, specified between zero and the overflow value. Thus, the timer interface module 1060 can be configured to generate a square wave controlling an infrared light emitting diode (not shown) associated with the infrared transmitter 1049, operating at a specified frequency and duty cycle.

The clock source 1048 of the microcontroller 1044 can be configured as a crystal, for example, having an associated clock frequency (e.g., 4.92 MHz). The operating frequency of the clock source 1048 largely dictates the infrared data transmission rate of the reader 300. Higher clock frequencies (e.g., 7.37 MHz) can be used to support faster infrared data transmission rates, which can be required by certain infrared data transmission protocols.

1.3 Hardware Architecture

Figure 6A:
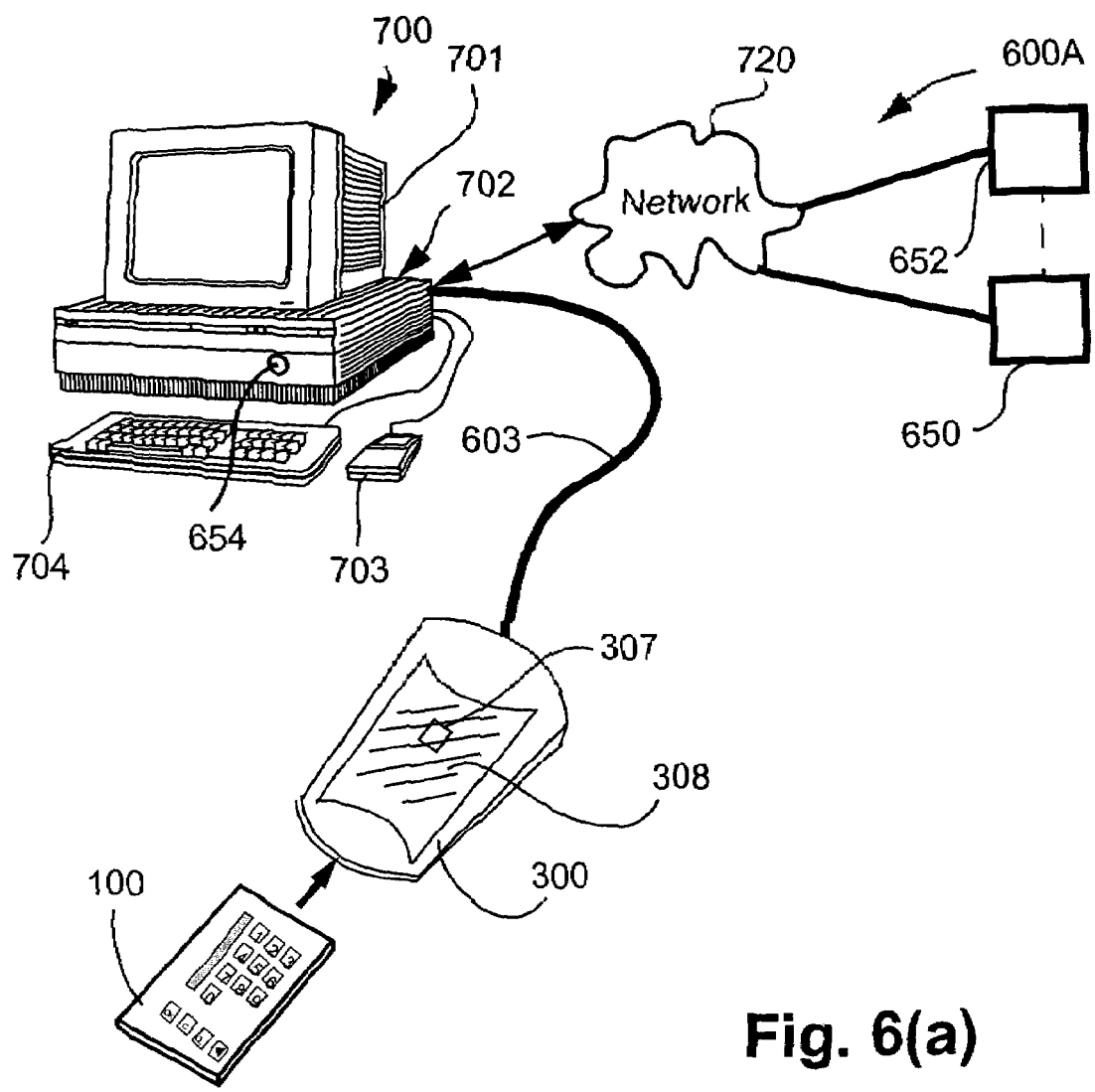
FIG. 6(a) shows a hardware architecture for a smart card interface system.

FIG. 6(a) shows a hardware architecture of a card interface system 600A. In the system 600A, the reader 300 is hard wired to a personal computer system 700 via a communications cable 603. Thus, for the configuration of system 600A, the reader 300 does not require the infra-red transmitter (TX) 1049 for infra-red transmission or the infra-red remote module (RX) 1040 for infra-red reception. Such a reader will be specifically referred to hereinafter as a 'hard wired' reader. Alternatively, instead of being hardwired, the reader 300 including the infrared transmitter (TX) 1049 and the infrared remote module (RX) 1040 can be used with the system 600A. In this case, an infrared transceiver 654 formed in the personal computer system 700 can be used to communicate with the reader 300. The personal computer system 700 includes a display device 701, a computer module 702, a keyboard 704 and mouse 703, and will be explained in more detail below with reference to FIG. 7.

The system 600A includes the smart card 100 which is programmable and can be created or customized by a third party, who may be a party other than the manufacturer of the smart card 100 and/or the card reader 300. The third party can be the ultimate user of the smart card 100 itself, or may be an intermediary between the manufacturer and user. In the system 600A of FIG. 6(a), the smart card 100 can be programmed and customized for one touch operation to communicate with the computer 700 and obtain a service over a computer network 720, such as the Internet, coupled to the computer 700. The computer 700 operates to interpret signals transmitted via the communications cable 603 from the reader 300, according to a specific protocol, which will be discussed below. The computer 700 performs the selected function according to touched user interface elements 114, 154 and can be configured to communicate data over the network 720. In this manner, the computer 700 can permit access to applications and/or data stored on remote server computers 650, 652 and appropriate reproduction on the display device 701, by way of user manipulation of the reader 300 and card 100.

Figure 6B:
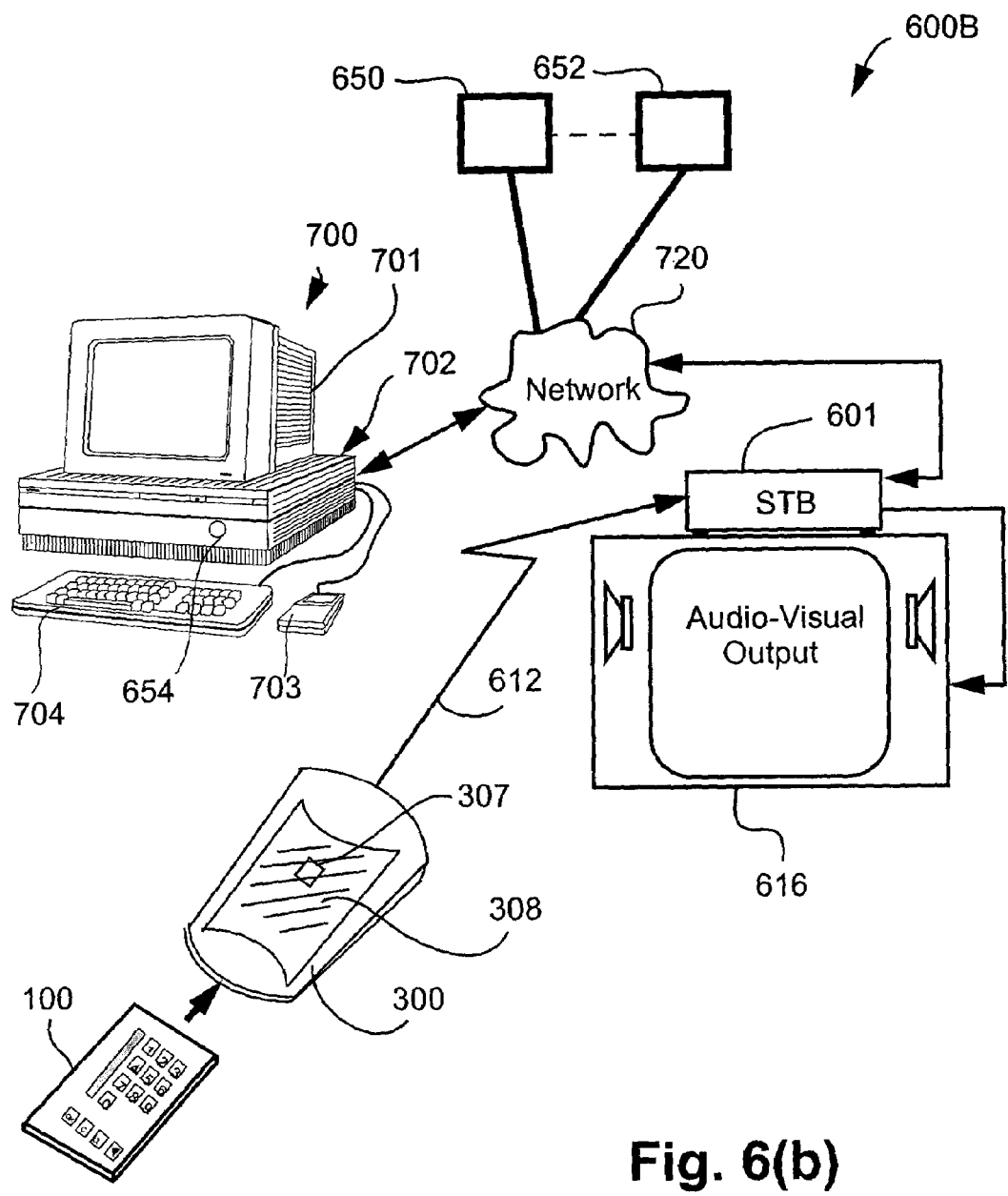
FIG. 6(b) shows another hardware architecture for a smart card interface system.

FIG. 6(b) shows a hardware architecture of a card interface system 600B. In the system 600B, the reader 300 can be programmed for obtaining a service locally at a set top box 601, that couples to an output interface, which in this example takes the form of an audio-visual output device 616, such as a digital television set. The set-top box 601 operates to interpret signals 612 received from the reader 300 according to a specific protocol, which will be described below. The signals transmitted from the reader 300 are preferably infrared but may be electrical or radio frequency. The set top box 601 can be configured to perform the selected function according to touched user interface elements 114, 154 and permit appropriate reproduction on the output device 616. Alternatively, the set top box 601 can be configured to convert the signals 612 to a form suitable for communication and cause appropriate transmission to the computer 700 via the network 720. The computer 700 can then perform the selected function according to the user interface elements 114, 154, and provide data to the set-top box 601 to permit appropriate reproduction on the output device 616. The set top box 601 will be explained in more detail below with reference to FIG. 8.

In one application of the system 600B, the smart card 100 can be programmed for obtaining a service either remotely or locally. For instance, the smart card 100 can be programmed to retrieve an application and/or data stored on remote server computers 650, 652, via the network 720, and to load the application or data on to the set top box 601. The latter smart card can be alternatively programmed to obtain a service from the loaded application on the set top box 601.

Excepting where explicitly distinguished, the systems 600A and 600B of FIGS. 6(a) and 6(b) will be hereinafter generically referred to as the system 600.

Figure 7:
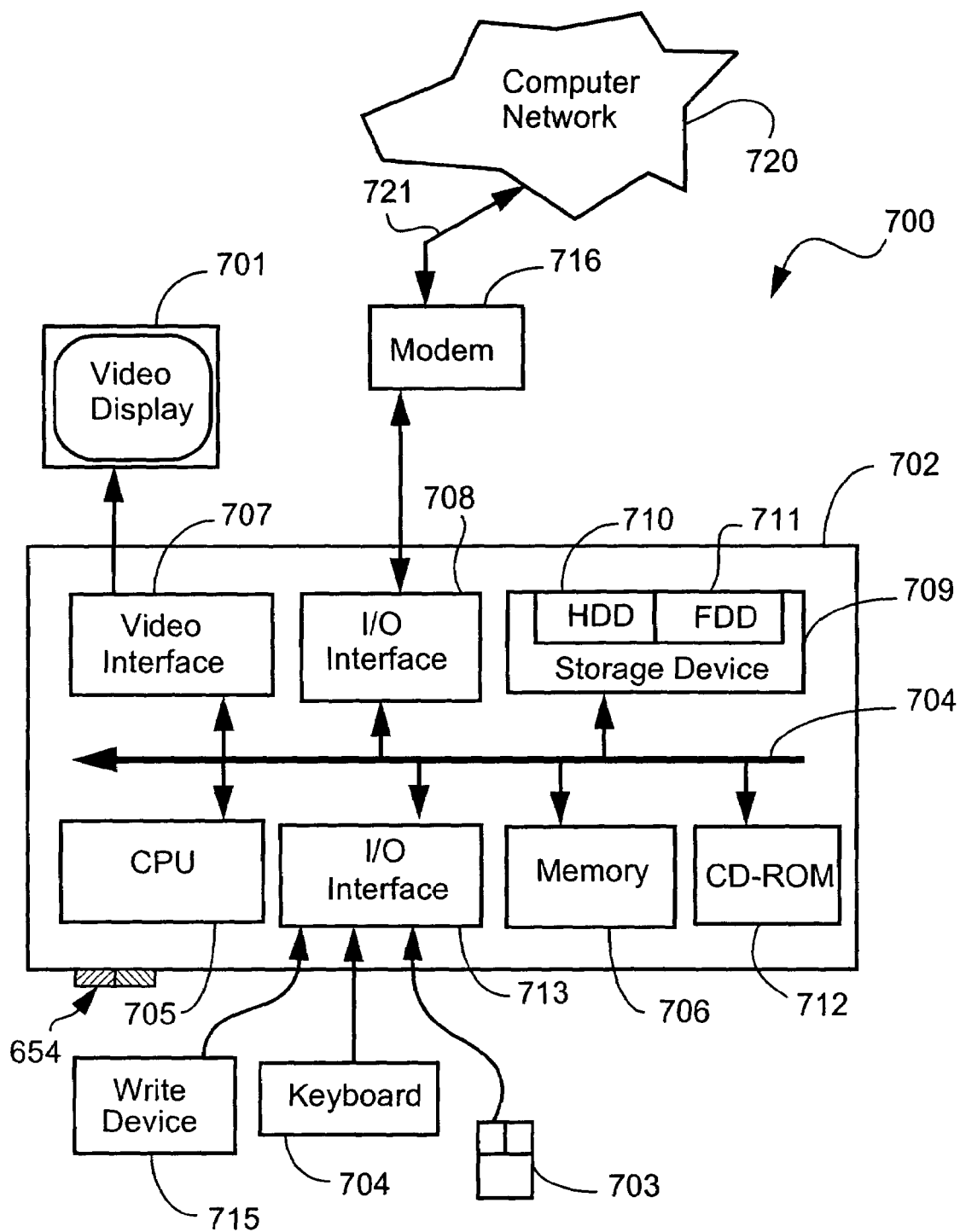
FIG. 7 is a schematic block diagram of the general-purpose computer of FIGS. 6(a) and 6(b) in more detail.

FIG. 7 shows the general-purpose computer system 700 of the system 600, which can be used to run the card interface system and to run software applications for programming the smart card 100. The computer system 700 includes the computer module 702, input devices such as the keyboard 704 and mouse 703, output devices including a printer (not shown) and the display device 701. A Modulator-Demodulator (Modem) transceiver device 716 is used by the computer module 702 for communicating to and from the communications network 720, for example connectable via a telephone line 721 or other functional medium. The modem 716 can be used to obtain access to the Internet, and other network systems, such as a Local Area Network (LAN) or a Wide Area Network (WAN).

The computer module 702 typically includes at least one central processing unit (CPU) 705, a memory unit 706, for example formed from semiconductor random access memory (RAM) and read only memory (ROM), input/output (I/O) interfaces including a video interface 707, and an I/O interface 713 for the keyboard 704 and mouse 703, a write device 715, and an interface 208 for the modem 216. The I/O interface 713 also includes the IR transceiver 654 connected to the I/O interface 713 for communicating directly with the reader 300. A storage device 709 is provided and typically includes a hard disk drive 710 and a floppy disk drive 711. A magnetic tape drive (not illustrated) is also able to be used. A CD-ROM drive 712 is typically provided as a non-volatile source of data. The components 705 to 713 of the computer module 702, typically communicate via an interconnected bus 704 and in a manner, which results in a conventional mode of operation of the computer system 702 known to those in the relevant art. Examples of computers on which the arrangement described herein can be practiced include IBM-computers and compatibles, Sun SPARCstation or alike computer system evolved therefrom.

Typically, the software programs such as applications of the system 600 are resident on the hard disk drive 710 and read and controlled in their execution by the CPU 705. Intermediate storage of the software application programs and any data fetched from the network 720 may be accomplished using the semiconductor memory 706, possibly in concert with the hard disk drive 710. In some instances, the application programs can be supplied to the user encoded on a CD-ROM or floppy disk and read via the corresponding drive 712 or 711, or alternatively may be read by the user from the network 720 via the modem device 716. Still further, the software can also be loaded into the computer system 702 from other computer readable medium including magnetic tape, ROM or integrated circuits, a magneto-optical disk, a radio or infra-red transmission channel between the computer module 702 and another device, a computer readable card such as a smart card, a computer PCMCIA card, and the Internet and Intranets including email transmissions and information recorded on Websites and the like. The foregoing is merely exemplary of relevant computer readable media. Other computer readable media are able to be practiced without departing from the scope of the invention defined by the appended claims.

Figure 8:
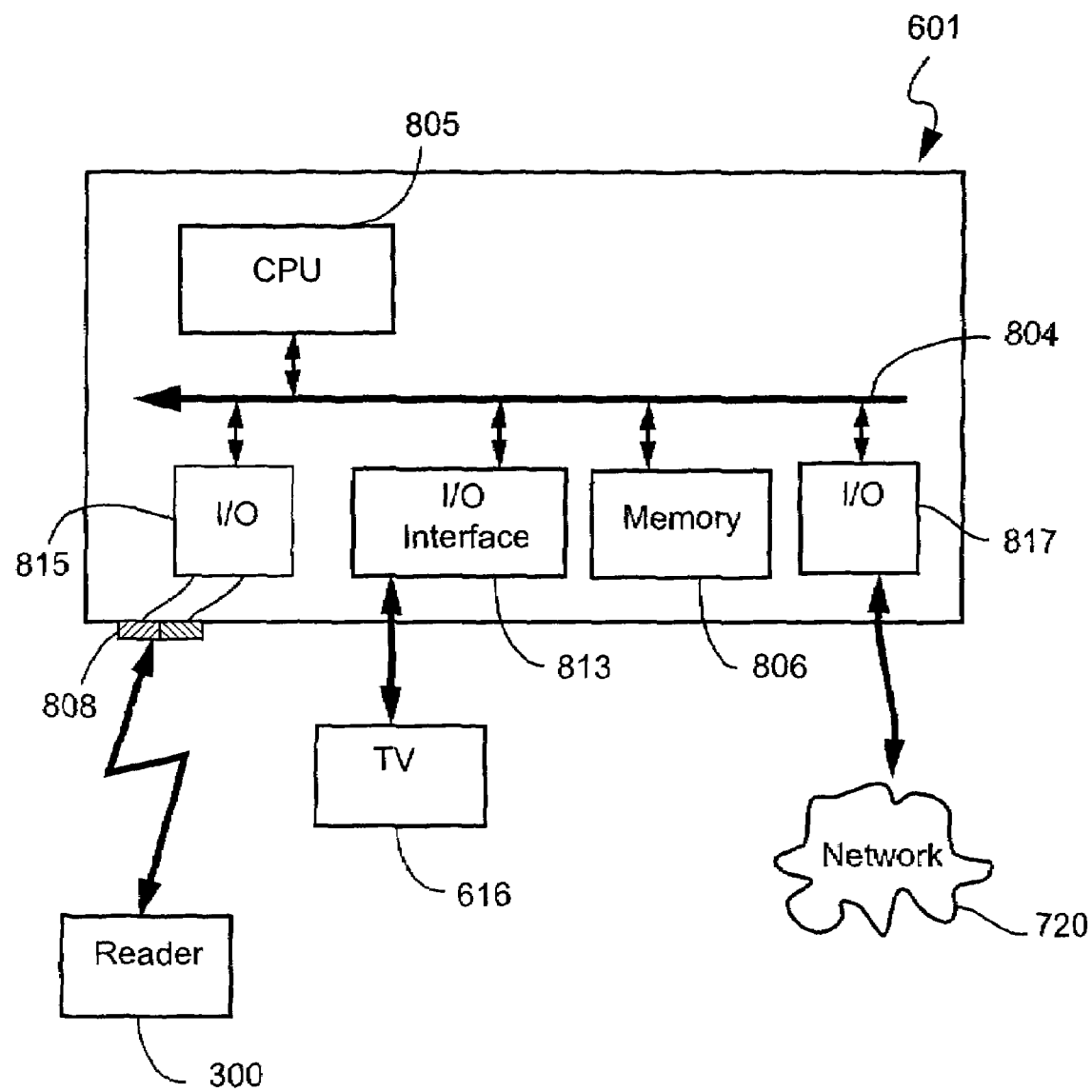
FIG. 8 is schematic block diagram showing the set top box of FIG. 6(b) in more detail.

FIG. 8 shows the set top box 601 of the system 600, which can be used to interpret the signals 612 received from the reader 300. The set top box 601 in some implementations essentially is a scaled version of the computer module 702. The set top box 601 typically includes at least one CPU unit 805, a memory unit 806, for example formed from semiconductor random access memory (RAM) and read only memory (ROM), and input/output (I/O) interfaces including at least an I/O interface 813 for the digital television 616, an I/O interface 815 having an IR transceiver 808 for receiving and transmitting the signals 612, and an interface 817 for coupling to the network 720. The components 805, 806, 813, 815 and 817 of the set top box 601, typically communicate via an interconnected bus 804 and in a manner which results in a conventional mode of operation. Intermediate storage of any data received from the reader 300 or network 720 may be accomplished using the semiconductor memory 806. Alternatively, the set top box can include a storage device (not shown) similar to the storage device 709.

1.4 Programming the Smart Card

As described above, the smart card 100 is programmable and can be created or customized by a third party. For example, with the system 600, the smart card 100 can be programmed and customized for one touch operation to communicate with the set-top box 601 and/or computer 700 and obtain a service over the network 720. The smart card 100 can be programmed by means of the write device 715 coupled to the I/O interface 713 of the computer module 702. The write device 715 has the capability of writing data to the memory chip 219 on the memory card 100A or the storage means 276 of the microprocessor 259 for the CPU card 100B. Preferably, data is not able to be written to the storage means 276 unless a predetermined electronic key is first presented to the microprocessor 259. Depending upon the specific implementation, the write device 715 may also be configured to print graphics on to the front surface 116,156 of the smart card 100 using image production software application programs. The write device 715 may also have a function for reading data from the smart card 100.

The write device can be configured such that the user can insert the smart card 100 into the write device 715 and then enter the required data. A software application can then write the data entered by the user to the memory of the smart card 100 via the write device 715. If the stored data is encoded for optical decoding such as in the case of a barcode memory card, the write device 715 can print the encoded data onto the memory card 100A.

For the CPU card 100B, the microprocessor 259 can be constructed so that once programmed in the manner described, the contents cannot thereafter be casually read.

1.5 Smart Card Data Format

The smart card 100 generally stores a data structure in memory 219, 276 that describes various card properties and any user interface elements 114, 154 printed on the smart card 100. The smart card 100 can also include global properties that specify attributes such as information about the smart card 100, vendor and a service. Further, user-interface objects, as will be explained in detail below, can specify data to be associated with the user interface elements 114,154 printed on the surface of a corresponding smart card 100.

For the memory card 100A, data conforming to the format to be described can be copied directly into the memory chip 219 of the smart card 100. For the CPU card 100B, data conforming to the format to be described can be stored in the storage means 276 as a file being one file of a file system implemented on the CPU card 100B. Such a file system will be described in detail below. In either case, to ensure that the cost of the smart card 100 can be kept to a minimum, the amount of data stored on the smart card 100 is kept to a minimum. For example, where the smart card 100 is being used as a music sampler and associated on-line service, the memory 219, 276 of the smart card 100 does not contain the music itself. The smart card 100 only contains data associated with the user interface in the form of the user interface elements 114, 154 and certain identifiers, which will be described in detail below. If the smart card 100 has limited storage capacity (e.g. in the case where the smart card 100 utilizes a barcode), the smart code 100 may only include a card identifier as will be explained in detail below.

The user-interface objects referred to above can represent mapping data, which relate the user interface elements 114, 154 imprinted directly on a surface of the smart card 100, to commands or addresses (e.g.: Uniform Resource Locators (URLs)). The mapping data includes (X,Y) coordinates that typically define the size and location of user interface elements 114, 154 on the smart card 100. The user-interface objects are preferably stored in the memory 219, 276 of the smart card 100. Alternatively, the user-interface objects can be stored not on the smart card 100 itself, but in the system 600. For example, the smart card 100 can store, via the memory 219, 276 a barcode or a magnetic strip, a unique identifier, which is unique to smart cards 100 having substantially similar user interface elements 114, 154 and layout. The unique identifier together with the coordinates determined from the touch panel 308, as a result of a user press, can be transmitted by the reader 100 to the computer 700 or to the set top box 601, of the system 600.

The system 600 can have the user-interface objects stored on the computer 700, set top box 601 or server 650, which may thus be arranged to perform the mapping from the determined coordinates to a corresponding command, address or data relevant to a service associated with the smart card 100 and a user selection of one of the user interface elements 114, 154, in order to provide a desired function represented by the selected user interface elements. In this instance, the data related to the user selected user interface elements 114,154 as described above takes the form of coordinates determined by the microcontroller 1044 of the reader 300 as a result of a user applying pressure to a portion of the touch panel 308 which overlays the desired user interface elements 114,154.

Data stored in the smart card 100 includes a card header followed by zero or more objects as described in the following sections.

1.5.1 Card Header

Figure 11:
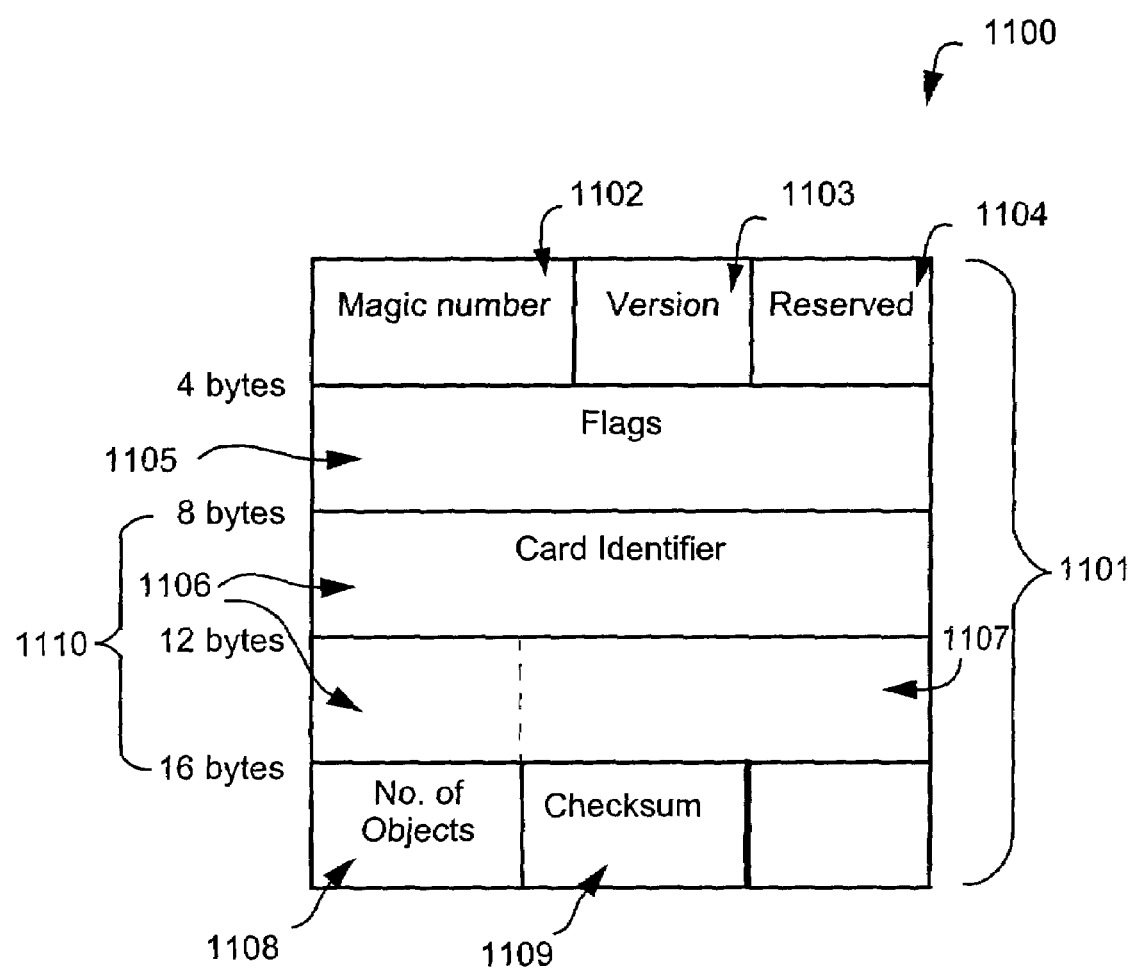
FIG. 11 shows the data structure of a card header as stored in the smart cards of FIG. 1(a) and FIG. 1(b)

FIG. 11 shows the data structure of a card header 1100 as stored in the smart card 100. The header 1100 includes a number of rows 1101, each of which represent four bytes of data. The data is preferably in 'big endian' format. The complete header is 19 bytes long and includes the following fields (described in more detail in Table 1 below):

(i) magic number field 1102, which includes a constant specifying a smart card as being a valid memory card 100A or CPU card 100B. For example, the magic number field 1102 can be used to check or verify that a proprietary card belonging to a particular manufacture is being used;

(ii) versions field 1103, which includes each version increment that specifies a change in the smart card layout that cannot be read by a reader 300 which is compatible with lower versions of the layout;

(iii) reserved field 1104, this field is reserved for future use;

(iv) flags field 1105, which includes flags for a smart card (see Table 2 below);

(v) card identifier field 1110, which includes two fields—a service field 1106 and a service specific field 1107. The service field 1106 identifies the service of a corresponding smart card 100 and the service specific field 1107 optionally contains a service-specific value;

(vi) a number of objects field 1108, which includes a number value representing how many objects follow the header 1100. This field can be set to zero; and (vii) a checksum field 1109, which includes a card checksum of all data on a corresponding smart card 100 excluding the checksum itself.

Table 1 below provides a description of the content of the various (number) fields described with reference to FIG. 11.

TABLE 1

| Field Number | Description (Card Header) |
|---|---|
| Magic Number | Two byte magic number. A constant that specifies this as being a valid card. Currently defined as the ASCII value for 'i' followed by the ASCII value for 'C'. |
| Version | One byte version number. Each version increment specifies a change in the card layout that can not be read by a reader that is compatible with lower versions of the layout. This document describes version 1(0x01) of the card format. |
| Reserved | This data is reserved for future use. Its value must be set to zero. |
| Flags | Four bytes of flags for this card. (See Table 2). All non-assigned bits must be zero. |
| Card Identifier | Eight byte card identifier. Card identifiers include two fields - service identifier and service-specific identifier. The service identifier is five bytes and identifies the service associated with the card. The service-specific identifier is three bytes of service specific value. |
| Number of Objects | One byte. The number of objects following this header. Can be zero. |
| Checksum | Card checksum, 2 bytes. The card checksum is sixteen bit, unsigned integer sum of all data bytes on the card excluding the checksum. |

The card identifier field 1110 comprises an eight-byte card identifier. The card identifier includes two portions (i.e. unit pieces of data), namely, a service identifier and a service-specific identifier. Preferably, the card identifier is arranged so that the service identifier occupies five bytes and the service-specific identifier occupies three bytes of the total card identifier value.

The service identifier contained in the field 1106 may be used to distinguish one service from another or distinguishes one vendor from another. That is, for example, a service can be associated with an application that provides the service to the user of a smart card 100 as distinct from a vendor who can provide multiple services to the user by providing multiple applications. The service identifier can be an identifier to identify the application to be used or application location (e.g. URL).

The card identifier can be used to configure generic smart cards for the system 600. Generic smart cards are smart cards 100 having a special service identifier that can be used to provide input to a current application already running. The special value for the service identifier, referred to as "the generic service identifier", is 0x0000000001, where '0x' represents hexadecimal notation (i.e. every two characters of the generic service identifier represent the value of a single byte). A generic smart card can be used to send data to a front application already running on the system 600. For example, a smart card 100 having a keypad user interface that can be used to send text input to an application which has focus or a smart card 100 with personal details that can also be used to submit the personal information stored on the smart card 100 to any application.

A smart card 100 identification authority can assign service identifiers to a vendor when the vendor registers a particular service.

The service-specific identifier contained in the field 1107, as described above, can be optionally used by the vendor of a particular service to provide predetermined functions associated with that particular service. The use of the service-specific identifier is substantially dependent upon an application being executed on the system 600. For example, the service identifier together with the service-specific identifier can be used as a unique identifier for a card 100. This unique identifier can be used by an application to gain or deny access to a specific feature associated with a particular service, to reproduce a specific-service identifier in a log file in order to confirm or verify that a particular smart card 100 having that value was used to access a service, and to provide a unique identifier that can be matched up with a corresponding value in a database in order to retrieve information about the user of the service (e.g.: name, address, credit card number etc).

Another example of a use for the service-specific identifier can include providing information about a mechanism or mode of distribution of the smart cards 100 (e.g. by mail, bus terminal kiosks, handed out on a train etc). Further, the service-specific identifier can identify what data is to be loaded into the system 600 when a service is accessed.

The foregoing is not intended to be an exhaustive list of possible uses or applications of the service-specific identifier but a small sample of possible applications and there are many other applications of the service-specific identifier of field 1107.

1.5.2 Card Flags

The flags field 1105 of the header 1100 of FIG. 11 can include three flags.

For the memory card 100A and the CPU card 100B, the flags of the flags field 1105 are as follows:

(i) Background beep;

(ii) Background Move; and (iii) Don't Report Background Coordinates.

Table 2 below provides a description of each of the above flags (i) to (iii). The above flags (i) to (iii) affect the functions that the smart card 100 can perform in a reader 300, as is defined by the description of each flag.

TABLE 2

| Name | Description | Value (hex) |
|---|---|---|
| Background Beep | Causes the reader to provide audio feedback whenever the background is touched. | 0x0000 0001 |
| Background Move | Causes the reader to send all move events from when the touch panel was pressed on the background until the touch panel is released. | 0x0000 0002 |
| Don't Report Background Co-ordinates | Causes the reader to suppress reporting of the co-ordinates of all presses and releases of the touch panel, when they correspond to the background, reporting them instead as (0xFF, 0xFF). | 0x0000 0004 |

1.5.3 Objects

Figure 12:
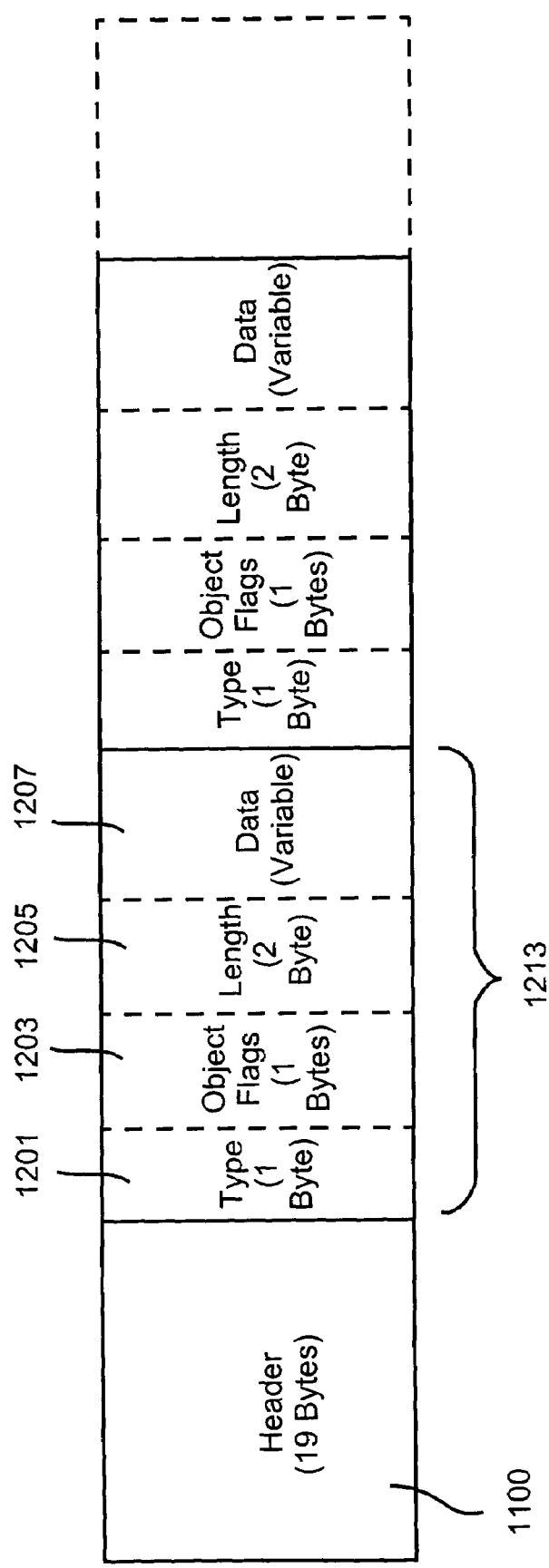
FIG. 12 shows one or more object structures following the card header of FIG. 11.

As shown in FIG. 12, immediately following the card header 1100 of FIG. 11 can be zero or more object structures 1213 defining the objects of a particular smart card 100 and forming part of the data stored on the smart card 100. Each object structure 1213 comprises four fields as follows:

(i) a type field 1201;

(ii) an object flags field 1203;

(iii) a length field 1205; and (iv) a data field 1207.

The structure of the data field 1207 depends on the object type as will be described below.

Table 3 below shows a description of each of the fields 1201, 1203, 1205 and 1207 of the object structure 1213.

TABLE 3

| Name | Description (Object Structure) | Length |
|---|---|---|
| Type | The type of object (see Table 5). | 1 byte |
| Object Flags | The general object flags that are associated with this object (see Table 4). Note: Additional flags specific to an object type are specified within the data field of the object. | 1 byte |
| Length | The length of the data following this object. This value can be zero. | 2 bytes |
| Data | The data associated with this object. The structure of this data is dependent on the type of object. | Variable |

The flags field 1203 of the object structure 1213, preferably includes an inactive flag and an extended data format flag. Table 4 below shows a description of the inactive flag and the extended data format flag.

TABLE 4

| Name | Description (Pre-Object Flag Values) | Value (hex) |
|---|---|---|
| Inactive | Indicates to the reader that the object is valid but is to be ignored regardless of object type. | 0x01 |
| Extended Data Format | See section 1.6.3.2.1 below. | 0x02 |

For the smart card 100, there are preferably six object types provided, as follows:

(i) User Interface Element;

(ii) Card Data;

(iii) Fixed Length Data;

(iv) Reader Insert;

(v) No operation; and (vi) No operation (single byte).

Table 5 shows a description of each of the above object types (i) to (vii).

TABLE 5

| Name | Description) | Value (hex) |
|---|---|---|
| No operation (single byte) | A single byte object that doesn't have a standard object header. Used to fill spaces on the card, which are too small for a normal object header. | 0x00 |
| No Operation | An object that is used to fill blocks of empty space on the card. | 0x01 |
| User Interface Element | A user interface element. | (inline) 0x10 |
| Card Data | Contains data that relates specifically to this card. Card data would normally be read by the reader and transmitted as part of the INSERT message on card insertion. | 0x20 |
| Fixed length Data | An object that can be used to store fixed length blocks of data on the card. | 0x30 |
| Reader Insert | An object that can be used to give instructions to the reader when the card is inserted. | 0x40 |

1.5.3.1 User Interface Element Objects

Each of the user interface element objects of Table 5 define a rectangular area on a smart card 100 and some quantity of associated data that is used to generate an output when the user touches an area of the touch panel 308 over the corresponding rectangular area of the smart card 100. The origin for the coordinate mapping system is the top left of the smart card 100 in accordance with an International Standards Organization standard smart card held in a portrait view with the chip contacts 218, 278 facing away from the viewer and towards the bottom of the smart card 100. For any reader 300 that does not use this card orientation, the values of corner points on the smart card 100 must be adjusted by the reader 300 for the memory card 100A or by the CPU 275 for the CPU card 100B, so as to report a correct "button" press.

The user interface element objects structure preferably has six fields as follows:
(i) a flags field;
(ii) an X1 field;
(iii) an Y1 field;
(iv) an X2 field;
(v) a Y2 field; and
(vi) a data field which typically includes data associated with the user interface element for example, a URL, a command, a character or name as well as optional commands reconfiguring some aspects of the reader 300.

Table 6 shows a description of each of the above fields for the described user interface element object structure. A press on the touch panel 308 is defined to be inside an area defined by a particular user interface element corresponding to a user interface element object structure if:
(i) the X value of the press location is greater than or equal to the X1 value of the associated user interface element object and is strictly less than the X2 value for that particular user interface element object; and
(ii) the Y value for the press location is greater than or equal to the Y1 value of the particular user interface element object and strictly less than the Y2 value.

TABLE 6

| Field | Description (User Interface Object Structure) | Size |
|---|---|---|
| Flags | Flags specific to this user interface element on the card. | 1 byte |
| X1 | X value of the top-left hand corner co-ordinate of this object's rectangle. | 1 byte |
| Y1 | Y value of the top-left hand corner co-ordinate of this object's rectangle. | 1 byte |
| X2 | X value of the bottom-right hand corner co-ordinates of this object's rectangle. | 1 byte |
| Y2 | Y value of the bottom-right hand corner co-ordinate of this object's rectangle. | 1 byte |
| Data | Zero or more bytes of data associated with this object. In memory cards, the actual data is always stored within this field. The size of this field is determined by the object data size minus the combined size of the above fields. | Variable |

Overlapping user interface elements are allowed. In this case, if a press is within the bounds of more than one user interface element then the object resulting from the press is determined by a Z order. The order of the user interface elements 114,154 on the smart card 100 defines the Z ordering for all of the user interface elements on that particular smart card 100. The top user interface element is the first user interface element for a particular smart card 100. The bottom user interface element is the last user interface element for that particular smart card 100. This allows for non-rectangular areas to be defined. For example, to define an "L" shaped user interface element, a first user interface element object would be defined with zero bytes in the data field, and a second user interface element object would be defined to the left and below the first user interface element object but overlapping the first user interface element object. The second user interface element would contain the data that is to be associated with the "L" shaped user interface element.

The location of a press is reported in "fingels", which represent finger elements (analogous to "pixels" which represent picture elements). The height of a fingel is defined to be $\frac{1}{256}$th of the length of an International Standards Organization memory smart card and the width is defined to be $\frac{1}{128}$th of the width of an International Standards Organization memory smart card.

The behavior associated with each user interface element 114,154 may be modified using one or more flags. For both the memory card 100A and the CPU card 100B, each user interface element 154 preferably has seven associated flags as follows:
(i) Beep;
(ii) Move;
(iii) Don't report coordinates;
(iv) Auto repeat;
(v) Do Not Send Data on Press;
(vi) Do Not Send Data on Release; and
(vii) Encrypt Out-going data.

Table 7 shows a description for each of the user interface element flags (i) to (vii).

TABLE 7

| Name | Description | Value |
|---|---|---|
| Beep | This flag causes the reader to beep when the user interface element is pressed. | 0x01 |
| Move | This flag instructs the reader to send all subsequent move events until the touch screen is released. | 0x02 |
| Don't Report Co-ordinates | This flag instructs the reader to suppress reporting of the co-ordinates of the associated press or release, reporting them instead as (0xFF, 0xFF). | 0x04 |
| Auto-repeat | This element automatically repeats when the press is held on the element. | 0x08 |
| Don't Send Data on Press | This causes the associated user interface element not to send the data associated with this user interface element in the press event. The default is to send the data associated with the user interface element in the press event. | 0x10 |
| Don't Send Data on Release | This causes this user interface element not to send the data associated with this user interface element in the release event. The default is to send the data associated with the user interface element in the release event. | 0x20 |

1.5.3.2 Card Data

The card data object is used to store data which is specific to a particular card 100. The data layout for this object has no fixed form. The contents of the card data object are transmitted from the reader 300 as part of an INSERT message when the smart card 100 is inserted into the reader 300.

1.5.3.3 Extended Data Format

User interface element data stored in user interface element and card data objects may come in two formats: standard data format and extended data format. In standard data format, all data is transmitted by the reader 300. In extended data format, the data itself is broken up into a sequence of "sub-objects", most of which contain information that instructs the reader 300 to change some aspect of the reader 300 operation (i.e. operational characteristics). The format of the sub-objects, with the exception of the Output Data sub-object, is shown in Table 8 below.

TABLE 8

| Name | Description | Size |
| --- | --- | --- |
| Tag | A tag identifying the type of object | 1 byte |
| Length | The length of the data associated with the object | 1 byte |
| Value | The data associated with the object | Length Bytes |

Figure 23A:
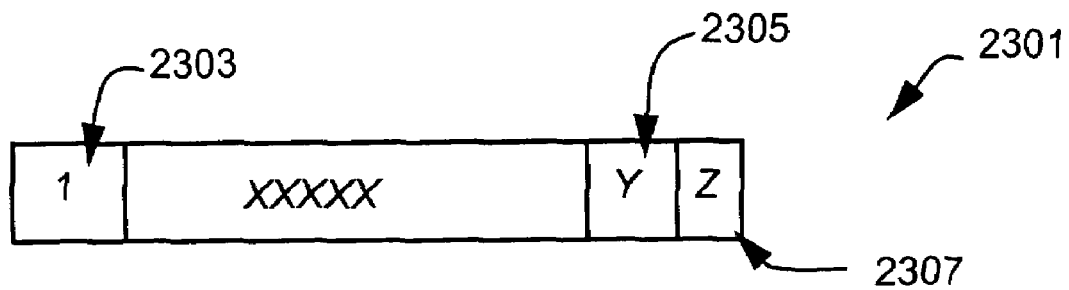
FIG. 23(a) shows a tag format for a data sub-object.
Figure 23B:
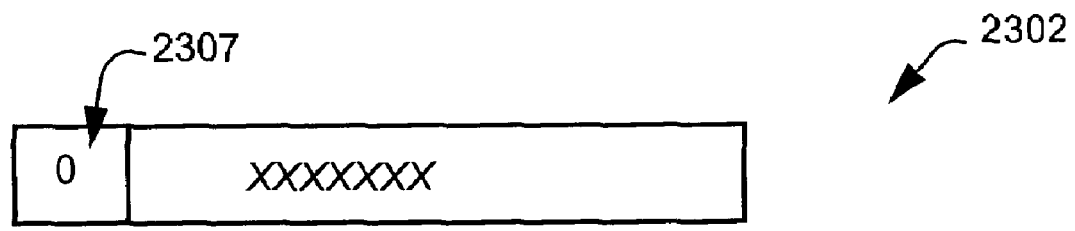
FIG. 23(b) shows another tag format for a data sub-object.

The structure of the tag portion of a sub-object depends on the value of the most significant bit, and is structured in one of the formats 2301 and 2302 shown in FIGS. 23(*a*) and (*b*), respectively. For both of the tags 2301 and 2302, the bits labelled X indicate the type of sub-object associated with the tag.

If the tag 2301 has a most significant bit 2303 which is set, as seen in FIG. 23(*a*), a non-global change is effected in the reader 300 upon the processor 1045 reading the tag 2301. In this instance, if the second least significant bit 2305 is set to zero then the associated non-global change is designated to be card specific, meaning that the effect of the change will be lost when the corresponding card 100 is removed from the reader 300, or when the effect is modified by another sub-object of the same type. In addition, the least significant bit 2307 indicates whether a new setting is to override a current global setting (i.e., indicated by the bit 2305 being set to zero) or for the reader 300 to toggle between the new setting and the global setting (i.e., indicated by the bit 2305 being set to one). Alternatively, if the second least significant bit 2305 is set to one then a temporary change is invoked, where the value of the least significant bit 2307 indicates whether or not the effect of the temporary change is to extend through to a following user interface element 114, 154 selection by a user.

A most significant bit 2307 which is not set, as seen for the tag 2302 of FIG. 23(*b*), indicates that a global change will be effected in the reader 300 upon the processor 1045 detecting the tag 2302. In this instance, the change is not dependent on the presence of the card 100 in the reader 300 or on a certain time period elapsing.

For the smart card 100, there are preferably ten sub-object types defined, as follows:

(i) Output Data;
(ii) Change user identifier;
(iii) Change global reader application message protocol;
(iv) Change global mouse protocol;
(v) Change global keyboard protocol;
(vi) Change global remote control protocol;
(vii) Download Custom protocol module;
(viii) Delete protocol modules;
(ix) Change temporary transmission protocol; and
(x) Change modifier flags.

An instance of object data 1207 can include any one or more of the above sub-objects types (i) to (x). Table 9 shows a description of the above sub-object types (i) to (viii). A tag (e.g., the tag 2800) associated with each of the sub-objects (i) to (viii) has a most significant bit which is set to zero.

TABLE 9

| Name | Description | Type Value |
| --- | --- | --- |
| Output data | This sub-object represents the actual output data associated with the object, and omits the length field to conserve space. The length of the output data is calculated by subtracting the length of all other sub-objects together with the output data tag from the length of the entire object. Thus, this sub-object spans the entire area from the tag to the end of the object that encloses the sub-object. | 0x00 |
| Change user identifier | Two bytes are reserved in memory 1047 for a user identifier. This user identifier may be inserted by a protocol module format function, which will be described in section 4.0 below, into any messages that are sent. This sub-object sets the user identifier to the data stored in the first byte of the value field of the sub-object. | 0x01 |
| Change global reader application message protocol | The transmission protocol specified by this object should be used as a global reader application message protocol for a particular transmission mode. The data in this sub-object contains one byte identifying the protocol, possibly followed by other bytes specifying other parameters specific to the protocol being selected. | 0x04 |
| Change global mouse protocol | The transmission protocol specified by this object should be used as a global mouse protocol for a particular transmission mode. The data in this sub-object contains one byte identifying the protocol, possibly followed by other bytes specifying other parameters specific to the protocol being selected. | 0x05 |
| Change global keyboard protocol | The transmission protocol specified by this object should be used as a global keyboard protocol for a particular transmission mode. The data in this sub-object contains one byte identifying the protocol, possibly followed by other bytes specifying other parameters specific to the protocol being selected. | 0x06 |

TABLE 9-continued

| Name | Description | Type Value |
|---|---|---|
| Change global remote control protocol | The transmission protocol specified by this object should be used as the global remote control protocol for a particular transmission mode. The data in this sub-object contains one byte identifying the protocol, possibly followed by other bytes specifying other parameters specific to the protocol being selected. | 0x07 |
| Download custom Protocol module | An infrared protocol module is stored in the value field of this sub-object, and should be loaded into the reader. The newly loaded protocol is activated in any way - an additional sub-object is is required. | 0x08 |
| Delete infra-red protocols module | The list of protocol modules is searched for modules with identifiers that match any of those provided in the data bytes of this sub-object. All discovered matching modules are deleted. | 0x09 |

Table 10 shows a description of the above sub-object types (ix) and (x). A tag (e.g., the tag 2800) associated with each of the sub-objects (ix) to (x) has a most significant bit which is set to one.

TABLE 10

| Name | Description | Type Value |
|---|---|---|
| Change temporary transmission protocol | The infrared protocol identifier by this object should be used. The data in this sub-object contains one byte identifying the protocol, possibly followed by other bytes specifying other parameters specific to the protocol being selected. | 0x1 |
| Change modifier flags | A special reader buffer contains a set of flags, which toggle certain modifier bits, which can be applied to outgoing messages. For example, in a keyboard protocol, pressing a SHIFT key might cause the following character to be transmitted with a bit that indicates that a SHIFT key is being held down. | 0x2 |

Typically only the "object data" sub-object should be processed on release events, as described above.

For the smart card 100, sixteen flags are typically defined for the 'change modifier flags' sub-object, as follows:
(i) LShift;
(ii) RShift;
(iii) LCtrl;
(iv) RCtrl;
(v) LAlt;
(vi) RAlt;
(vii) LWin;
(viii) RWin;
(ix) Menu
(x) Fn
(xi) CapsLock
(xii) NumLock
(xiii) ScrollLock
(xiv) LButton
(xv) MButton
(xvi) RButton Table 11 shows a description of the functions that each of the above flags (i) to (xvi) represent in order to emulate a mouse, keyboard or remote control protocol using a card such as the smart card 100.

TABLE 11

| Name | Description | Value |
|---|---|---|
| LShift | The left shift key is currently being held down | 0x8000 |
| RShift | The right shift key is currently being held down | 0x4000 |
| LCtrl | The left control key is currently being held down | 0x2000 |
| RCtrl | The right control key is currently being held down | 0x1000 |
| Lalt | The left alt key is currently being held down | 0x0800 |
| Ralt | The right alt key is currently being held down | 0x0400 |
| Lwin | The left windows key is currently being held down | 0x0200 |
| Rwin | The right windows key is currently being held down | 0x0100 |
| Menu | The menu key is being held down | 0x0080 |
| Fn | The function key is being held down | 0x0040 |
| CapsLock | The Caps Lock function is currently active | 0x0020 |
| NumLock | The Num Lock function is currently active | 0x0010 |
| ScrollLock | The Scroll Lock function is currently active | 0x0008 |
| Lbutton | The left mouse button is being held down | 0x0004 |
| ScrollLock | The Scroll Lock function is currently active | 0x0008 |
| Mbutton | The middle mouse button is being held down | 0x0002 |
| Rbutton | The right mouse button is being held down | 0x0001 |

Typically, when processing of a sub-object is performed successfully, the reader 300 sounds a high-pitched BEEP. Conversely, if a failure condition occurs, a low-pitched beep, referred to herein as a 'BOOP' occurs to notify the user of a problem. If a temporary change is effected by a sub-object (e.g. a temporary protocol change or modifier flag change), no beep occurs on successful completion, but a low-pitched BEEP (i.e., a BOOP) is still sounded if a problem occurred during the change.

1.5.3.4 Fixed Length Data

The fixed length data object is used to define a fixed length block on the smart card 100 that can be written to by the computer 700, for example.

1.5.3.5 Reader Insert

The reader insert object is used to store instructions for the reader 300 when a particular smart card 100 is inserted. This can be used, for example, to instruct the reader 300 to use a specific configuration of infra-red commands to allow communication with a specific set top box (e.g. 601) or TV.

1.5.3.6 No Operation

The No Operation object is used to fill in unused sections between other objects on a particular smart card 100. Any data stored in the no operation object is ignored by the reader 300. Any unused space at the end of the smart card 100 does not need to be filled in with a no operation object.

1.5.3.7 No Operation (One Byte)

The No Operation (One Byte) object is used to fill gaps between objects that are too small for a full object structure. These objects are only one byte long in total.

1.6 Reader Application Protocol

When not operating in keyboard, remote control or mouse emulation mode, the reader 300 uses a high-level datagram protocol that supports both uni-directional and bi-directional communication between the reader 300 and the set top box 601 or computer 700, for example, referred to as the reader application protocol. The format used for messages from the reader 300 as a result of user interactions with the smart card 100 are of a different format than those that are transmitted to the reader 300. The messages defined by the reader application protocol can be broken up into fragments at a lower level, depending on the low-level transmission protocol that is currently in use.

1.6.1 Message Types

There are at least seven message event types that can be transmitted by the reader 300. These message events are as follows:

(i) INSERT: When a smart card 100 is inserted into the reader 300, and the smart card 100 is validated, an INSERT event is generated by the reader 300 and an associated message is transmitted. This message announces the smart card 100 to a remote module (e.g. the set top box 601). The INSERT message preferably can include the particular card identifier and allow applications to be started or fetched immediately upon the smart card 100 insertion rather than waiting until the first interaction takes place. The INSERT message preferably includes the contents of the card data object from the smart card 100 inserted into the reader 300 if an object of this type is present on the smart card 100.

(ii) REMOVE: When a smart card 100 is removed from the reader 300, a corresponding REMOVE event is generated and a REMOVE message is transmitted to the particular remote module associated with the reader 300. Like the INSERT message, the associated card identifier can be transmitted along with the message. As the card identifier cannot be read from the now removed smart card 100, the card identifier is stored in the memory 1047 of the reader 300. This is a useful optimization as the card identifier is required for all other messages and reading the card identifier from the smart card 100 each time the card identifier is required can be too slow. INSERT and REMOVE messages are not relied upon by the system 600 to control processing. The system 600 is configured to infer missing messages if a message is received and is not immediately expected. For example, if an application detects two INSERT messages in a row, then an application can assume that it has missed the REMOVE message associated with the smart card 100 of the first INSERT message, as typically two smart cards 100 are not inserted into the reader 300 at one time. The application can then take whatever action is required prior to processing the second INSERT message.

Another example of where a missing message can occur is where a hand-held, infrared connected reader 300 as shown in FIG. 6(b), as compared with a wired reader 300 as shown in FIG. 6(a), is being used. Often a user does not point the reader 300 directly at a remote module when inserting or removing cards. This problem can be corrected by the system 600 inferring the INSERT or REMOVE operations based on differing card identifiers in consecutive PRESS and RELEASE pairs.

(iii) BAD CARD: If an invalid smart card 100 is inserted, then the reader 300 is preferably configured to generate a BAD CARD event and to send a BAD CARD message. This message allows an associated remote module to take some action to alert the user to the invalid smart card 100.

(iv) PRESS: When a touch is detected by the reader 300, a PRESS event is generated and a PRESS message is transmitted to an associated remote module. The PRESS message can contain details of an associated memory card, the position of the press and the data associated with the user-interface element at that particular position. If there is no user interface element defined for that position (including if there is no user interface element defined on the smart card 100 at all) a PRESS message is transmitted containing details of the associated smart card 100 and the position of the press. If there is no card present in the reader 300 when a PRESS event is generated then a PRESS message is transmitted containing the special "NO_CARD" identifier (i.e. eight bytes of zero—0x00) and the position of the press.

(v) RELEASE: A RELEASE event complements the PRESS event and a RELEASE message can be transmitted in order to inform an application program of the system 600 that a PRESS has been lifted. Every PRESS event preferably has a corresponding RELEASE event. Readers can allow multiple presses to be registered or provide other events that may occur between PRESS and RELEASE messages.

(vi) MOVE: If, after processing a PRESS event, the touch position changes by a certain amount then the finger (or whatever is being used to touch the smart card 100) is assumed to be moving. MOVE events are generated and MOVE messages are transmitted until the touch is lifted. MOVE events auto-repeat by re-sending the last MOVE messages when the touch position remains stationary. The repeated sending finishes when the touch is lifted and a corresponding RELEASE message is sent. Unlike PRESS and RELEASE events there is no user-interface object involved with MOVE events.

(vii) LOW BATT: A LOW BATT event is generated and a LOW BATT message is transmitted when the battery 1053 in the reader 300 is getting low. This message is transmitted after user interactions to increase the chance that the message will be received by the rest of the system 600. The sending of the LOW BATT message does not prevent the reader 300 from entering a low power state.

As described above, the card identifier is included in every INSERT, REMOVE, PRESS, RELEASE and MOVE message transmitted from the reader 300 to the computer 100 or set-top box 601. As an alternative, the card identifier can be transmitted in connection with an INSERT message only. In this instance, upon insertion of a new smart card 100, the reader 300 generates a session identifier. The session identifier is configured to identify a current session of a card insertion. The session identifier, for example, can be a pseudo-random number represented with two bytes of data or the session identifier can be a number that is incremented each time a smart card 100 is inserted and reset to zero when a predetermined value is reached. In this case, the reader 300 sends an INSERT message to the computer 700 or the set-top box 601, which includes a card identifier as previously described above and a session identifier which is generated for each new smart card 100 insertion. All subsequent PRESS, RELEASE and MOVE messages need not include the card identifier but will include the session identifier and user interface element object data or press coordinates previously described.

When using a session identifier, the system 600 operates as described above with reference to FIGS. 6(a) and 6(b), except that the set-top box 601 or similar, upon receiving an INSERT message from the reader 300, stores the session identifier as the current session identifier and a card identifier as the current card identifier. When the set top box 601 receives a PRESS, RELEASE or MOVE message, the CPU 805 checks that the session identifier is equal to the current session identifier. If so, the CPU 805 sets a card identifier used in all messages to the current card identifier. Otherwise, if the session identifier is not equal to the current session identifier, the CPU 805 informs the user, via the audio-visual output device 616, that a message has been received without a corresponding INSERT message. The user, for example, is then requested to remove and reinsert the card 100.

1.6.2 Data Formats

The data format of the reader 300 protocol used in the system 600 is a fixed size header followed by a variable length data field which can be zero bytes or more in length, followed by an eight bit check-sum and complement.

1.6.3 Message Header

The message header is preferably of a fixed length and is prepended to (i.e. appended to, but in front of) all messages transmitted from the reader 300 to a set top box 601 for example. It is necessary to keep the message header as small as possible due to any bandwidth restrictions that may be imposed. Table 12 below shows the format of the message header that is transmitted from a reader 300 to a remote module such as the set top-box 601 for example. The service and service-specific identifier are the same for a given smart card 100. A service specific identifier is preferably set by a vendor for use with their application. The reader identifier (ID) of Table 12 is also in the header of each message. The reader identifier can be used by an application executing on a server (e.g. the servers 650, 652) to distinguish different users, for example, in a multi-player game application.

TABLE 12

| Field | Description (Message Header Format) | Bytes |
|---|---|---|
| Preamble | Preamble to the message. Value is always 0xAA 0x55 (bit sequence 10101010 01010101). This is to make it easier for a receiving device (e.g., the settop box 601) find the beginning of a message. | 2 |
| Version | The version of the user interface card infrared message protocol this messages uses. This version of the protocol is version 1(0x01 in the version field) | 1 |
| Type | Type of message. This is one of the values given in Table 10. | 1 |
| Reader Identifier | The 16 bit id of the reader that transmitted the message. This number is a pseudorandom generated number that is changed when the battery is replaced in the reader. This is needed to distinguish readers when multiple readers are being used with applications. | 2 |
| Service Identifier | Service identifier as stored on the card. | 5 |
| Service-specific Identifier | Service-specific identifier as stored on the card. | 3 |

Table 13 shows a table listing the message event types that have been described above.

TABLE 13

| Name | Description (Message Type Codes) | Code |
|---|---|---|
| INSERT | A card has been inserted into the reader. | 'I' |
| REMOVE | The card has been removed from the reader. | 'E' |
| PRESS | The touch panel has been pressed. | 'P' |
| RELEASE | The press on the touch panel has been released. | 'R' |

TABLE 13-continued

| Name | Description (Message Type Codes) | Code |
|---|---|---|
| MOVE | The press position has moved but the press has not been released. | 'M' |
| BADCARD | A card has been inserted however it has not passed validation. | 'B' |
| LOW_BATT | The battery in the reader is getting flat. | 'L' |

1.6.3.1 Simple Messages

A number of message types are considered simple in that they consist solely of the message header described above followed by the message checksum byte and its complement. For example, a BADCARD message, a LOW_BATT message and a REMOVE message are simple messages. Table 14 shows the format of a simple message.

TABLE 14

| Field | Description (Simple Message Format) | Bytes |
|---|---|---|
| Header | Message header as defined in Table 11. | 14 |
| Checksum | Message checksum. This is the sum of all the bytes in the message. | 1 |
| Checksum' | The 1's complement of the checksum. | 1 |

1.6.3.2 Move Messages

MOVE messages are formed of the message header described above followed by two fields defining the coordinates of the touch position on the touch panel 8 of the reader 300. Table 15 shows the format of a MOVE message.

TABLE 15

| Field | Description (Move Message Format) | Bytes |
|---|---|---|
| Header | Message header as defined in Table 11. | 14 |
| X | The X co-ordinate of the touch position. | 1 |
| Y | The Y co-ordinate of the touch position. | 1 |
| Checksum | Message checksum. This is the sum of all the bytes in the message. | 1 |
| Checksum' | The 1's complement of the checksum. | 1 |

1.6.3.3 Press and Release Messages

Table 16 below shows the format of PRESS and RELEASE messages. PRESS and RELEASE messages, like MOVE messages contain the message header and touch coordinates. In addition, PRESS and RELEASE messages send data associated with a user-interface element if the touch position matches a user-interface element object defined on the smart card 100. This data is of variable length, the actual size being defined by a corresponding smart card 100. If the touched position does not match a user-interface element object defined on the smart card 100 (including if no user-interface elements are defined on the smart card 100), zero bytes of data associated with user interface elements are sent. If there is no smart card 100 in the reader 300 then the service identifiers are all set to zero (i.e. 0x00) and zero bytes of data associated with the user-interface elements are transmitted to the remote module. The data associated with the user interface element normally corresponds to the data associated with the user interface element defined on the smart card 100 but may be modified or generated by processing on the smart card 100 or reader 300.

TABLE 16

| Field | Description (Press and Release Message Format) | Bytes |
| --- | --- | --- |
| Header | Message header as defined by Table 11. | 14 |
| X | The X co-ordinate of the touch position. | 1 |
| Y | The Y co-ordinate of the touch position. | 1 |
| Length | The number of bytes of data. Can be zero. | 2 |
| Data | The data associated with the user interface element. | Length |
| Checksum | Message checksum. This is the sum of all the bytes in the message. | 1 |
| Checksum' | The 1's complement of the checksum. | 1 |

1.6.7 Insert Messages

INSERT messages are formed of the message header described above and the contents of the card data object from an inserted smart card 100. Table 17 below shows the format of an INSERT message.

TABLE 17

| Field | Description (INSERT Message Format) | Bytes |
| --- | --- | --- |
| Header | Message header as defined in Table 11. | 14 |
| Length | The number of bytes of data. Can be zero. | 2 |
| Data | The data from a Card Data object on the card. | Length |
| Checksum | Message checksum. This is the sum of all the bytes in the message. | 1 |
| Checksum' | The 1's complement of the checksum. | 1 |

Figure 13:
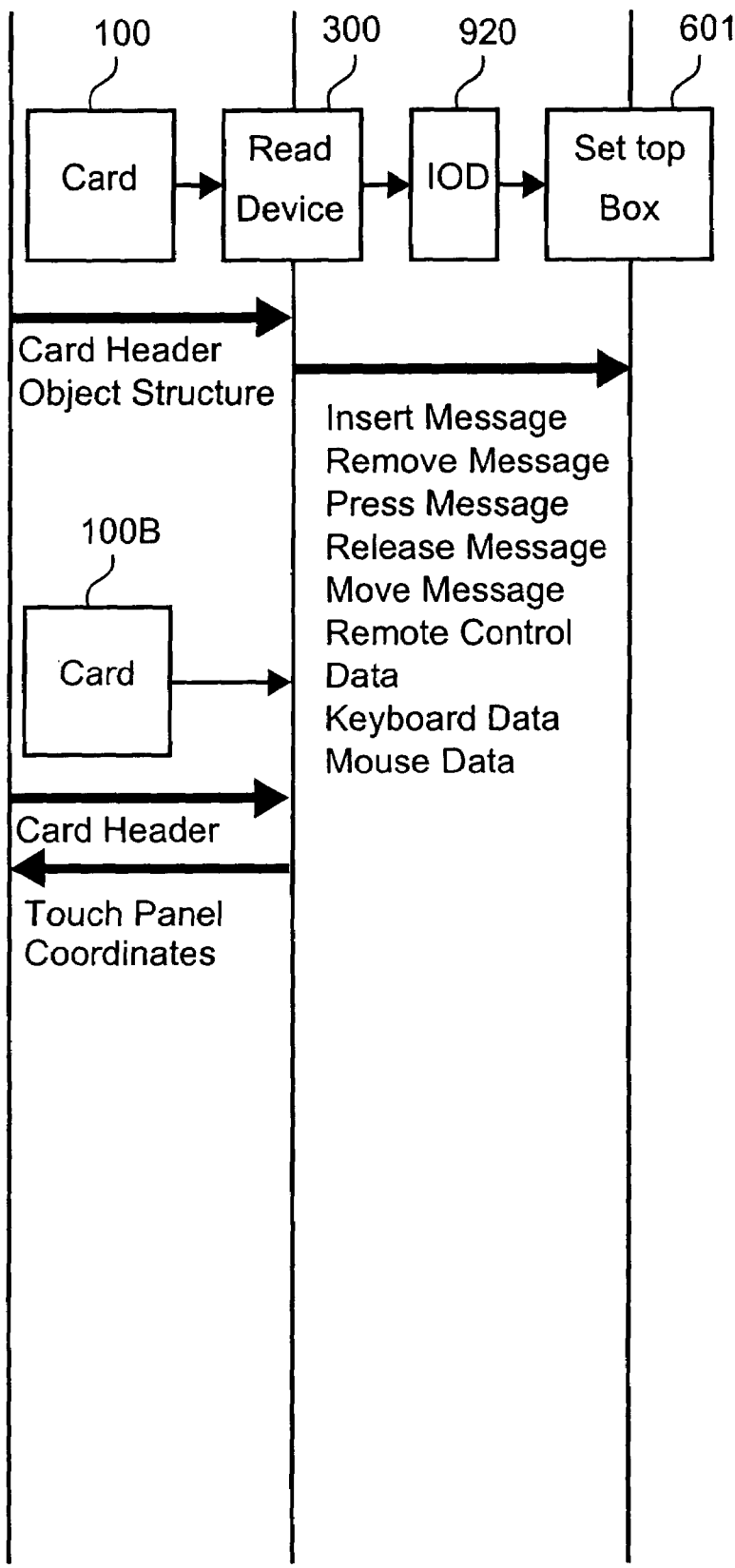
FIG. 13 is a data flow diagram showing the flow of messages within the systems of FIGS. 6(a) and 6(b)

FIG. 13 is a data flow diagram showing the flow of the above-described messages within the system 600 for a smart card 100. The card header 1100 and object structure 1213 are read by the CPU 1045 of the reader 300 which sends a corresponding INSERT, REMOVE, PRESS, RELEASE, MOVE, BADCARD or LOW BAT message to the set top box 601, for example. The reader 300 can also send remote control data, keyboard data and mouse data to the set top box 601.

1.7 Example

The operation of the system 600 will now be further explained with reference to the following example. The system 600 is customizable by virtue of a user being able to utilize a number of different smart cards 100 to perform corresponding different operations. For example, with particular reference to the system 600B, FIG. 14(*a*) shows a memory card 100C which according to the user interface elements 1414 printed thereon is configured for the retrieval of on-line music associated with an Internet site entitled "Blues Guitar Masters". The on-line music can be accessed over the system 600B using the memory card 100C and then purchased using a CPU card 100D configured for use with an electronic banking application, as will be explained below with reference to FIGS. 15(*a*) and 15(*b*). A person skilled in the art would appreciate that the CPU card 100D could be replaced by a memory card similar to the card 100A. Other functions may be performed on the system 600B, using different smart cards 100, such as home shopping, ordering home delivery fast food such a pizzas, and the like. In each instance, insertion of an appropriate smart card 100 into the reader 300 causes a corresponding computer application to commence operation, either within the set-top box 601 or the computer system 700, in order to service user commands entered via the reader 300 and to return appropriate information for audio-visual feedback to the user.

For the memory card 100C, on-line music is provided as data to the set-top box 601 which permits reproduction of audio and any related visual images on the output device 616 or the display 701 of the computer system 700. The user interface elements 1414 of the memory card 100C are in the form of a "play button" 1401, a "rewind button" 1403, a "fast forward button" 1405, a "stop button" 1407, a "select button" 1409, a "record button" 1411 and a two-way directional controller 1413, printed on a front face 1416 of the memory card 100C.

Figures 14A, 14B:
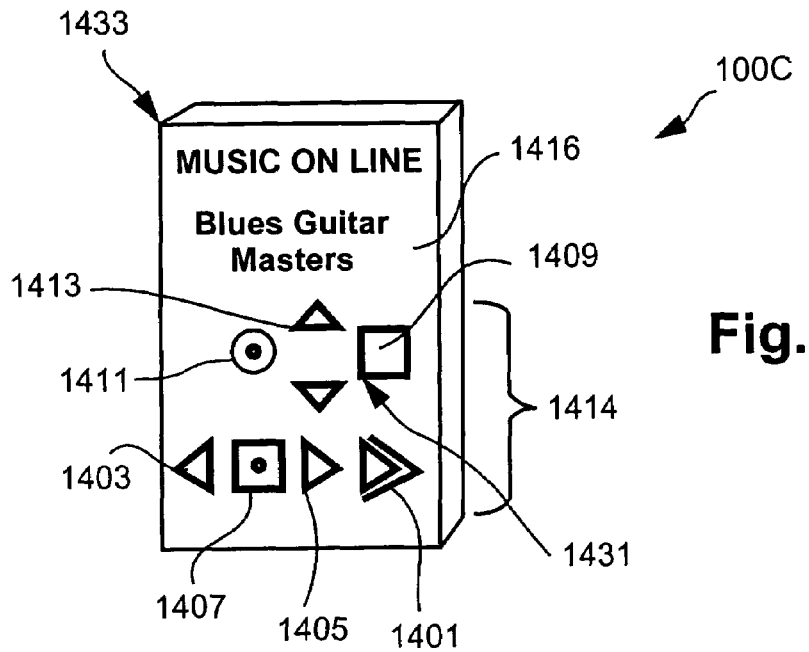
FIG. 14(a) is a perspective view of a smart card configured for accessing a service over the smart card interface system of FIG. 6(b)
FIG. 14(b) shows user interface element objects associated with the smart card of FIG. 14(a)

FIG. 14(*b*) is a table showing user interface element objects (e.g. 1431) associated with each of the user interface elements 1401 to 1417. The user interface element objects (e.g. 1431) are stored in a memory (not shown) formed within the memory card 100C similar to the memory 219 of the memory card 100A. As described above with reference to Table 6 and as shown in FIG. 14(*b*), each of the user interface element objects (e.g. 1431) has six fields being a flags field 1420, an X1 field 1421, a Y1 field 1422, an X2 field 1423, a Y2 field 1424 and a data field 1425, describing the position of and data associated with a corresponding user interface element. For example, the flags field 1420 for the select button 1409 is a one byte field set to a hexadecimal value of '0x020' (0x representing hexadecimal notation), indicating that data associated with the select button 1409 is not to be transmitted in a release event, as described above with reference to Table 7. The X1 field 1421 associated with the select button 1409 is a one byte field set to a value of '0007' indicating the coordinate value of the bottom left hand point 1431 of the user interface element 1409 with respect to the top left point 1433 of the memory card 100C, as described above with reference to Table 6. The data field 1425 is a variable size field which in the case of the select button 1409 is a value corresponding to an 'Enter' and/or 'Carriage Return' function.

The memory card 100C also includes a card data object as described above with reference to Table 5. The card data object contains data that relates specifically to a particular smart card 100 and is normally transmitted as part of an INSERT message, upon the smart card 100 being inserted into the reader 300. In the case of the memory card 100C, the card data object indicates a URL, 'www.bluesguitarmasters.com', corresponding to the address of the 'Blues Guitar Masters' Internet site. A person skilled in the relevant art would appreciate that the URL is stored in the memory of the memory card 100C in a digital format corresponding to the ASCII values of the characters making up the URL. Alternatively, a card identifier can be stored in the memory of the memory card 100C and can be mapped to the URL.

The memory card 100C also includes a card identifier, as described with reference to Table 1, stored in the memory of the memory card 100C. The card identifier includes a service identifier which in the case of the memory card 100C can be mapped to the URL, 'www.bluesguitarmasters.com', corresponding to the address of the 'Blues Guitar Masters' Internet site. The card identifier also includes a service-specific identifier, which in this case is a three-byte vendor identifier related to the vendor of the Blues Guitar Masters Internet site. The service-specific identifier can be assigned by the provider of the service (e.g. the vendor of the Blues Guitar Masters Internet site), and can be equal to any particular three-byte value. Each card 100 associated with the 'Blues Guitar Masters' Internet site, for example, can have a different service-specific identifier.

For the CPU card 100D, the user interface elements 1514 are in the form of a numerical keypad 1560, an "OK button" 1562, a "cancel button" 1564, a "clear button" 1566, a "backspace button" 1568, and a four way directional controller 1570 printed on the front face 1556 thereof.

Figure 15A:
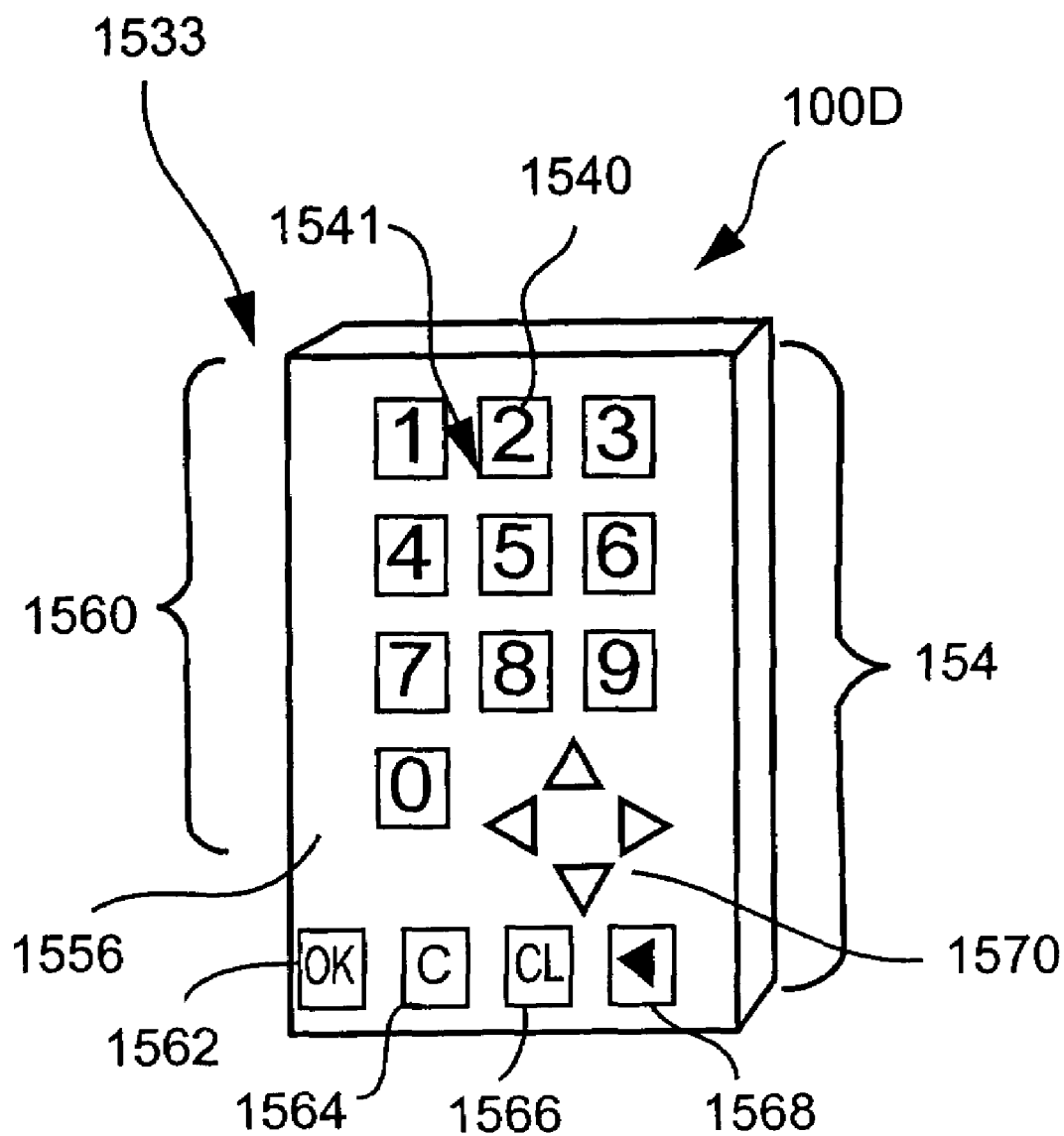
FIG. 15(a) is a perspective view of another smart card configured for numerical data entry.

Similar to the memory card 100C, each of the user interface elements 1514 of the CPU card 100D has at least one associated user interface element object (e.g. 1531) stored in a storage means (not shown) formed within the CPU card 100D similar to the storage means 276 of the CPU card 100B. Again, as described above with reference to Table 6 and as shown in FIG. 15(*b*), each of the user interface element objects (e.g. 1531) has six fields being a flags field 1520, an X1 field 1521, a Y1 field 1522, an X2 field 1523, a Y2 field 1524 and a data field 1525, describing the position of and data associated with a corresponding user interface element. For example, the X1 field 1521 associated with the "number 2 button" 1540 of the numerical keypad 1560, is a one byte field set to a value of "0005" indicating the coordinate value of the bottom left hand point 1541 of the user interface element 1540 with respect to the top left point 1533 of the CPU card 100D. The data field 1525 of the "number 2 button" 1540 is a variable size field which in the case of the CPU card 100D value corresponds to a hexadecimal representation corresponding to the ASCII value of the character '2'.

The CPU card 100D also includes a card data object, as described above with reference to Table 5. In the case of the CPU card 100D, the card data object indicates a URL (e.g. www.anz.com), corresponding to the address of an electronic banking Internet page. A person skilled in the relevant art would appreciate that the URL is stored in the storage means of the CPU card 100D in a digital format corresponding to the ASCII values of the characters making up the URL.

Similar to the memory card 100C, the CPU card 100D also includes a card identifier, as described with reference to a Table 1 stored in the storage means of the CPU card 100D. The card identifier includes a service identifier, which in the case of the CPU card 100D can be mapped to the URL corresponding to the electronic banking application (e.g. www.anz.com). The card identifier also includes a service-specific identifier, which in this case is a three-byte vendor identifier. The service-specific identifier can be related to the vendor of the electronic banking package (e.g. the Australia New Zealand Banking Group Limited). Again, each CPU card 100B associated with the electronic banking package, for example, can have a different service-specific identifier.

Figure 16:
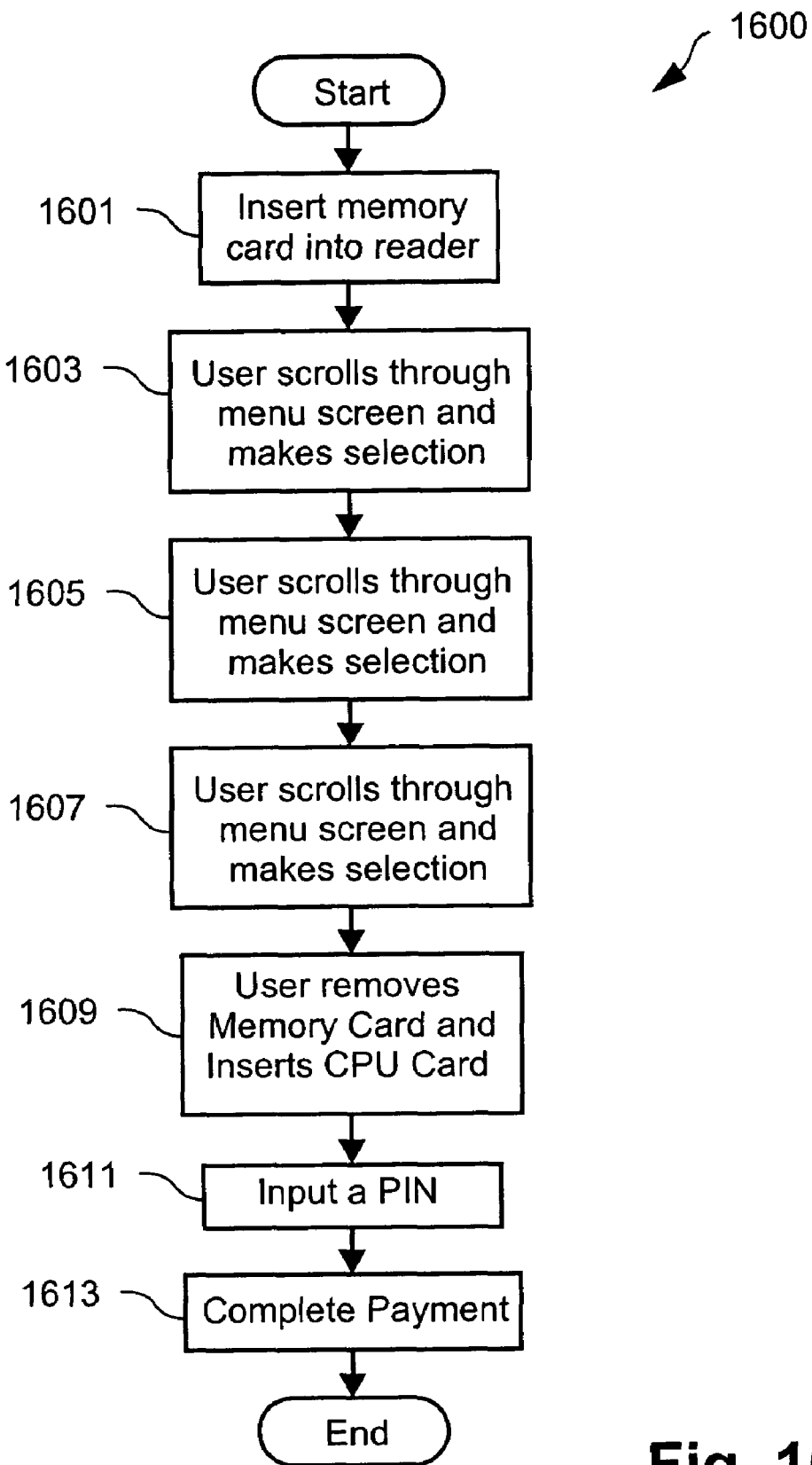
FIG. 16 is a flow diagram showing steps performed by a user in order to retrieve on-line music, over the smart card interface system of FIG. 6(b)
Figure 17A:
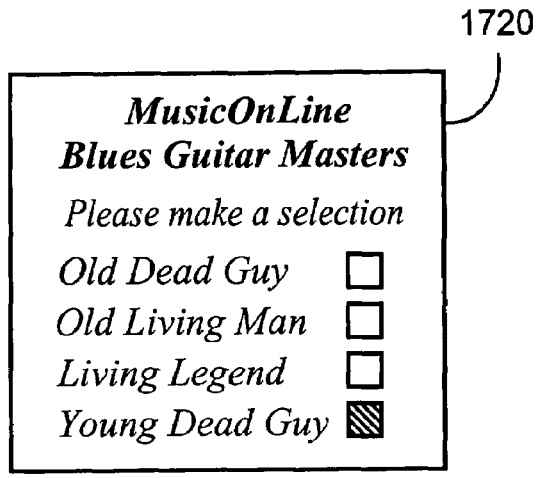
FIGS. 17(a) to 17(e) show a number of examples of display output available from the system of FIG. 6(b)
Figure 17B:
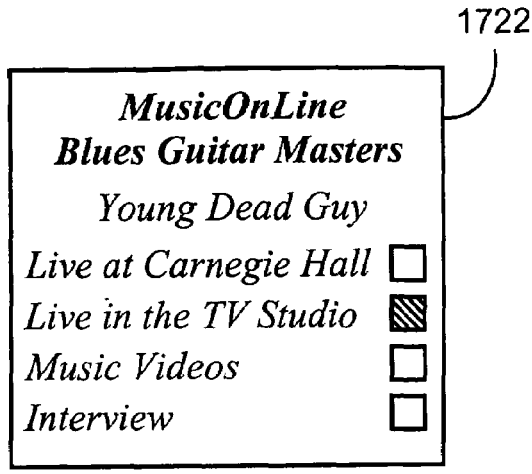
Figure 17C:
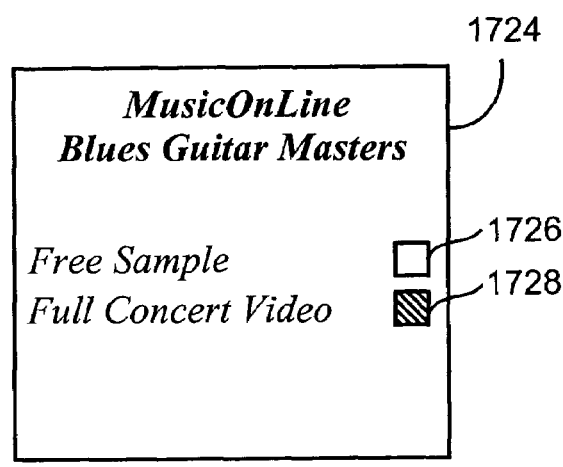
Figure 17D:
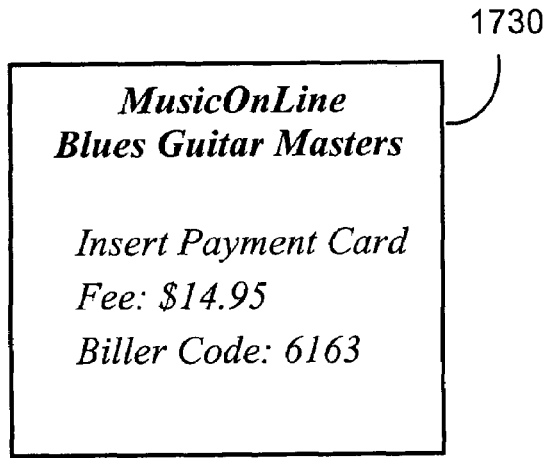
Figure 17E:
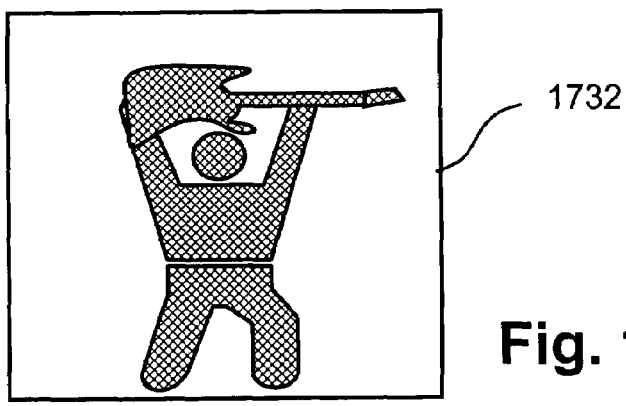

FIG. 16 is a flow diagram showing the steps 1600 performed by a user in order to retrieve on-line music associated with the Blues Guitar Masters Internet site, over the card interface system 600B. At the initial step 1601, the user inserts the memory card 100C into the reader 300. As will be explained in further detail later in this document, having inserted the memory card 100C into the reader 300, an application associated with the Blues Guitar Masters Internet page commences, for example on the server computer 650, and returns to the set-top box 601 for display on the output device 616 a first menu screen 1720, as seen in FIG. 17(*a*), relating to a function to be performed, in this case a selection of Blues Guitar Masters. Then at the next step 1603, using the reader 300 to select the two-way directional controller 1413, the user scrolls through the various offerings to make a desired selection, in this case for an artist called Young Dead Guy. In response to the user's selection, a further menu screen 1722, as seen in FIG. 17(*b*), is then displayed on the output device 616 advising the user of the possible selections that may be made. At the next step 1605, the user scrolls the menu screen 1722 by selecting the two-way directional controller 1413, and makes a further desired selection. In response to the user's selection at step 1605, a further menu screen 1724 is then displayed on the output device 616 as seen in FIG. 17(*c*) advising the user of the further possible selections that may be made. In accordance with this example, the user can access a free sample video clip or a full concert music video corresponding to the selection at step 1605, depending on the 'Quality of Service' that the user wishes to access from the Blues Guitar Masters Internet site. For example, if the user only wishes to access a one-minute free sample of the video clip corresponding to the selection at step 1605, then the user can select the 'Free Sample' item 1726 on the menu screen 1724. Otherwise, the user can select the 'Full Concert Video' item 1728 which will require the user to pay some associated fee for service. At the next step 1607, the user selects the 'Full Concert Video' item 1728. In response to the user's selection at step 1607, a further screen 1730 is then displayed on the output device 616 as seen in FIG. 17(*d*) advising the user to insert a payment card (e.g. the CPU card 100D) into the reader 300. The screen 1730 also advises the user of the fee amount and of a 'Biller Code' associated with the vendor of the Blues Guitar Masters Internet site. At the next step 1609, the user removes the memory card 100C and inserts the CPU card 100D into the reader 300. In accordance with the present example, at the next step 1611, the user presses one or more user interface elements 154 representing a personal identification number (PIN) by applying pressure to the touch panel 308 on or adjacent to each of the associated user interface elements 154. As will be explained in further detail later in this document, in response to the user entering the personal identification number, the CPU card 100D can buffer the personal identification number in an input buffer and compare the buffered personal identification number to a personal identification number stored in a storage means (not shown) of the CPU card 100D. If the CPU card 100D determines that the entered personal identification number is identical to the stored personal identification number then an application associated with the banking application Internet site commences, for example on the server computer 652, and returns to the set-top box 601 for display on the output device 616 a conventional banking application menu screen relating to a function to be performed, in this case a selection enabling the payment of the specified amount to the vendor identified by the displayed biller code. At the next step 1613, the user utilizes the user interface elements 1514 of the CPU card 100D to operate the banking application in order to complete payment for the full concert music video of the young dead guy. Once payment is completed, the Blues Guitar Masters application then retrieves the selection (i.e. the full concert music video of the Young Dead Guy), which is then streamed to the set-top box 616 for appropriate output as seen in FIG. 17(*e*). Since the music video is, in effect, a series of "live" images, as compared to the substantially static images of the menu screens 1720, 1722 1724 and 1730, the music video may advantageously be obtained and/or streamed from another location on the computer network 720 not associated with the generation of the menu screens 1720, 1722, 1724 and 1730.

2.0 Reader Infra-Red Data Transmission Architecture

As described above, the reader 300 is a hand-held, battery powered remote control device that interfaces a substantially transparent touch panel 308 with a smart card 100 to provide a customizable user interface. The reader 300 can be used with audio-visual output device 616/set top box 601 equipment to provide a simple, intuitive interface to consumer services in a home environment.

Any suitable transmission method can be used to communicate information from the reader 300 to a remote appliance module, including direct hard wiring, as described above. When the reader 300 is directly hard-wired to a device (e.g. the computer module 702), for example, as shown in the system 600A of FIG. 6(*a*), the reader 300 is configured primarily to act as a user input device for personal computers (e.g. the computer system 700).

Alternatively, when the reader 300 is configured for infra-red data transmission, for example, as shown in the system 600B of FIG. 6(*b*), the reader 300 can be programmed for obtaining a service locally at a set top box 601, that couples to an output interface, which in this example takes the form of an audio-visual output device 616, such as a digital television set. The reader 300 can also be used to control any appliances that are fitted with an infra-red receiver, and which have been conventionally been controlled using an infra-red remote control device, keyboard, pointing device, or some combination of the three. Unfortunately, for various reasons, there is no standard protocol used by various infrared devices.

One advantage of the reader 300, as described herein, is that the reader 300 does not operate exclusively using one infrared protocol so that the reader 300 is not restricted to a particular group of set-top boxes, or a single vendor of receiving equipment at the expense of others.

The reader 300 infrared data transmission architecture as will be described herein, firstly, allows the transmission of data using a wide variety of different infrared protocols that are already in use today. Secondly, the architecture provides a framework allowing easy porting of a range of different protocols to a user of the reader 300 by providing common firmware functions which rely on properties specified by an author, rather than requiring the author to rewrite much of the firmware code. Thirdly, the architecture provides a framework that allows custom protocols to be independently loaded easily into the reader 300 after the reader 300 has been deployed without affecting other protocols already installed in the reader 300. Fourthly, the architecture allows a smart card 100 to determine the infrared protocol to be used while the card 100 is inserted. Fifthly, the architecture allows a single user interface element to change a currently active protocol for a period of time. Such a period may range from a momentary change valid only while the current user interface element is active, through a change valid while a particular card 100 is present in the reader 300, to a persistent change that is valid until another persistent change is requested. Such a persistent change remains effective for any subsequent cards that are inserted, unless the persistent change is overridden by the same or a different card 100.

2.1 Infrared Protocols

The reader 300 can use many infrared protocols for data transmission. Although, the protocols differ in some aspects, there are several common attributes that are shared by a majority of the protocols, as will be discussed below.

2.1.1 Device Modes

As described above, with reference to Tables 9 and 10, the reader 300 can be effected in any one of four different device modes. Three of these device modes represent other existing devices (i.e., remote control, keyboard and mouse). The other device mode represents the reader application protocol. Remote control and keyboard messages are transmitted by the CPU 1045 of the reader 300 only during PRESS and RELEASE events, as described above. Raw data for these device modes can differ from protocol to protocol. For example, in one protocol the 'A' key is represented by the code 0x12, while in another protocol the 'A' key is represented by the code 0x1e.

Further, mouse messages are only transmitted during MOVE events. Raw data for mouse messages can differ from protocol to protocol. For example, one type of mouse device might report absolute coordinates, while another type of mouse device reports co-ordinates relative to the last position.

2.1.2 User Interface Card Messages

The user interface card reader device mode is used exclusively for messages sent according to the reader application protocol. As described above, at the application level, each message transmitted from the reader 300 to the set top box 601 or computer system 700 consists of a sequence of bytes, having a fixed length header 1100, a variable length body comprising zero or more object structures 1213. The length of the message is determined by values transmitted within the message header 1213 and the number of objects transmitted. In order to be transported by a particular protocol, a card message must typically be broken up into several fixed size packets.

On the other hand, when the reader 300 is sending remote control, keyboard or mouse messages, which typically transmit one or two bytes of data, each individual packet contains all of the message data for a particular message.

2.1.3 Packet Format

Figure 24:
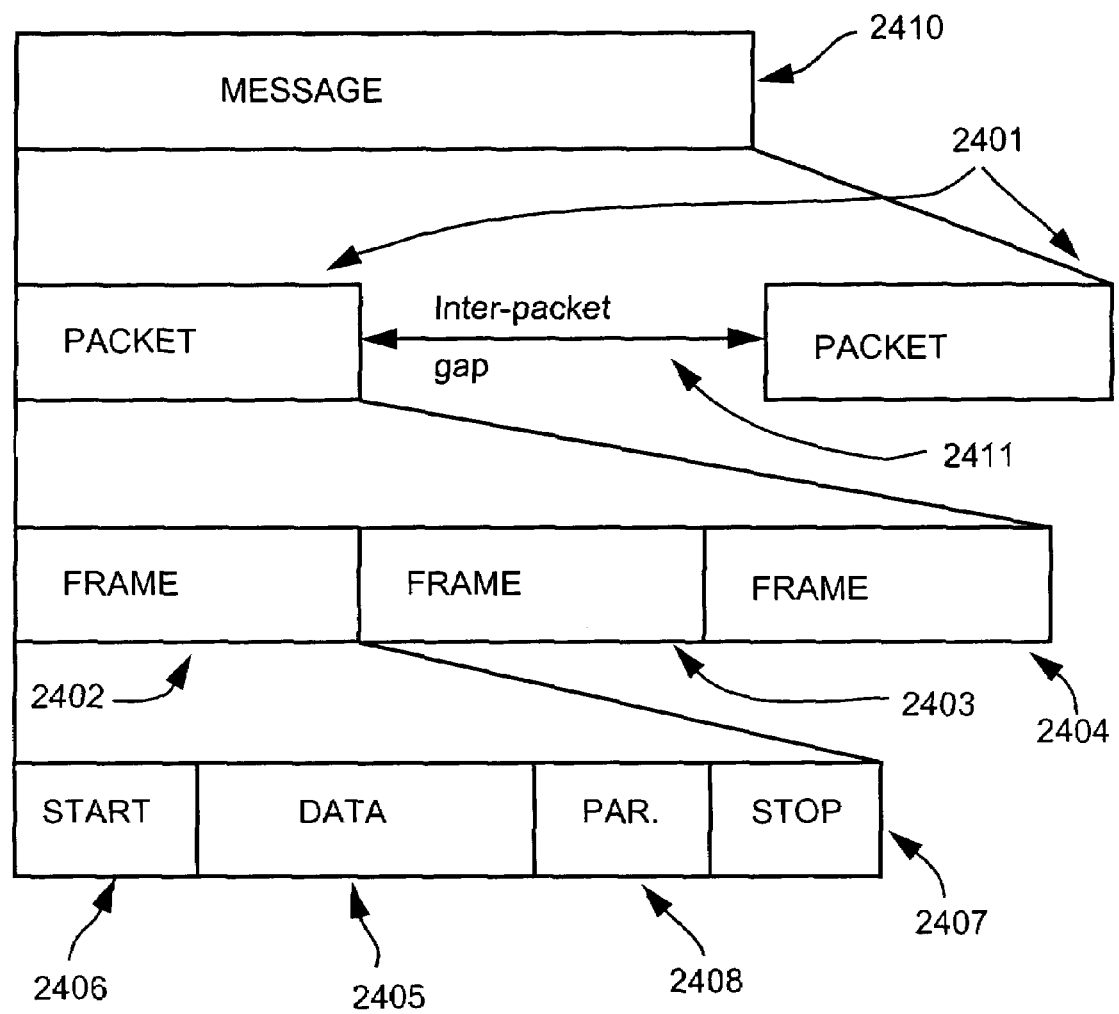
FIG. 24 shows the structure of a signal data transmission packet.

The structure of a message can vary from protocol to protocol. At the highest level, each message can be split up into one or more packets separated by an inter-packet gap 2411. Preferably, a single packet is utilized per message. The inter-packet gap 2411 is preferably of a set period during which the device does not transmit any data. Such a gap 2411 is used to ensure that repeated messages do not transmit more than necessary, which would increase the rate of battery drainage. As particularly seen in FIG. 24, a packet 2401 of a message 2410 can consist of one or more frames 2402, 2403 and 2404, each of which consists of data 2405 enclosed by start 2406 and stop 2407 bits and optional parity bits 2408.

While some of the data 2405 can be used to encode command data, other portions of the data 2405 can be used to encode object information such as a device identifier, a user identifier or error detection/correction codes.

2.1.4 Symbol Coding

As described in the Background section, the rate at which an LED is flashed ON and OFF is referred to as the "carrier frequency", and may vary with different protocols. Carrier frequencies employed by most protocols lie within the range of 36 kHz to 56 kHz.

When encoding data, some protocols encode one or more bits at a time into a single atomic unit that is transmitted. These units are referred to as symbols. While most protocols encode only one bit per symbol, there are several which encode more, such as those that use four pulse position modulation. In order to transmit a data string, each symbol of the data string must be encoded to form a combination of OFF and ON states in such a way that (a) each symbol can be easily distinguished from any other possible symbols and (b) the boundaries of each symbol are unambiguous 3.0 Reader Infra-Red Data Transmission System 3.1 Infra-Red Communications Characteristics 3.1.1 Transmission The infrared transmitter 1049 of the reader 300 is preferably an infrared light emitting diode (LED). Such a light emitting diode is typical of infrared light emitting diodes used in home/commercial remote control equipment.

3.1.2 Reception

The infrared receiver 1040 of the reader 300 is preferably an infrared photo detector module which integrates an infrared filter, a PIN diode (as known to those in the relevant art), amplifier circuitry and discriminator circuitry into a single device.

3.4 Firmware

Infrared data transmission from the reader 300 is preferably implemented using software resident in the memory 1046 and controlled in its execution by the CPU 1045. As described above, such software is generally referred to as 'firmware'. The firmware of the reader 300 will be describe in detail in section 7.0 below.

Figure 25:
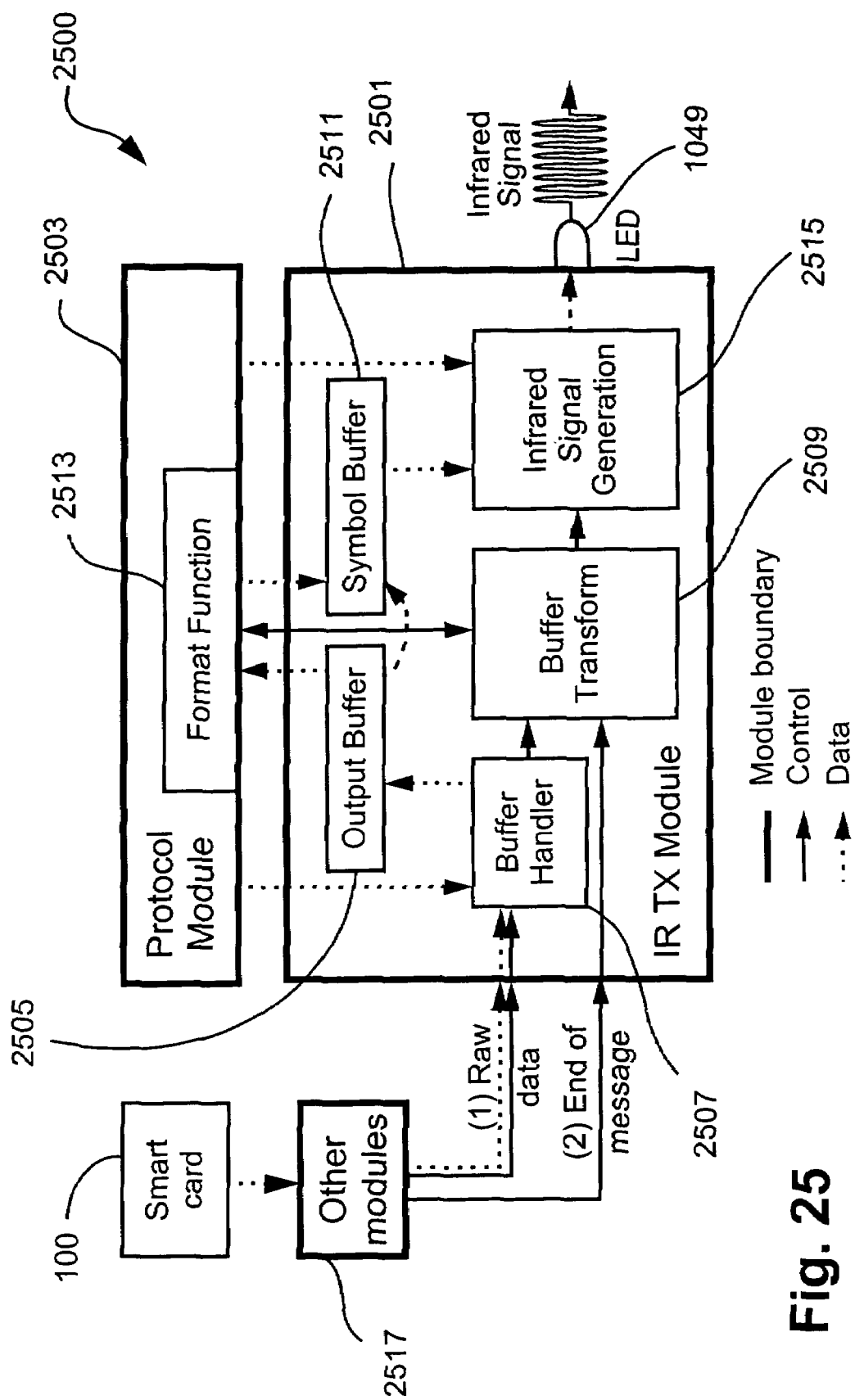
FIG. 25 is a schematic block diagram showing a software architecture for centrally controlled infrared transmission.
Figure 26:
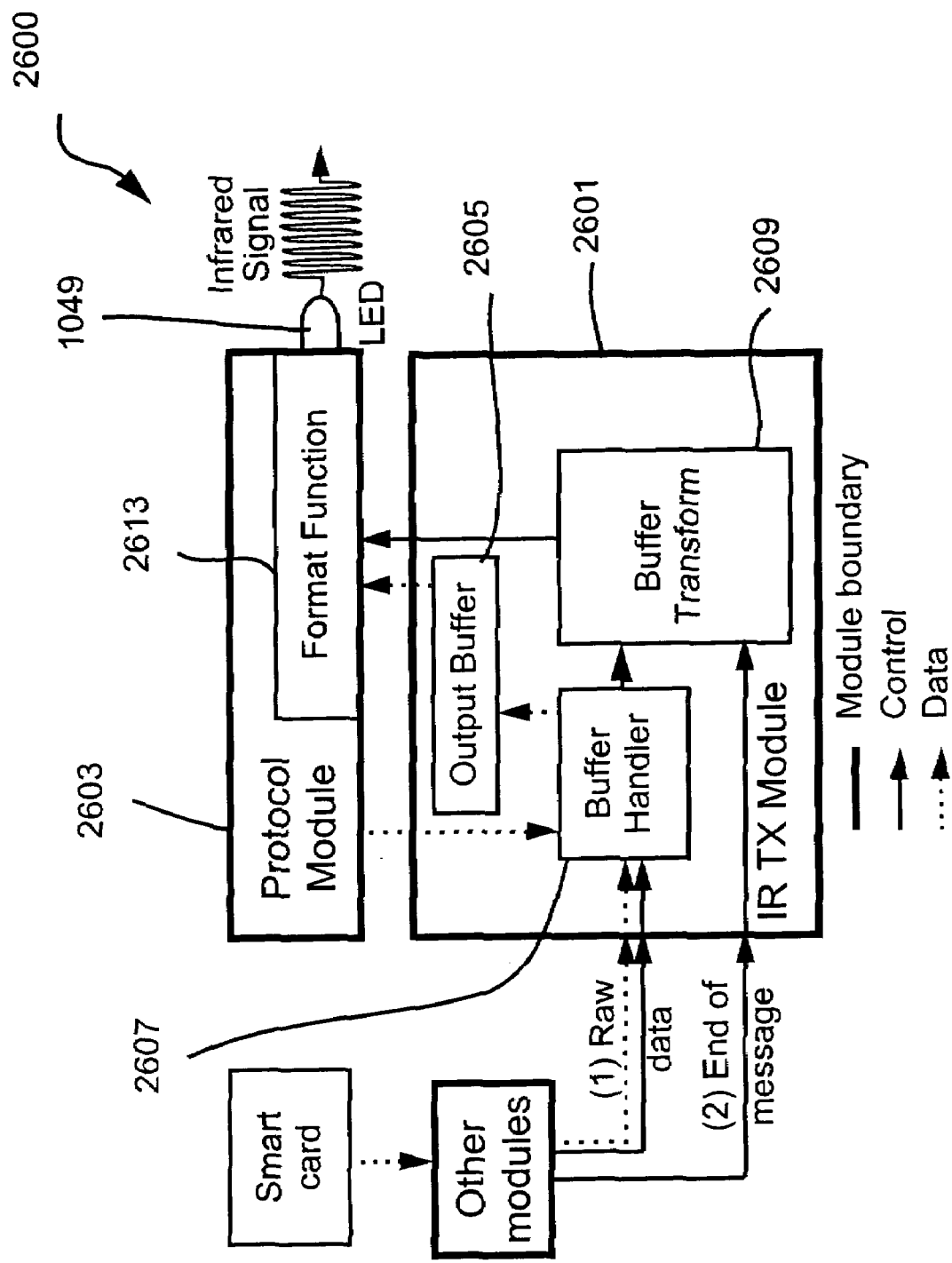
FIG. 26 is a schematic block diagram showing a software architecture for delegated control infrared transmission.

Two distinct infrared transmission architectures are described in the following sections. FIG. 25 is a schematic block diagram showing a first firmware architecture 2500, which is referred to herein as 'centrally controlled infra-red transmission'. FIG. 26 is a schematic block diagram showing a second firmware architecture 2600, which is referred to herein as 'delegated control infra-red transmission'. The architectures 2500 and 2600 both comprise an infra-red transmission software module 2501 and 2601, respectively, which operate in conjunction with one of a set of protocol modules 2503 and 2603, each of which comprise code and data defining a particular protocol. The two architectures 2500 and 2600 differ in the distribution of the functionality between the different modules of the architectures. The modules 2501, 2503, 2601 and 2603 are preferably resident in the memory 1046 and controlled in their execution by the CPU 1045 of the reader 300. As will be explained in more detail below, selection of the appropriate architecture 2500 or 2600 to use for a particular application of the reader 300 is performed on the basis of individual protocols.

3.4.1 Centrally Controlled Infra-Red Transmission

The infrared transmission module 2501 provides two entry points for data transmitted to the reader 300 by the smart card 100, via other processing software modules 2517, as follows:

Entry point (1): for receiving a single byte of data from the card 100; and Entry point (2): for completing a packet transmission by flushing an output buffer 2505 (seen in FIG. 25).

When more than one protocol module 2503 is present within the system, the transmission module 2501 interacts with the protocol that is currently active.

Entry point (1) is used whenever any byte is to be transmitted by the reader 300, for example, to the set top box 601. A buffer handler 2507 within the infra-red transmission module 2501, firstly, processes the byte and adds the byte to the output buffer 2505 configured within memory 1047. The output buffer 2505 stores all bytes that have been submitted for transmission by the reader 300, but have not yet been sent. The buffer 2505 facilitates the use of infrared protocols that send more than one byte of data at a time. The buffer handler 2507 looks up the currently active protocol module 2505, firstly, to perform keyboard or remote control code remapping (if required), and secondly, to determine the size of the output buffer 2505 in order to subsequently determine whether the buffer 2505 is full according to a current protocol as defined by the protocol module 2550. If the buffer is found to be full, the CPU 1045 passes control to the "Buffer Transform" stage 2509.

The buffer transform stage 2509 determines whether a format function is present within a currently active protocol module 2503. If so, the format function is invoked by the CPU 1045 to read the data from the output buffer 2505 and to combine the data with other information as required by the protocol defined by the module 2503, and transforming the data into a stream of symbols which are stored in a symbol buffer 2511. A format function 2513 defined in the protocol module 2503 returns a value which indicates a number of frames to be transmitted by the reader 300 in a current packet (e.g. the packet 2401). After the format function 2513 is completed, the CPU 1045 returns control to the buffer transform stage 2509 of the infra-red transmission module 2501, which then enters an "Infrared Signal Generation" stage 2515.

If a format function 2513 is not present in the current protocol module 2503, then the CPU 1045 preferably performs a default action in order to copy the contents of the output buffer 2505 directly into the symbol buffer 2511. The CPU 1045 then schedules for transmission of enough frames to include all raw data required to be transmitted by the reader 300.

The infrared signal generation stage 2515 begins by programming the timer interface module 1060 of the microcontroller 1044, as discussed above, to overflow in one period of the carrier signal. The timer interface module 1060 is preferably also programmed to toggle an infrared output pin of the microcontroller 1044 when half of the carrier signal period has expired, and again when the full period has expired, which effectively generates a signal with a 50% duty cycle. Using the data provided in the protocol module 2503, the positions of start (e.g. 2406), stop (e.g. 2407) and parity symbols (e.g. 2405) are determined for the current packet to be transmitted by the reader 300. Data is retrieved from the symbol buffer 2511 for transmission, one symbol at a time. All symbols are transmitted by the reader 300 according to associated symbol definitions, which are also read from the protocol module 2503, and comprise a data string where a zero bit represents the OFF state, and a one bit represents the ON state.

States are changed by switching control of the infra-red transmitter 1049, shown as a light emitting diode in FIG. 25, between the microcontroller 1044, which emits a steady voltage to keep the light emitting diode powered off, and the timer interface module 1060, which has been configured as described above to emit a wave at the required carrier frequency.

Entry point (2) is generally invoked by the CPU 1045 after checksum characters have been transmitted by the reader 300 with a transmitted packet. For entry point (2) of the architecture 2500, the buffer handler stage 2507 is bypassed, since there are no characters provided when entry point (2) is invoked. The purpose of the CPU 1045 invoking entry point (2) is to ensure that the end of a message is transmitted by the reader 300 even if the output buffer 2505 of the reader 300 is not full. Otherwise, the last few characters of a message packet can end up being transmitted only when a subsequent message is transmitted by the reader 300.

In some implementations of the reader 300, the output buffer 2505 can be merged with the symbol buffer 2511 in order to conserve memory 1047.

The other software modules 2517 as mentioned above, include modules for processing coordinates supplied by the touch panel 308, for initializing the card 100 and for processing commands which do not conform to standard interfaces, but are specific to an application resident on the card 100, for example.

3.4.2 Delegated Control Infra-Red Transmission

The delegated control infrared transmission architecture 2600 is variation of the centrally controlled infrared transmission architecture 2500 described above. The architecture 2600 comprises a buffer handler 2607, an output buffer 2605, a buffer transform 2609 and a format function 2613, and operates in a similar manner to that described above for the architecture 2500. However, the architecture 2600 can be used to implement different kinds of protocols, which cannot be generated by the infrared signal generation stage 2515 of the architecture 2500. The format function 2613 controls the infrared transmitter 1049, so that the protocol module 2603 is responsible for all aspects of transmission other than the initial buffering stage. The architecture 2600 will be further described in the following sections.

4.0 Protocol Modules

As described above, a protocol module (e.g. the module 2503) is a set of bytes containing data and a format function, which defines an infrared protocol. A protocol module can be stored in the memory 1046 of the reader 300, or on a portable storage medium, such as the memory chip 219 or the storage means 276 of the cards 100A and 100B, respectively. Alternatively, the protocol module can be transmitted directly by a device, such as the computer 700 or set top box 601, to the reader 300 using a communications link such as an infrared receiver 1040.

Figure 27:
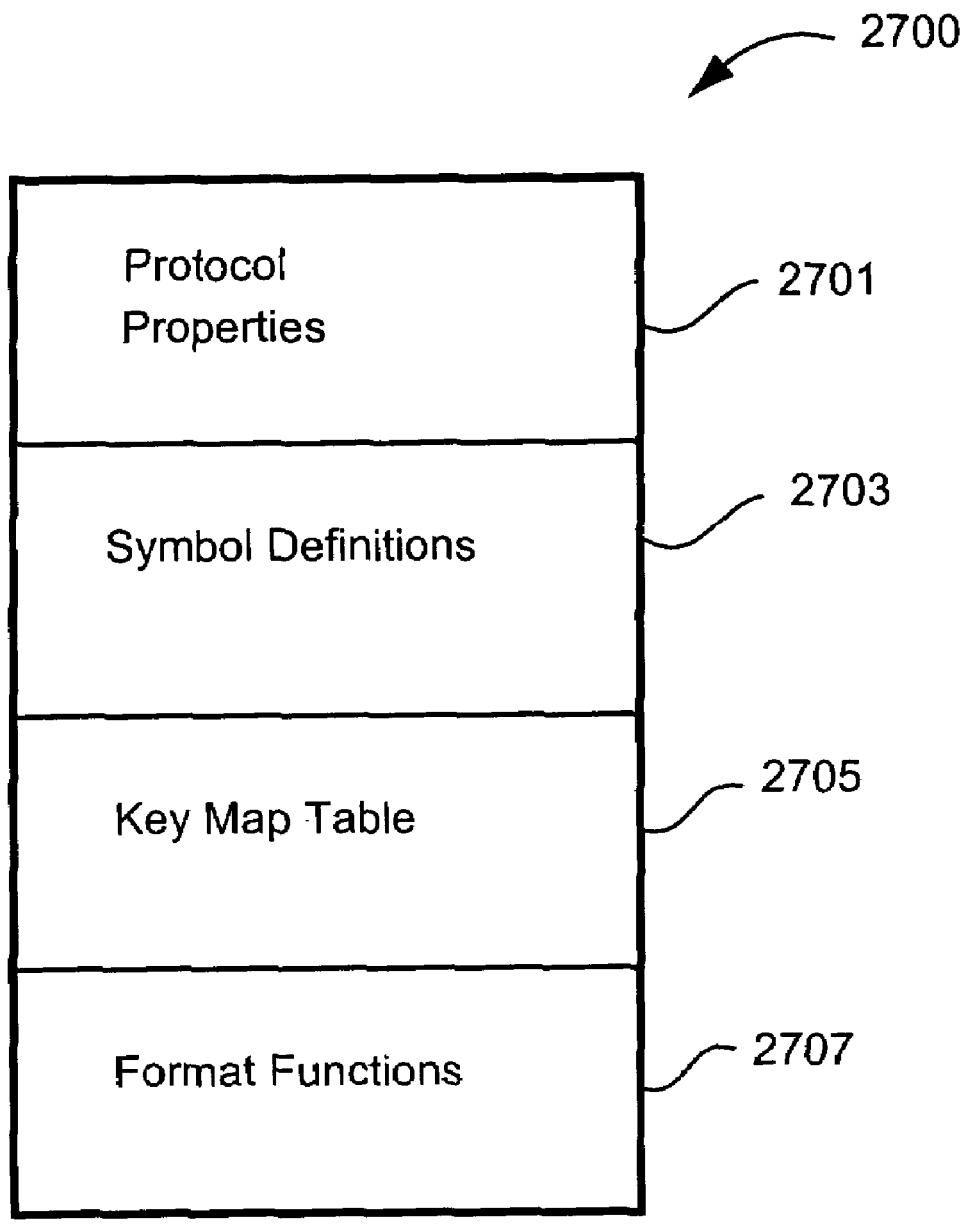
FIG. 27 shows the structure of a protocol module.

FIG. 27 shows the structure of a protocol module 2700. The protocol module 2700 comprises a portion 2701 defining the properties of a protocol, such as a protocol identifier, carrier period and the number of symbols per frame, for example. The protocol module 2700 also comprises a portion 2703 defining symbol definitions for each distinct symbol used by a protocol defined by the protocol module 2700. A key map table 2705 can also be included in the protocol module 2700 for converting a generic key code intended for use with any keyboard or remote control into a key code that complies with the protocol that the transmission is currently using. Finally, the protocol module 2700 also includes a format functions portion 2707 defining a format function for converting a bit stream into a suitable format for transmission by the remote reader 300 according to the protocol identified by the protocol identifier. The protocol properties portion 2701, the symbol definitions portion 2703, the key map table portion 2705 and the format functions portion 2707, will be described in more detail below.

4.1 Protocol Properties

The protocol properties portion of the protocol module 2700 is formatted in a structure, which contains the elements shown in Table 18, below.

TABLE 18

| Name | Description | Length |
| --- | --- | --- |
| Module syntax version | A version number which indicates the structure of subsequent data. This specification describes version 1. | 1 byte |
| Protocol Identifier | The protocol identifier assigned by a central authority to refer to the current protocol. Values of 0, 0xfe and 0xff are reserved. | 1 byte |
| Flags | A bitfield representing some protocol properties. | 1 byte |
| Output buffer length | The number of raw data bytes to be transmitted at a time when using a generic protocol (not keyboard, Mouse or RC) | 1 byte |

TABLE 18-continued

| Name | Description | Length |
| --- | --- | --- |
| Carrier period | The period of a carrier pulse, in microseconds. | 1 byte |
| Chip length | The length of a single chip, in microseconds. A chip is defined to be an atomic time unit - all timings used in the protocol should be multiples of this basic chip length. | 2 bytes |
| Symbols per frame | The number of symbols present in a single frame | 1 byte |
| Bits per symbol | The number of data bits represented by each symbol. | 1 byte |
| Gap length | The length of the gap (e.g., 2411) between two successive packets, in milliseconds | 2 bytes |
| Standard Format function | A pointer to the function called to format application protocol data into the correct bit stream. | 1 byte |
| RC Format function | A pointer to the function called to format remote control data into the correct bit stream. | 1 byte |
| Keyboard Format function | A pointer to the function called to format keyboard data into the correct bit stream. | 1 byte |
| Mouse Format function | A pointer to the function called to format mouse data into the correct bit stream. | 1 byte |
| Keymap Table | A pointer to an lookup table used by the protocol when in keyboard or remote control mode, to translate standard key codes to protocol-specific ones. If this value is NULL, codes are transmitted unchanged. | 1 byte |
| Start definition | A pointer to the structure that defines the way a start symbol should be transmitted | 1 byte |
| Stop definition | A pointer to the structure that defines the way a stop symbol should be transmitted | 1 byte |
| '0' definition | A pointer to the structure that defines the way a '0' symbol should be transmitted | 1 byte |
| '1' definition | A pointer to the structure that defines the way a '1'symbol should be transmitted | 1 byte |

Additional symbol definition pointers may be present in the protocol properties portion 2701, as required. The pointers described in Table 18 are interpreted as offsets from the beginning of the protocol properties portion 2701, eliminating any need for absolute addresses and allowing the same structure to be defined outside the firmware of the reader 300, as well as conserving space in the memory 1047.

The flags shown in Table 19, below, are defined for the "flags" field in the protocol properties portion 2701:

TABLE 19

| Name | Description | Value |
| --- | --- | --- |
| Bit order | If bit order bit is set, each frame is transmitted most significant bit first. If not, the least significant bit is transmitted first. | 0x80 |
| Even parity | If the even parity bit is set, an even parity symbol is inserted at the end of each frame. | 0x40 |
| Odd parity | If the odd parity bit is set, an odd parity symbol is inserted at the end of each frame. | 0x20 |

4.2 Symbol Definitions

A symbol definition is required for each distinct symbol used by a protocol. The number of value symbols defined in each protocol module 2700 is equal to two to the power of the number of bits per symbol. In addition, start and stop symbols have associated symbol definitions. If two symbols are identical (e.g. in many protocols, a start symbol is simply a '0' symbol and a stop symbol is a '1' symbol), the pointers associated with each of the two symbols may refer to the same symbol definition structure in order to conserve memory 1047.

Symbol definitions have a structure as shown in Table 20.

TABLE 20

| Name | Description | Length |
| --- | --- | --- |
| Number of chips | The number of chips of predefined length that make up this symbol | 1 byte |
| Chip pattern | For each bit, a 0 indicates that the infrared transmitter (i.e., the LED) should be in the OFF state, and a 1 indicates that the LED should be in the ON state. The first bit to be transmitted is the least significant bit of the first byte. Subsequent bits are retrieved by moving left within the byte, and moving on to the next byte in the sequence after a byte is exhausted. There should be enough bytes in this sequence to accommodate all the bits required by the previous field. | 0 or more bytes |

4.3 Format Functions

The format function of a protocol module (e.g. the module 2700) converts the data in the output buffer 2505 into a bit stream which defines the way in which a packet is transmitted by the reader 300. Data to be processed by one or more format functions is read from the output buffer 2505, configured within the memory 1047 (i.e., random, access memory (RAM)), into the format functions portion 2707. After the data has been processed in accordance with one or more of the format functions, the data is placed in the symbol buffer 2511, also configured within memory 1047. The symbol buffer 1047 must include all data bits that are to be transmitted by the reader 300, including bits representing sequence numbers, checksum, device identifiers, user identifiers and any other data demanded by the protocol defined by the protocol module 2700.

The number of bits generated by a format function is equal to the frames per packet multiplied by the symbols per frame multiplied by bits per symbol. The latter two values (i.e. symbols per frame and bits per symbol) are defined in the protocol properties portion 2701 of the protocol module 2700. The number of frames in a current packet to be transmitted by the reader 300 is determined by the format function of the protocol module 2700, and returned by the format function portion 2707 to a caller module (e.g. the module the buffer transform 2509) of the format function.

Data to be output by the reader 300 is positioned so that the first eight bits to be transmitted are stored in the first element of an array configured within the transform buffer 2509, the next eight bits in the second element, and so on. The bit ordering within these bytes is controlled by a bit order flag in the protocol properties portion 2701 of the protocol module 2700.

Start, stop and parity bits are not inserted into the symbol buffer 2501, as start, stop and parity bits are automatically inserted by the infrared signal generation stage 2515 at frame boundaries of a message (e.g. the message 2410) to be transmitted.

The format function portion 2707 of the protocol module 2700 returns a value that indicates the number of frames to be transmitted by the reader 300.

Each protocol module 2700 of the reader 300 can implement up to four different format functions, with each format function corresponding to one of the four defined device modes (i.e., the remote control, keyboard, mouse and user interface card reader). The same format function can be used for two or more device modes, by ensuring that each of the applicable format function pointers refers to the same address.

4.4 Keymap Table

The keymap table 2705 of the protocol module 2700 is used to convert a generic key code intended for use with any keyboard or remote control into a code that complies with the transmission protocol currently being used by the reader 300. A keymap table, associated in the keymap table portion 2705, comprises an array of bytes, indexed by a generic key code, and contains protocol-specific codes used by each key.

Values are translated using the keymap table if the reader 300 is currently transmitting in keyboard or remote control mode.

4.5 Specialized Protocols

Some protocols transmit data too quickly to be able to be handled by a common transmission function. Other protocols use techniques such as frequency modulation, which cannot be easily implemented using such a structure. Such protocols typically require specialized software code to handle every aspect of transmission, which can be provided within the format function, as specified in the delegated control transmission architecture 2600 described above. Further, in the architecture 2600 the format function portion 2707 of the protocol module 2700 indicates that the central infra-red signal generation stage 2515 of the architecture 2500 is not to be entered in the architecture 2600 by setting the number of frames per packet to zero.

4.6 Protocol Module Placement

The firmware maintains, within the memory 1046 (i.e., Flash Memory 1046) of the reader 300, a list of protocol modules (e.g. the module 2700), which are also stored in memory 1046. In some firmware implementations for the reader 300, a page size is defined, wherein no two protocol modules 2700 can share a page. Such a page size is defined since FLASH memory must be typically erased at a minimum of one page at a time. Thus, the length of each protocol module 2700 must be rounded up to the next multiple of the basic page size, minus one, since one byte is reserved to store the page length itself. For example, the page size of a typical microcontroller is 64 bytes.

Figure 28:
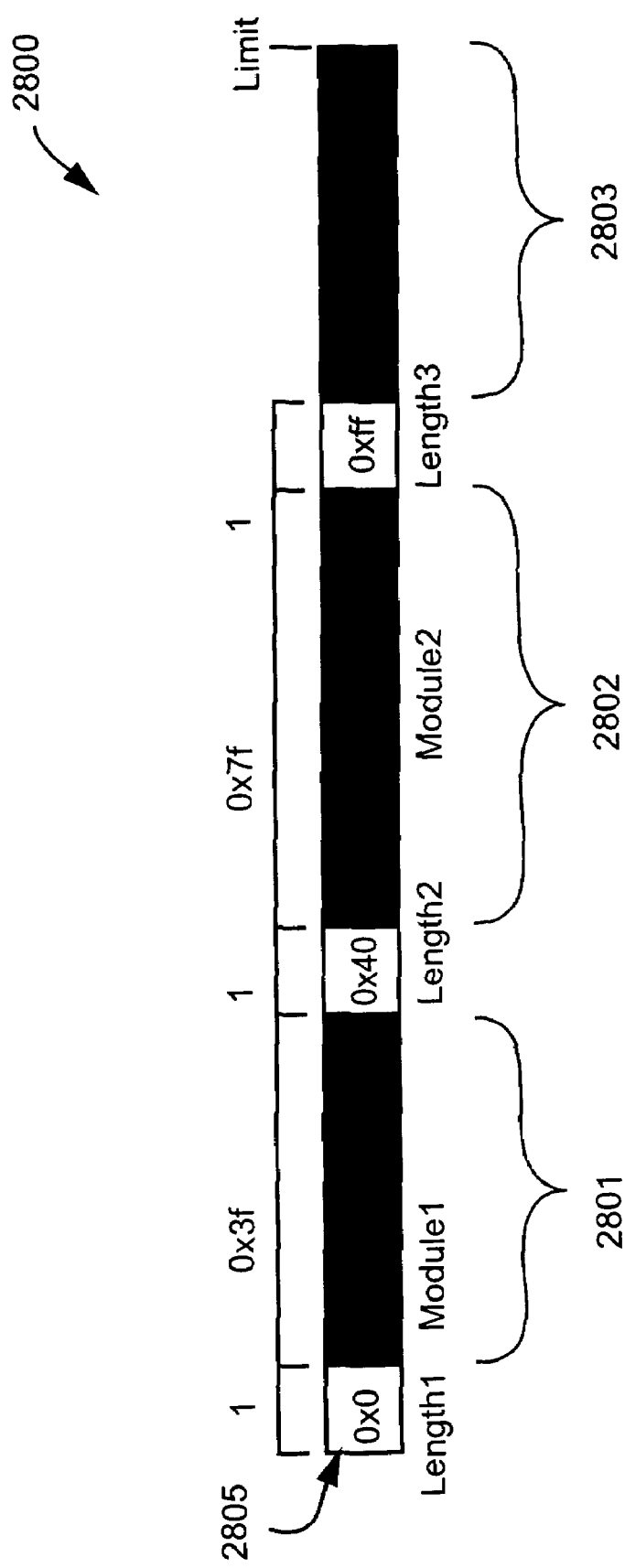
FIG. 28 shows a protocol module list.

An example of a protocol module list 2800 is shown in FIG. 28. Each protocol module (e.g. the module 2801) is introduced by a single byte 2805 indicating the length of the module 2801, followed by the module 2801 itself. The length of a particular protocol module (e.g. the module 2801) is represented by the difference between the length of the particular module 2801, and the minimum allowable length of a protocol module as defined by the page size of memory 1046. Thus, for example, for the microcontroller 1044, if the minimum module length is 63 bytes. A 63 byte module (e.g. the module 2801) would thus be represented by the value 0x0, a 127 byte module (e.g. the module 2802) by the value 0x40, and so on. Using this structure, a protocol module may exceed 256 bytes in length even though the length field of the protocol module is one byte long The module list 2800 is searched by the CPU 1045 whenever a different protocol is activated by the reader 300, or whenever a new module 2700 is added or an old module 2700 is removed from the list 2800. In order to locate a module 2700, the firmware being executed by the CPU 1045 of the reader 300 searches the list 2800 from the beginning, skipping over any non-matching modules. Such a search is terminated by the CPU 1045 when a length of 0xff is encountered, indicating the lack of a module 2700, or when the limits of the area for storing protocol modules in memory 1046 are exceeded.

When deleting a protocol, any protocols existing beyond the deleted protocol in the list 2800 stored in memory 1046, are relocated to begin in the newly erased area of the list 2800.

4.7 Storage and Transfer of Protocol Modules

If a protocol is required that is not supported within the firmware of the reader 300, a new protocol module 2700 can be loaded into the firmware using a card 100 that contains a download protocol module object. The data on the card 100 is formatted according to the extended data format, as described above in section 1.6.3.2.1.

An extended data sub-object having a tag of 0x08 contains a custom protocol module definition. When such a sub-object is activated (e.g. either on insert of the card 100 into the reader 300 or on press of a user interface element 114), the data of the sub-object is loaded into the firmware of the reader 300. The data of the sub-object contains a protocol module 2700 as described above.

Software code for the protocol module 2700 is checked before being downloaded into the memory 1046 of the reader 300, in order to ensure that the protocol module will not access any data structures or jump to any locations that are deemed to be dangerous or forbidden, as will be described below.

A custom protocol can be given a protocol identifier, which can be used to reference the protocol module directly by any subsequently inserted cards 100. Special protocol identifiers of 0xf0 to 0xfe are reserved to denote temporary custom protocols, which are overwritten when a new custom protocol with the same identifier is loaded.

If there is not enough space in the memory 1046 present to load a given custom protocol, another protocol is automatically selected by the CPU 1045 for eviction. Protocols currently defined as global protocols, as described in Table 10 above should not be deleted.

5.0 Protocol Selection and Use

The reader 300 has one or more protocols stored within memory 1046 as corresponding protocol modules 2700. Two factors determine which protocol is to be used for any particular message to be transmitted by the reader 300. Firstly, the current state of the reader 300 and secondly, instructions provided by a currently inserted card 100 to change protocols.

The protocol module 2700 currently in use based on these two factors is referred to as the currently active protocol. The process of modifying the currently active protocol will be described in detail below.

5.1 Device Modes

Device modes have been described herein in order to enable the reader 300 to emulate other devices. These modes are referred to as a user interface card reader mode, remote control mode, keyboard mode and mouse mode, and will be described in detail below. These device modes are defined rather than relying on software installed in the set-top box 601, for example, to perform the emulation of the above devices on receiving messages conforming to a particular protocol (e.g. a user interface card application layer), or to allow the reader 300 to control devices that do not recognise the reader application protocol, such as existing televisions, VCRs etc.

Some specific protocol parameter flags, which will be described in section 5.8 below, indicate to the CPU 1045 that the reader 300 is to behave as a different device on certain events. The flags can effect the way that data is encoded before being transmitted by the reader 300. Each protocol mode is associated with a particular format function. If the author of a protocol module 2700 wishes to use the same format function for more than one protocol mode, then all applicable format function pointers in the protocol properties portion 2701 of the protocol module 2700 can be configured to reference the same code entry point.

When operating in a device mode other than the user interface card reader device mode, user interface card message headers (e.g. the header 1100) and trailers can be omitted. A "send button output data only" flag, as will be described below, can also be used when the user interface reader device modeis selected for a given message type.

5.1.1 Remote Control and Keyboard Modes

The reader 300 can be configured to be in a remote control mode or a keyboard mode. When in remote control mode or keyboard mode, reader INSERT, PRESS and RELEASE events, as described above, can result in transmissions so as to emulate a wireless remote control or keyboard protocol as known to those in the relevant art.

Many remote control and keyboard protocols use non-standard encodings as key codes. Protocol modules (e.g. the module 2700) that handle such keyboards can translate standard key mappings in one of two ways. Firstly, a protocol module 2700 can use a lookup table stored in memory 1046, which is referenced by the protocol properties portion 2701 of the module 2700. Such a lookup table contains mappings for every possible key code for the particular remote control or keyboard. Secondly, the protocol module 2700 can use a smaller lookup table or another mapping function, handled by custom software code within an associated format function of the module 2700. Additionally, modifier flags configured within memory 1046 can be set independently to affect the properties of any keyboard or remote control transmission from the reader 300. Modifier flags generally represent states that instruct the reader 300 to emulate the condition of keyboard keys such as shift (Shift) or control (Ctrl), or mouse buttons. The format function 2700 for a particular keyboard or remote control protocol converts these flags which are maintained by the firmware of the reader 300 into specific codes used by a particular protocol where necessary.

When in remote control or keyboard mode, two raw data bytes are processed per packet to be transmitted by the reader 300.

5.1.2 Mouse Mode

When in mouse mode, reader MOVE events result in reader transmissions that emulate mouse movements. In this instance, the format function of a currently active protocol module 2700 converts absolute co-ordinates typically transmitted using a generic card reader 300 protocol into relative co-ordinates used by most mouse protocols.

When in mouse mode, two raw data bytes are processed per packet. One of these bytes represent an absolute or relative X co-ordinate, while the other represents an absolute or relative Y co-ordinate.

5.2 Factory Default Protocols

The firmware of the reader 300 is preferably configured to recognize a factory default protocol for each of the device modes (i.e., card reader, remote control, keyboard, mouse). Besides an assigned protocol identifier, factory default protocols can be referenced by using a special protocol identifier of 0xff, for example.

5.3 Global Protocols

The firmware of the reader 300 is also configured to recognize several global protocols, which are to be used in the following situations:

- When no card 100 is present in the reader 300;
- When a bad card is present in the reader 300; and
- When a valid card 100 is present, but no alternative non-global protocol is active in the reader 300.

A global protocol is implicitly selected by the CPU 1045 of the reader 300 with no knowledge of what the details of the global protocol actually are. Separate global protocols can exist, depending on whether the reader 300 is operating in reader, remote control, keyboard or mouse emulation mode.

The global protocols typically do not change as long as the reader 300 is being used in a similar set-top box 601 environment.

The reader 300 is configured such that the global protocols are the protocols used by a target set-top box (e.g. the set top box 601). If the set-top box to be used with a particular reader 300 is changed, a global protocol for the reader 300 must be changed by either:

- Reprogramming the firmware of the reader 300;
- Using a special "protocol selector" card 100 or user interface element 114, which contains a "set global protocol" sub-object.

A global protocol can be referenced by using a special protocol identifier of zero.

5.4 Card Specific Protocols

A card specific protocol is a protocol that is active until the card 100 that is currently inserted into the reader 300 is removed. If a different protocol is selected, during a PRESS event, as the card specific protocol, the new protocol may simply completely override the existing card specific protocol. Alternatively, the new protocol may override the card specific protocol until the card specific protocol is selected once again by the processor 705, which will cause the reader 300 to revert to the original card specific protocol.

5.5 Temporary Protocols

A temporary protocol is a protocol, which is active for a certain number of PRESS events. Following the RELEASE event corresponding to the last PRESS event, a currently active protocol reverts to a card specific protocol, or, if such is not present, the global protocol for a system 600. The period of effectiveness of a temporary protocol can be chosen to be one of the following:

- The duration of a current PRESS event and te corresponding RELEASE event; and
- The total duration of the current PRESS event, the corresponding RELEASE event, and the following PRESS event and corresponding RELEASE event.

The period of effectiveness of a temporary protocol is specified by the least significant bit 2307 of the tag of a sub-object used to select the temporary protocol.

5.6 Changing the Protocol

A temporary or global protocol can be changed by configuring an object on the card 100 to encode information about the protocol. The object data must be formatted according to the extended data format, described above with reference to section 1.6.3.2.1. Suitable objects include user interface element objects, for protocols which are to be activated by pressing a user interface element (e.g. the user interface elements 2914), or card data objects, for protocols which are to be activated on insertion of the card 100 into the reader 300.

An extended data sub-object with a sub-object type of 0x01 changes the temporary protocol of a reader 300, according to the lower two bits of the tag corresponding to the sub-object, where the tag describes whether the protocol is a card specific or temporary protocol, and the period of effectiveness of the change in the case of the latter. A sub-object with a tag of 0x4, 0x5, 0x6 to 0x7 changes the global protocol associated with standard, remote control, keyboard and mouse modes respectively.

The data stored in the above-described sub-objects includes a protocol identifier, optionally followed by protocol parameter bytes. If not explicitly stated, a protocol parameter byte is taken to equal zero. Each protocol has a protocol identifier preferably assigned to the protocol by a central authority. If the reader 300 does not recognize a particular protocol because the protocol module associated with the protocol is not present in the memory 1046 of the reader 300, a currently active protocol is not changed and the reader 300 generates a BOOP to alert a user of the reader 300.

When a global protocol is selected using the special protocol identifier of zero, the remote control, keyboard and mouse mode flags configured within memory 1047 determine which global protocols are to be used during PRESS, RELEASE and MOVE events. Thus, if both keyboard and mouse flags are set, the keyboard protocol is used for PRESS and RELEASE events, and the mouse protocol is used for MOVE events, until the setting expires. If both keyboard and remote control flags are set simultaneously, the processor 705 of the reader 300 assumes that the reader 300 is in keyboard mode and not in remote control mode.

Figure 30:
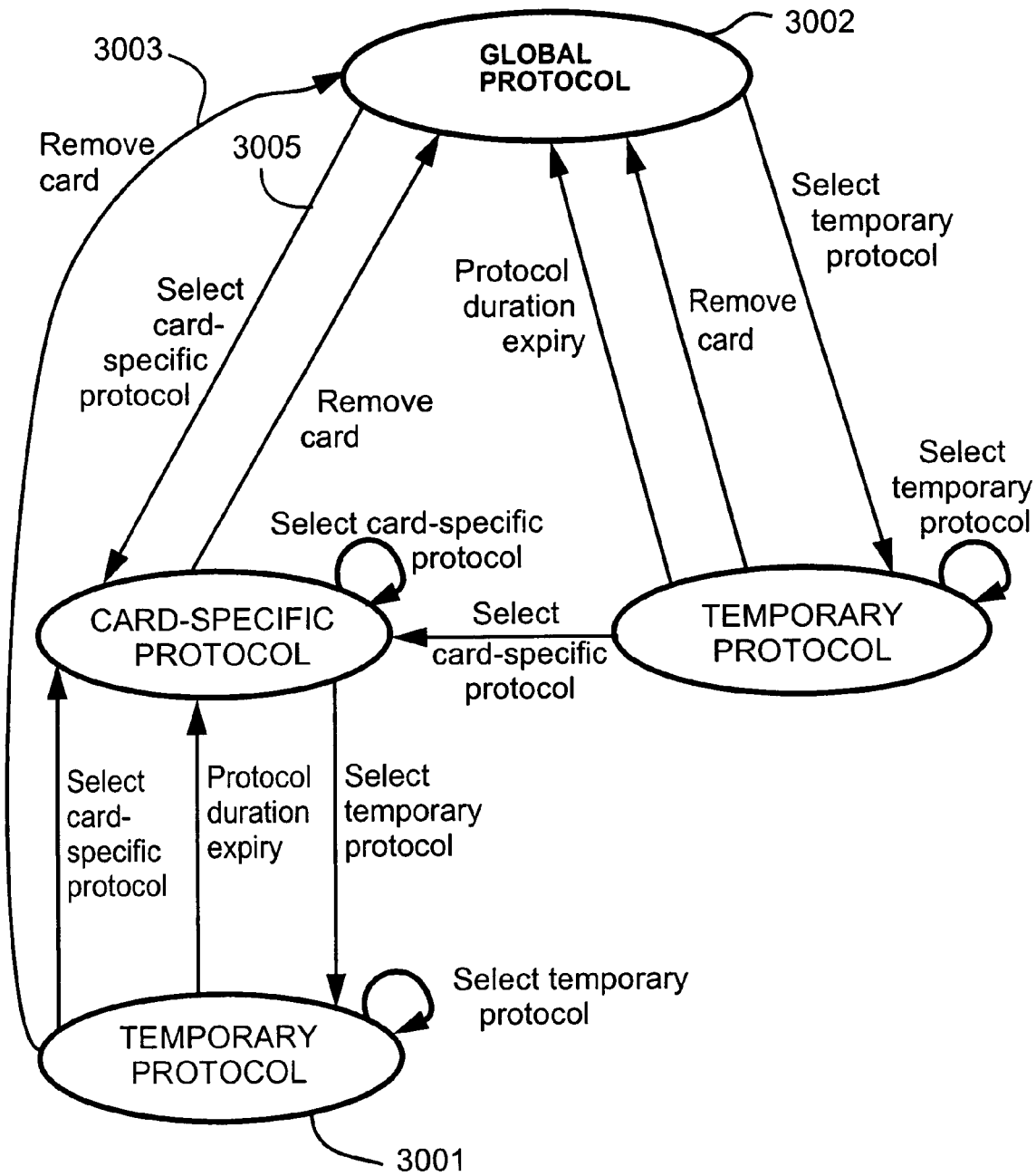
FIG. 30 is a state diagram showing the manner in which a currently active protocol can change between global, card specific and temporary states.

FIG. 30 is a state diagram showing the manner in which a currently active protocol of the reader 300 can change between global, card specific and temporary states. For example, if the reader 300 is using a temporary protocol, as represented by the state 3001, and a currently inserted card 100 is removed from the reader 300, as represented by the arrow 3003, then the reader 300 is reconfigured to use a global transmission protocol as represented by the state 3002. As another example, if the reader 300 is using the global protocol and a user selects a card-specific protocol, as represented by the arrow 3005, by using a special "protocol selector" card, as will be described below for example, then the reader 300 will be reconfigured to use the card specific protocol.

5.7 Protocol Identifiers

The following Table 21 displays the special protocol identifiers recognized by the user interface card reader with their meanings:

TABLE 21

| Name | Description | Value |
| --- | --- | --- |
| Global | This protocol identifier indicates that the current global protocol should be used. | 0 |
| Registered | The values of this protocol identifier represent a single known protocol which has been registered with a central protocol registration authority. | 0x01–0xEF |
| Custom Unregistered | Protocols with these identifiers are not registered with the central authority and do not have a unique identifier. Thus, each of these values may be shared with other completely different protocols. | 0xF0 to 0xFD |

TABLE 21-continued

| Name | Description | Value |
|---|---|---|
| Factory default | This protocol identifier points to the factory default protocol defined when the firmware was loaded. The factory default protocol cannot be changed. | 0xFE |
| No Protocol | The value of this protocol identifier represents the absence of a protocol and the reader 300 would transmit no signal. | 0xFF |

All other values can be assigned by a central protocol registration authority.

5.8 Protocol Parameters

Some aspects of transmission using a currently active protocol rely on additional parameters, which are specified at the time that the protocol is selected. The first parameter byte is always a flag byte, which has the following possible values as shown in Table 22 below:

TABLE 22

| Name | Description | Value |
|---|---|---|
| Send output data only | The header, checksum and any other non-object data such as co-ordinates or lengths are not transmitted while this protocol is active in user interface card reader mode - only the message payload is sent. | 0x80 |
| RC mode | The reader should behave as a remote control device. Depending on the protocol, insert, press and release messages might be handled differently to other messages. | 0x40 |
| Keyboard mode | The reader should behave as a keyboard device. Depending on the protocol, insert, press and release messages can be handled differently to other messages. | 0x20 |
| Mouse mode | The reader should behave as a mouse device. Depending on the protocol, move messages might be handled differently to other messages. | 0x10 |

Any additional protocol parameter bytes can be used to encode settings specific to the protocol being used, and are handled directly by a protocol format function associated with a protocol module. Typically, the additional protocol parameter bytes encode information such as device identifiers.

7.0 Fireware Routines

The firmware resident on the reader 300 will now be described in further below in sections 7.1 to 7.23.

7.1 Main Loop

Figure 31:
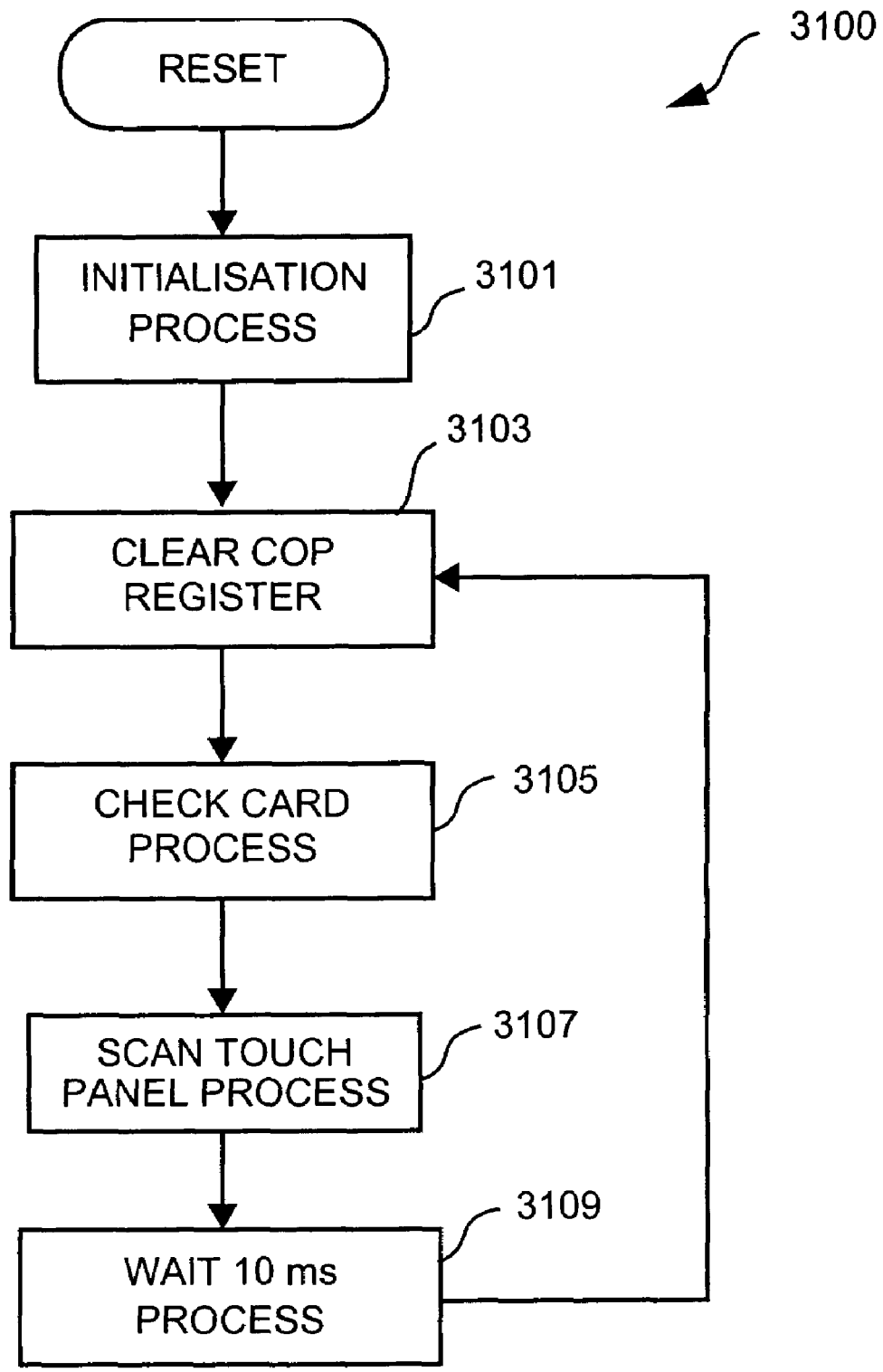
FIG. 31 is a flow diagram showing a read process performed by the remote reader of FIG. 3.

FIG. 31 is a flow diagram showing a read process 3100 performed by the remote reader 300. The process 3100 is preferably implemented as software resident in the memory 1046 and controlled in its execution by the CPU 1045. The process 3100 begins after a reset of the reader 300 has been occurred such as after the reader 300 has been powered down. The process 3100 of FIG. 31 is configured in a "paced loop" manner. That is, the process 3100 is paced by a routine, which generates a 10 millisecond delay. This delay gives adequate service to the necessary routines while providing good latency for the handling of interrupts.

At the first step 3101, an initialization process is performed by the CPU 1045. The initialization process is performed in order to initialize configuration registers and will be explained below with reference to FIG. 32. At the next step 3103, a computer operating properly (COP) register configured within memory 1046 is cleared indicating that the firmware executing on the reader 300 is not stuck in any recurring loops. The process 3100 continues at the next step 3105, where a check card process is performed, by the CPU 1045, to check for any changes in the presence and validity of a particular smart card 100. The check card process will be explained in more detail below with reference to FIG. 33. At the next step 3107, a scan touch panel process is performed by the CPU 1045 to check for any touches on the touch panel 308 by a user. The scan touch panel process will be explained in further detail below with reference to FIG. 36. At the next step 3109, a wait 10 millisecond process is performed by the CPU 1045, and the process 3100 then returns to step 3103. The wait 10 millisecond process consumes CPU 1045 cycles and will be described in more detail below with reference to FIG. 51.

7.2 The Initialization Process

After a reset of the reader 300, all configuration registers configured within the microcontroller 1044 require correct initialization. If a low voltage inhibit (LVI) reset was received by the CPU 1045 then a "possibly depleted battery" flag configured within memory 1047 is set. A low voltage inhibit reset is initiated when a circuit (not shown) within the microcontroller 1044 detects that the supply voltage has fallen below 2.4 Volts. When this kind of reset occurs, a flag is set in a Reset Status Register (RSR) and the initialization process of step 3101 can deduce that the battery 1053 is becoming depleted. For example, when infrared data is being transmitted, the infrared transmitter 1049 consumes high current as the transmitter 1049 is being pulsed. If the battery 1053 is depleted, the supply voltage can dip under the 2.4 Volt threshold during transmission causing a low voltage inhibit reset. After reset, the battery 1053 voltage recovers and the low voltage inhibit reset does not occur until the next high current drain. This gives the remote reader 300 a chance to flag the failing of the battery 1053 to an associated set-top box (e.g. the set-top box 601) or remote equipment (e.g. the computer 700) so that the user can be prompted to replace the battery 1053.

Figure 32:
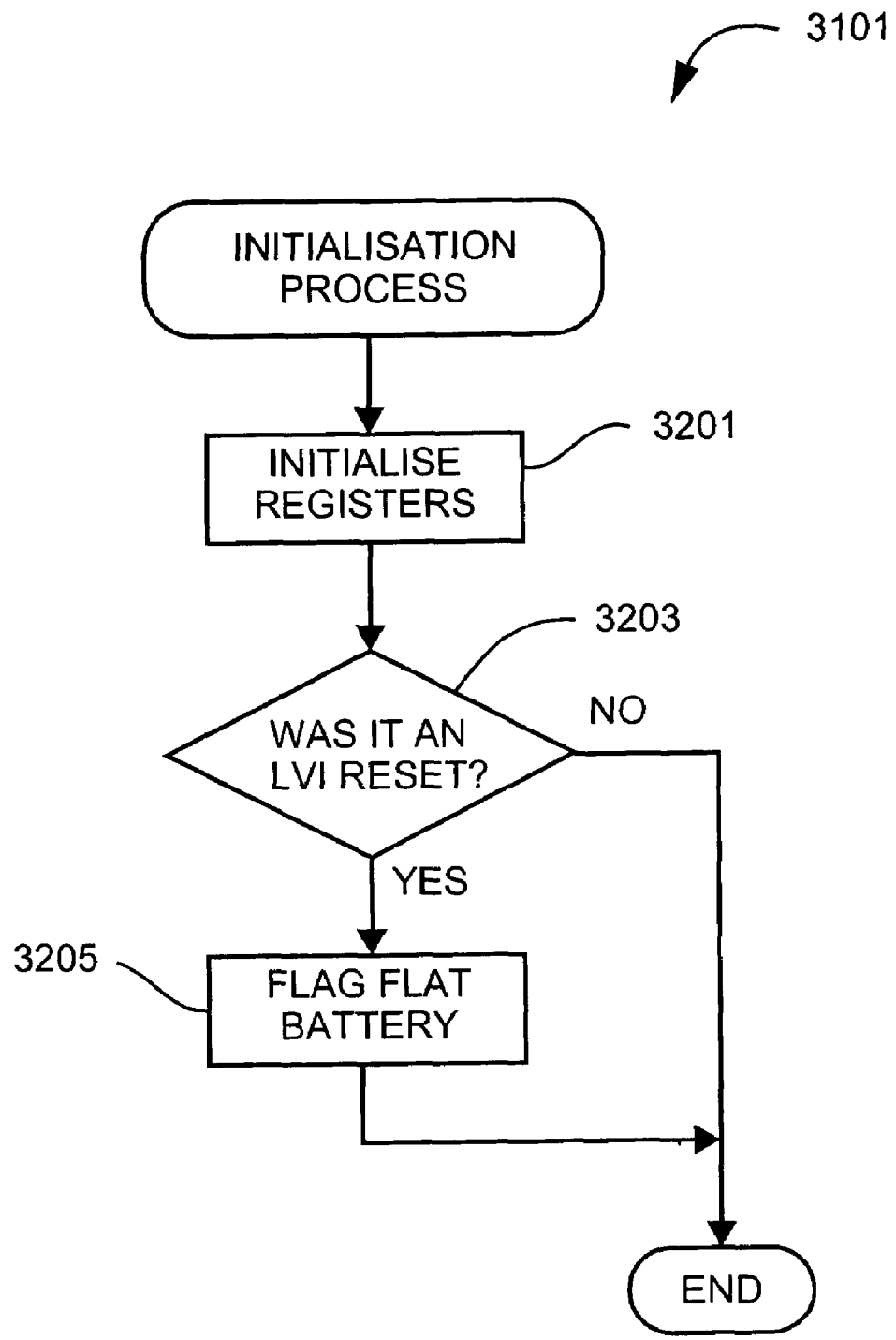
FIG. 32 is a flow diagram showing an initialization process performed during the process of FIG. 31.

FIG. 32 is a flow diagram showing the initialization process performed at step 3101, by the CPU 1045, after a reset has been detected by the CPU 1045. The process of step 3101 is preferably implemented as software resident in the memory 1046. The process of step 3101 begins at step 3201 where all registers configured within memory 1046 are initialized to a predetermined default state. At the next step 3203, a check is performed by the CPU 1045 to determine if the reset was a low voltage inhibit (LVI) reset. If the reset was not a low voltage inhibit reset at step 3203, then the process of step 3101 concludes. Otherwise the process of step 3101 proceeds to step 3205 where the possibly depleted battery flag is set and then the process of step 3101 concludes.

7.3 Check Card Process

Figure 33:
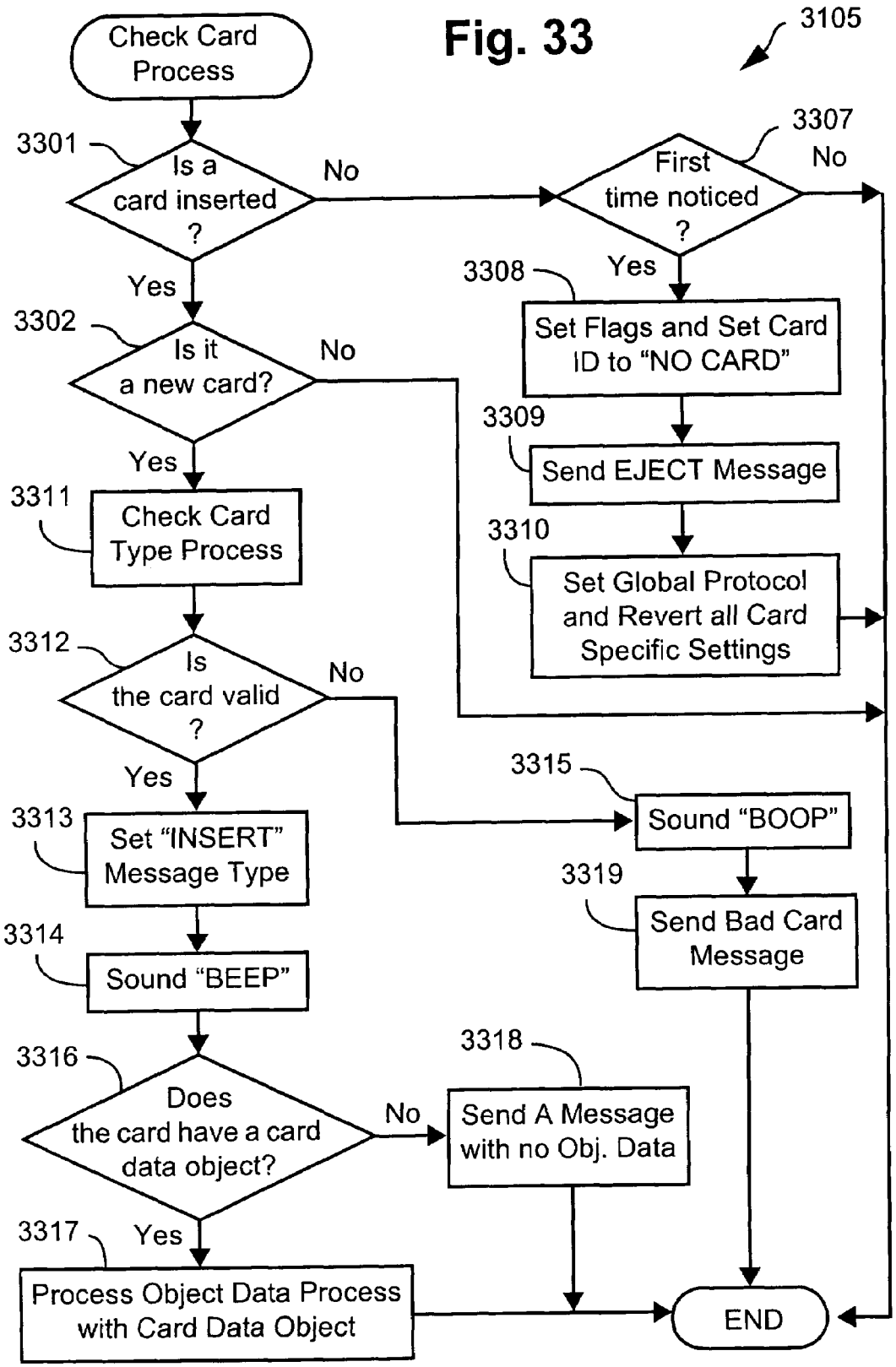
FIG. 33 is a flow diagram showing a check card process as performed during the process of FIG. 31.

FIG. 33 is a flow diagram showing a check card process as performed at step 3105. As described above, the process of step 3105 checks for changes in the presence and validity of a smart card 100 in the remote reader 300 and responds accordingly. The process of step 3105 is preferably implemented as software resident in the memory 1046. The process of step 3105 is performed by the CPU 1045 and begins at step 3301 where if a smart card 100 is inserted in the remote reader 300, then the process proceeds to step 3302. Otherwise the process proceeds to step 3307. At step 3302, if the card 100 is a new card, that is, the previous state of the reader 300 was such that there was no card 100 in the reader 300, then the process of step 3105 proceeds to step 3311. Otherwise, the process of step 3105 concludes. At step 3311, the CPU 1045 executes a check card type process to determine the type and validity of a newly inserted smart card 100. The check card type process will be described in more detail below with reference to FIG. 34. At the next step 3312, the processor 705 determines whether te previous process 3311 indicated a valid card. If so, the process of step 3105 proceeds to step 3313. Otherwise, the process of step 3105 proceeds to step 3315 where a "BOOP" is sounded and the process of step 3105 proceeds to step 3319. At step 3319, a BAD CARD message is transmitted to the set top box 601, for example, and the BAD CARD message is processed by the CPU 805.

At step 3313, a message type variable configured within memory 1047 is set to "INSERT". At the next step 3314 a "BEEP" is sounded by the reader 300 and the process of step 3105 proceeds to step 3316. If the card 100 inserted in the reader 300 has an associated card data object, at step 3316, then the process of step 3105 proceeds to step 3317. Otherwise the process proceeds to step 3318 where the CPU 1045 transmits a message with no object data and the process concludes. At step 3317, a process object data process is performed by the CPU 1045 using the card data object. The process of step 3317 will be described below in detail with reference to FIG. 38

If a smart card 100 is not inserted in the remote reader 300 at step 3301, then the process of step 3105 proceeds to step 3307. At step 3307, if this is the first operation of the reader 300 after the reset, then the process concludes. Otherwise, the process proceeds to step 3308 where "Background beep", "Background MOVE" and "No Background Event Co-ordinates" flags configured within memory 1046 are cleared and the card identifier of the header 1100 for the card 100 is set to "NO_CARD". At the next step 3309, a REMOVE message is transmitted to the set top box 601, for example, and the REMOVE message is processed by the CPU 805. The process of step 3305 continues at the next step 3310, where the active protocol pointer is set to point to the global protocol with user interface card reader device type and the reader 300 reverts all card specific settings to a default state, before the process of step 3305 concludes.

7.4 The Check Card Type Process

Figure 34:
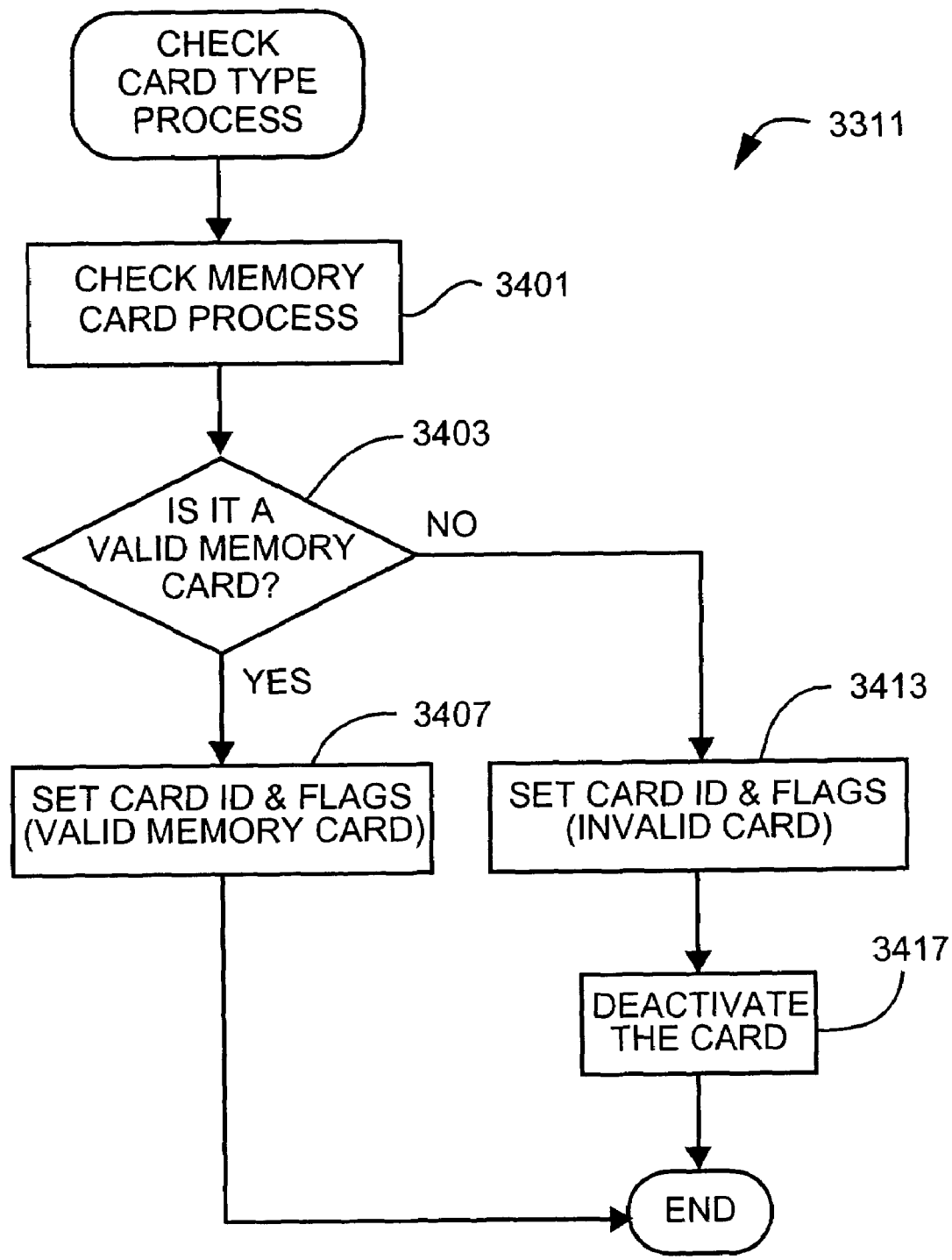
FIG. 34 is a flow diagram showing a check card type process as performed during the process of FIG. 33.

FIG. 34 is a flow diagram showing a check card type process as performed at step 3311. The process of step 3311 is preferably implemented as software resident in the memory 1046 and controlled in its execution by the CPU 1045. The process of step 3311 begins at step 3401, where a check memory card process is performed by the CPU 1045 in order to determine whether a valid memory card, as described above, is present in the reader 300. The check memory card process will be described in detail below with reference to FIG. 35. At the next step 3403, if the card 100 inserted in the reader 300 is a valid memory card, as described above, then the process of step 3311 proceeds to step 3407. Otherwise, the process proceeds step 3413.

At step 3407, the card identifier of the card identifier field 1110 for the inserted card 100 and flags (see Table 2) are set to represent a valid memory card and the process of step 3311 concludes.

At step 3413, the card identifier of the card identifier field 1110 and flags are set to represent an invalid card and the process of step 3311 proceeds to step 3417. At step 3417, the card 100 is deactivated by setting the card contacts (e.g. the contacts 218, 278) and the process concludes.

7.5 Check Memory Card Process

Figure 35:
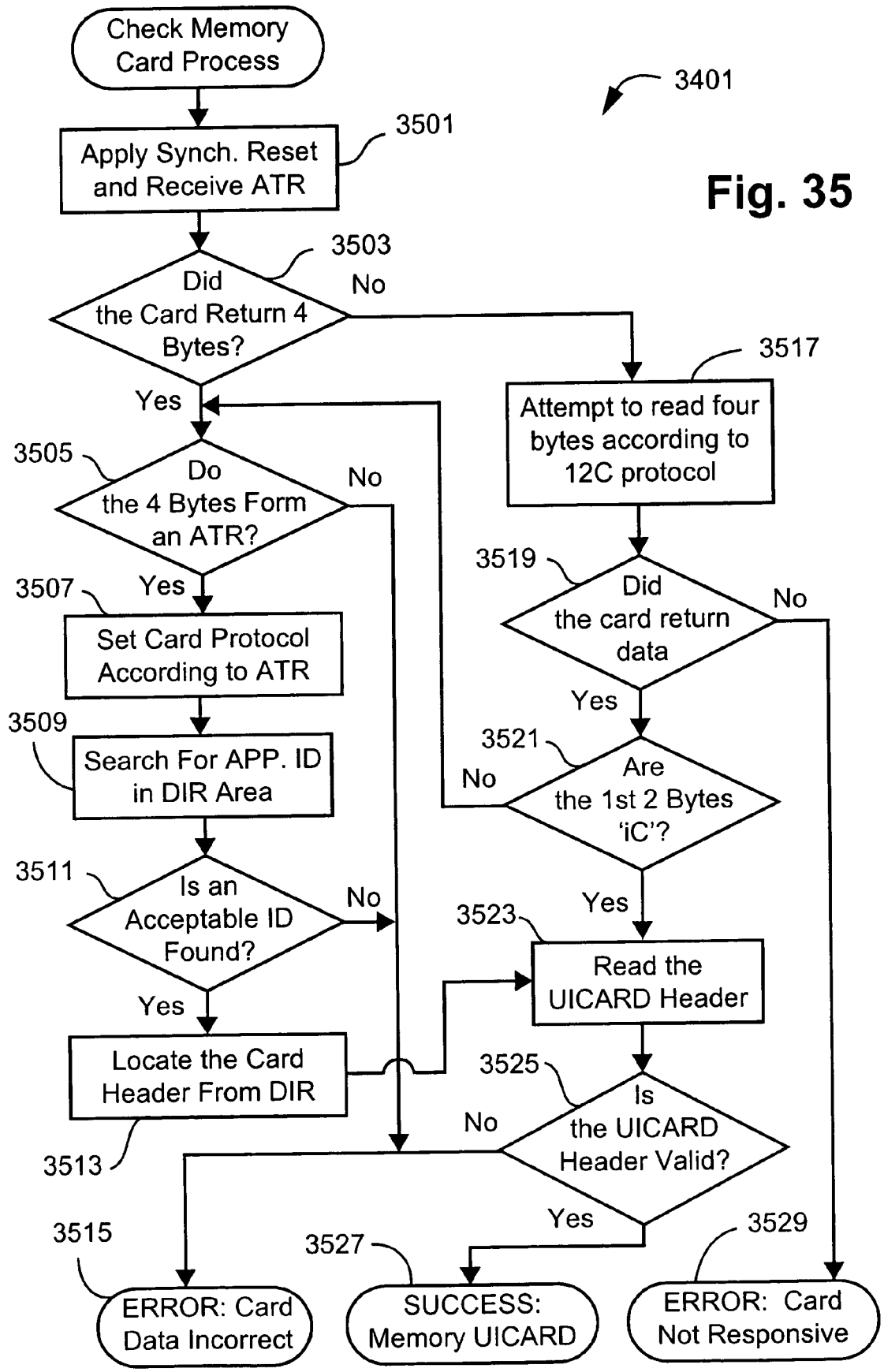
FIG. 35 is a flow diagram showing a check memory card process as performed during the process of FIG. 34.

FIG. 35 is a flow diagram showing a check memory card process as performed at step 3401. The process of step 3401 is preferably implemented as software resident in the memory 1046 and being controlled in its execution by the CPU 1045. The process of step 3401 checks whether a valid memory card 100 is inserted in the reader 300. If a card 100 is present and contains a directory area, as known in the relevant art, configured within memory (e.g. the memory 219) of the card 100, then the directory area is searched by the CPU 1045 for an entry containing a value identifying a region of the card 100 as a user interface card image (i.e., a structure conforming to the user interface card data format). If no directory area is configured within the memory of the card 100, then the beginning of the card 100 is assumed to contain the beginning of the user interface card image. The "magic number" and "checksum" are read from the card header 1100 stored in the memory of the card 100 in order to determine the validity of the card 100, as described above.

The process of step 3401 begins at step 3501 where the CPU 1045 applies a synchronous reset signal (i.e., as defined in the International Standards Organisation (ISO) Smart Card Standards, "Synchronous Cards, ISO 7816-10 (1999)"), to the card 100 and receives an Answer to Reset (ATR) (i.e., as defined in the ISO 7816-10 (1999) standards) from the card 100. At the next step 3503 if the card 100 returns four bytes to the CPU 1045 then the process of step 3401 proceeds to step 3505. Otherwise, the process proceeds to step 3517. At step 3505 if the four bytes form an ATR then the process of step 3401 proceeds to step 3507. Otherwise, the process proceeds directly to step 3515 where a 'Card Data Incorrect error' is returned to the calling process 3311 by the CPU 1045. At step 3507, a protocol for the card is set according to the ATR. The process of step 3401 continues at the next step 3509 where the CPU 1045 searches the directory area configured within the memory of the card 100 in order to detect an application identifier (i.e., conforming to the standard, "Registration System for Application Identifiers, Amendment 1 (1996): Registration of Identifiers", ISO 7816-5), identifying data associated with the card 100 as being user interface card data. At the next 3511, if an identifier is found then the process of step 3401 proceeds to step 3513. Otherwise, the process proceeds directly to step 3515, as described above. At step 3513, the CPU 1045 locates the card header 1100 from the directory area and the process proceeds to step 3523.

If the card 100 did not return four bytes to the CPU 1045, at step 3517, then the process of step 3401 proceeds to step 3517, where the CPU 1045 attempts to read four bytes from the card 100 according to the 12C protocol for communicating with smart cards. At the next step 3519 if the card 100 did not return any data then the process of step 3401 proceeds directly to step 3529 where a 'Card Not Responsive' error is returned to the calling process 3311 by the CPU 1045. Otherwise, the process proceeds to step 3521, where if the first two bytes of the data returned by the card 100 represent the characters 'iC', as described above in Table 1, then the process proceeds to step 3523. Otherwise, the process of step 3401 returns to step 3505. At step 3523 the CPU 1045 reads the header 1100 of the card 100. At the next step 3525, if the header 1100 is valid then that the process proceeds to step 3527 where a success return code is generated by the CPU 1045. Otherwise, the process of step 3401 proceeds to step 3515, as described above.

7.6 Scan Touch Panel Routine

Figure 36:
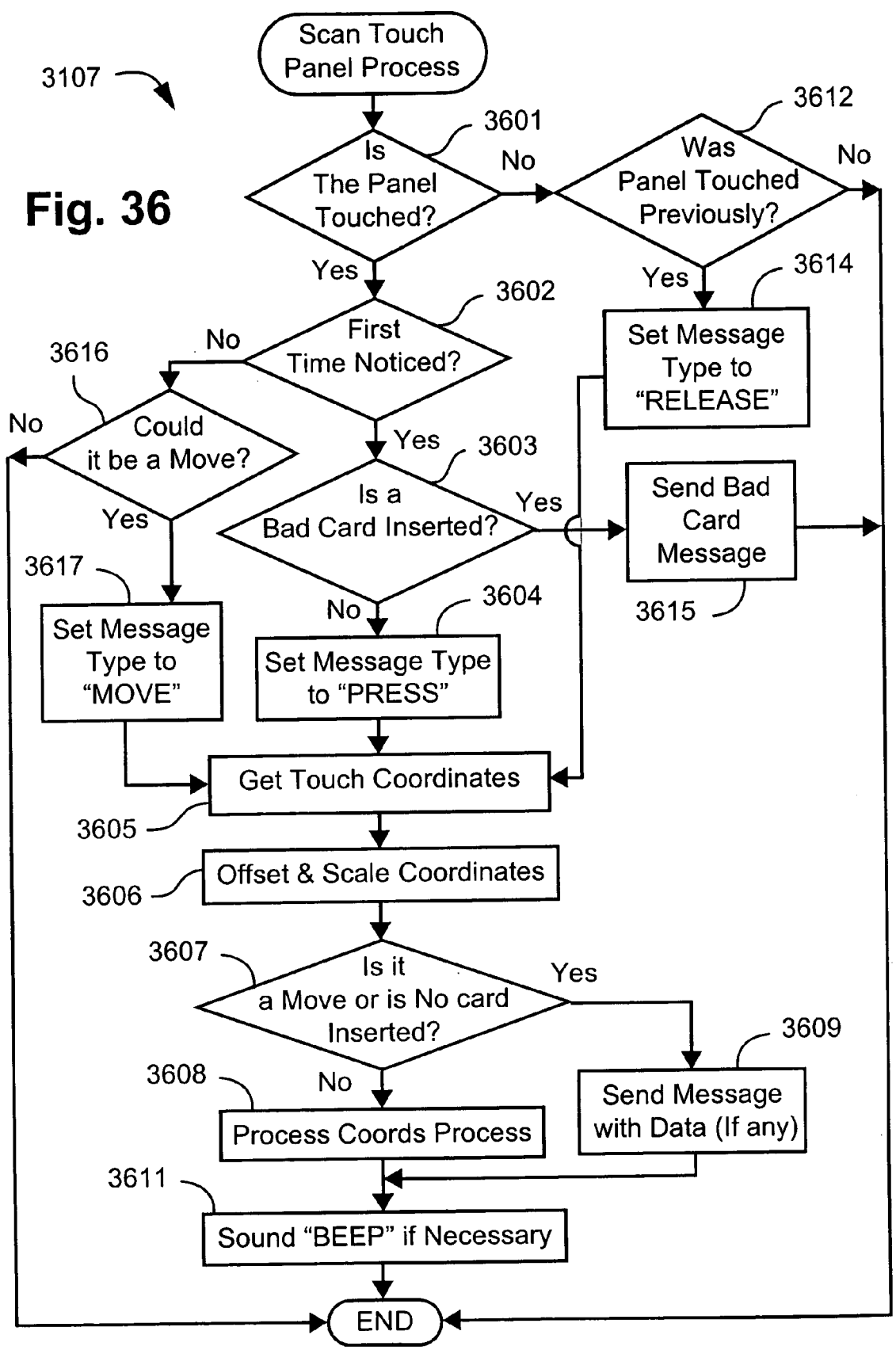
FIG. 36 is a flow diagram showing a scan touch panel process as performed during the process of FIG. 31.

FIG. 36 is a flow diagram showing a process for scanning the touch panel 308 of the reader 300, as performed at step 3107. The process of step 3107 checks for touch panel 308 touches that equate with user interface element 114 selections and the CPU 1045 responds accordingly. The process of step 3107 is preferably implemented as software resident in memory 1046. The process of step 3107 is executed by the CPU 1045 and begins at step 3601 where if the panel 308 is being touched, then the process proceeds to step 3602. Otherwise, the process of step 3107 proceeds to step 3612, where if the panel 308 has been touched previously then the process proceeds to step 3614. Otherwise, the process of step 3107 concludes.

At step 3614, the message type is set to RELEASE and the process of step 3107 proceeds to step 3605. The process continues at the next step 3602, where if this is the first time that the touch has been noticed since there was no touch, then the process proceeds to step 3603. At the next step 3603, the CPU 1045 determines if an invalid card (i.e., Bad Card) has been inserted into the reader 300 by checking the result of step 3312. In the case that a bad card has been inserted into the reader 300, the process of step 3107 proceeds to step 3615. At step 3615, a BAD CARD message is transmitted, by the reader 300, to the set top box 601, for example, and the process concludes. If the CPU 1045 determines at step 3603 that the card 100 was valid, by checking the result of step 3312, or that no card was inserted into the reader 300, by the checking the result of step 3301, then the process of step 3107 proceeds to step 3604. At step 3604, the type of message is set to PRESS in the message header 1100. At the next step 3605, the CPU 1045 determines the touch coordinates (i.e. X, Y coordinates of user press location) via the touch panel interface 1041. Then at the next step 3606, the offset and scale functions are applied to the coordinates. The offset and scale functions map the coordinate space of the touch panel 308 to the coordinate space of the card 100. The process of step 3107 continues at the next step 3607, where if the CPU 1045 determines that the touch detected at step 3601 was a MOVE and/or no card was inserted into the reader 300, by checking the result of step 3301, then the process proceeds directly to step 3609. Otherwise, the process of step 3107 proceeds to step 3608 where the CPU 1045 executes a process co-ordinates process, which will be explained in further detail below with reference to FIG. 37. At the step 3609, a current message is transmitted along with any data, by the reader 300, to the set top box 601, for example, and the CPU 805 in the set top box 601 processes the message. The process of step 3107 continues at the next step 3611, where a BEEP sound is sounded indicating success if a Beep flag (see Table 7) is set either for the currently active user interface element, or for the background (i.e., if no user interface element is active), and the process concludes.

If this is not the first time that a touch has been noticed since there was no touch, at step 3602, then the process of step 3107 proceeds to step 3616. At step 3616, if a Move flag (see Table 7) associated with the currently active user interface element is set, or if an associated Backgorund Move flag is set, then the process proceeds to step 3617. Otherwise the process of step 3107 concludes. At step 3617, the message type is set to MOVE and the process proceeds to step 3605. If it was determined at step 3607 that the message was a MOVE, at step 3609, then the CPU 1045 sends a MOVE message to the set top box 601. The CPU 805 processes X, Y coordinates as cursor information and moves a cursor that is displayed on the television 616. In this case, the next RELEASE message can be interpreted as a command to select the displayed object at the cursor position (e.g. to execute a program, select an item or load a URL). Further, if NO Event Coordinates have been set in the card 100, then the reader 300 may send the data associated with a user interface object to the set top box 601, for example, without sending the X, Y coordinates of the touch position.

In addition, if the application has a user interface object structure such as that shown in Table 6, and a matching function such as that performed in the process of step 3608, then the reader 300 may send X, Y coordinates of a touch position to the application. As a result, the CPU 805 executes the same matching function in order to read data associated with the user interface object and provides the card user, a service (e.g. a game) identified by a service identifier 1106 associated with the read data.

Therefore, if a card user uses the reader 300 as a mouse (i.e., the reader 300 is in mouse mode) by moving his or her finger on the touch panel 308, then the user can select one of the set top box 601 services on a set top box menu displayed on the display of the television 616. Also, if the card user uses the reader 300 with an inserted card 100 and selects some indicia 114 (i.e., the reader 300 is in user interface card reader mode), then the user can receive a service (e.g. a game) from the set top box 601.

7.7 Process Coordinates Process

Figure 37:
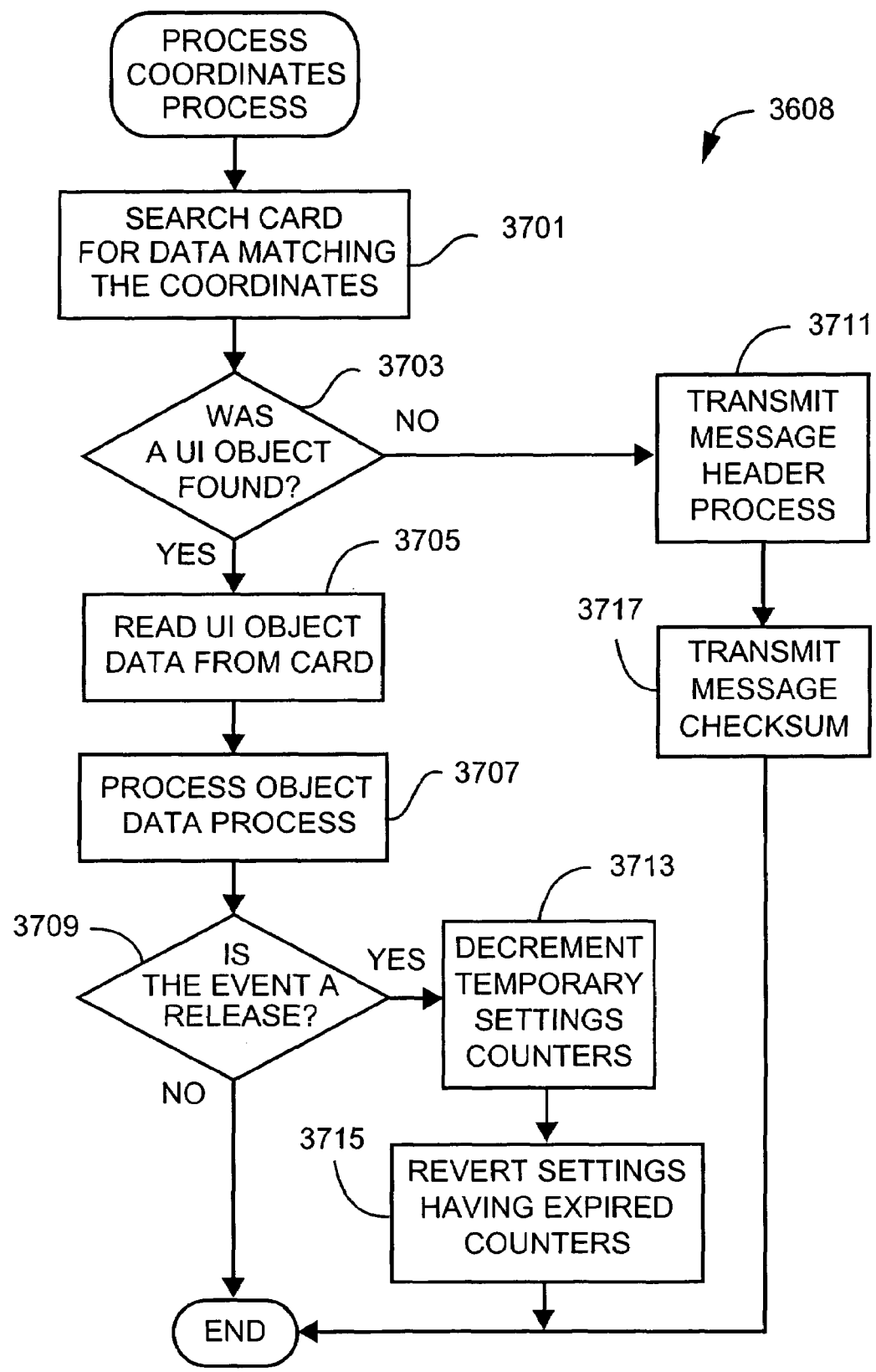
FIG. 37 is a flow diagram showing a process coordinates process as performed during the process of FIG. 36.

FIG. 37 is a flow diagram showing a process coordinates process for matching a pair of coordinates with a user interface object stored on the card 100, as performed at step 3608. The process of step 3608 is preferably implemented as software resident in memory 1046 and being executed by the CPU 1045. The process begins at step 3701, where the memory of the card 100 is searched by the CPU 1045 to determine a user interface object, and associated data, matching the coordinates received from the reader 300. At the next step 3703, if a user interface card object was found in memory 1046, by matching the coordinates received from the reader 300, then the process of step 3608 proceeds to step 3705. Otherwise, the process proceeds to step 3711. At step 3705, the CPU 1045 reads the data associated with the matched user interface object from the memory of the card 100. The process of step 3608 continues at the next step 3707 where the CPU 1045 executes a process object data process as performed at step 3317. The process object data process will be described in detail below with reference to FIG. 38. At the next step 3709, if the CPU 1045 detects a RELEASE event, then the process proceeds to step 3713. Otherwise, the process of step 3608 concludes. At step 3713, temporary settings counters (as described above to control temporary protocols and modifier flags) configured within the memory 1047 are decremented. Then at the step 3715, the CPU 1045 reverts those settings having expired counters to the values previously stored for these settings and the process of step 3608 concludes.

At step 3711 a transmit message header process is executed by the CPU 1045. The transmit message header process transmits a reader application message header and any other information that is not read from the card 100, for a current message. The transmit message header process will be described below with reference to FIG. 9. The process of step 3608 concludes after the next step 3717 where a message checksum is transmitted by the reader 300.

7.8 Process Object Data Process

Figure 38:
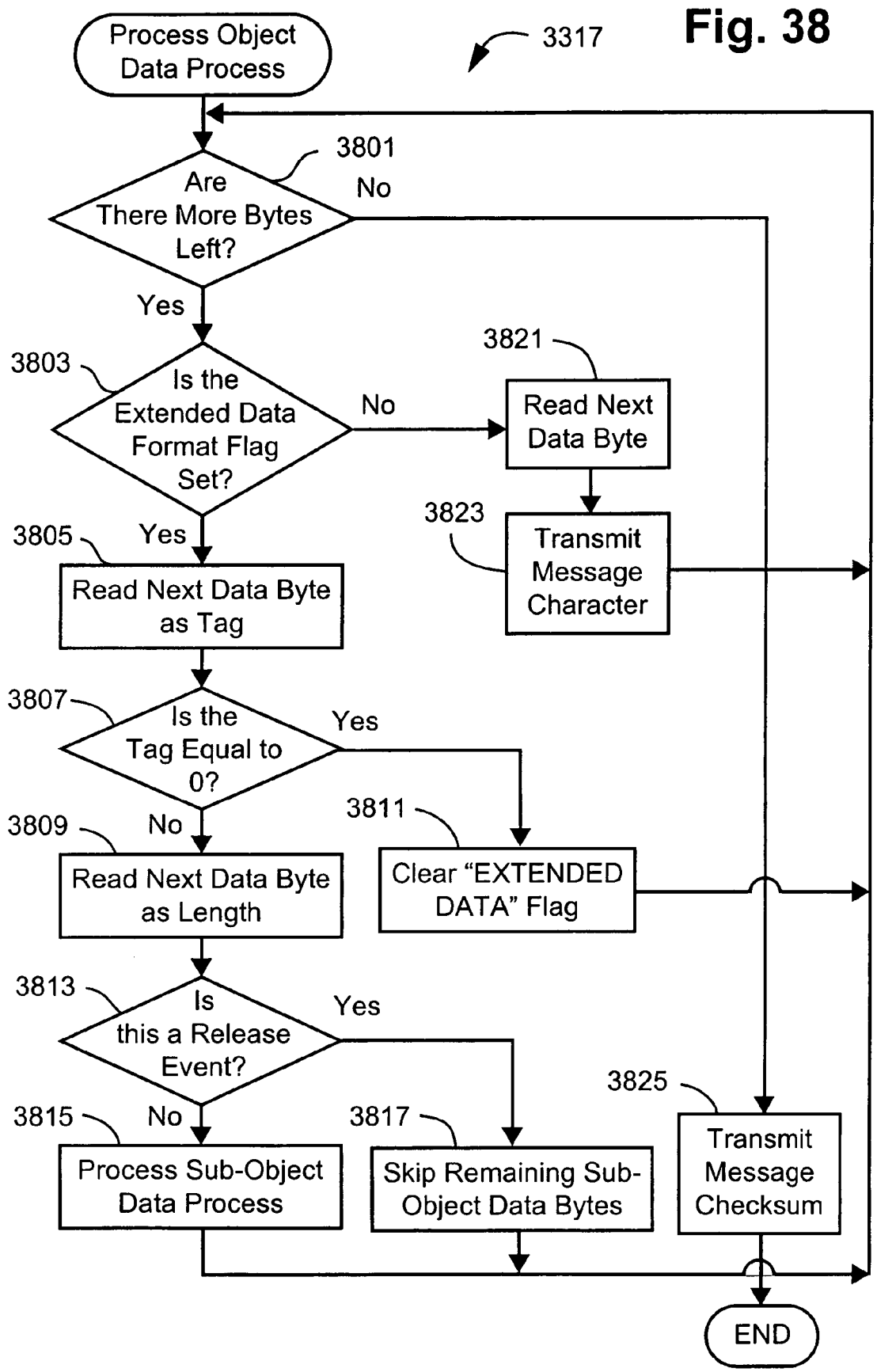
FIG. 38 is a flow diagram showing a process object data process as performed during the processes of FIGS. 33 and 37.

FIG. 38 is a flow diagram showing a process object data process for processing data associated with a user interface object stored in the memory of the card 100, as performed at steps 3317 and 3707. If the extended data flag (see Table 4) of the object, detected by the CPU 1045 at step 3316 or 3703 (i.e., the matched object) is set then the CPU 1045 processes the extended data structure of the object at the beginning of the data associated with the object, before the reader 300 reverts to standard data format mode, by clearing the extended data flag, upon reaching a tag of zero.

The process of step 3317 is preferably implemented as software resident in memory 1046 and being executed by the CPU 1045. The process begins at step 3801, where the CPU 1045 determines whether there are any more bytes of the user interface object, detected by the CPU 1045 at step 3316, to process. If their are more bytes to process, at step 3801, then the process of step 3317 proceeds to step 3803. Otherwise, the process proceeds directly to step 3825 where a transmit message checksum process is executed by the CPU 1045 and the process concludes. The transmit message checksum process is executed by the CPU 1045 in order to transmit the checksum following a message body and will be described in detail below with reference to FIG. 48. At step 3803, if the extended data format flag (see Table 4) of the matched object is set, then the process of step 3317 proceeds to step 3805. Otherwise, the process proceeds to step 3821. At step 3805 the CPU 1045 reads the next data byte as a tag, as described above with reference to FIGS. 23(a) and 23(b). If the tag is equal to zero, then the process of step 3317 proceeds to step 3811. Otherwise, the process proceeds to step 3809 where the next data byte is read by the CPU 1045 and is interpreted by the processor 705 as the length of the sub-object data. At the next step 3813, if a RELEASE event is detected by the CPU 1045 then the process of step 3317 proceeds to step 3817 where the remaining sub-object data bytes associated with the matched object are skipped and the process returns to step 3801. Otherwise, the process proceeds to step 3815 where a process sub-object data process is executed by the CPU 1045. The process sub-object data process will be described in more detail with reference to FIG. 39. After step 3815 the process of step 3317 returns to step 3801. At step 3811, the extended data flag of the matched object is cleared and the process of step 3317 returns to step 3801.

At step 3821, the CPU 1045 reads the next data byte associated with the matched object. At the next step 3823, a transmit message character process is executed by the CPU 1045 and the process of step 3317 returns to step 3801. The transmit message character process is called by the CPU 1045 to transmit a single character forming part of a current message body and will be described in detail below with reference to FIG. 47.

7.9 Process Sub-Object Data Process

Figure 39:
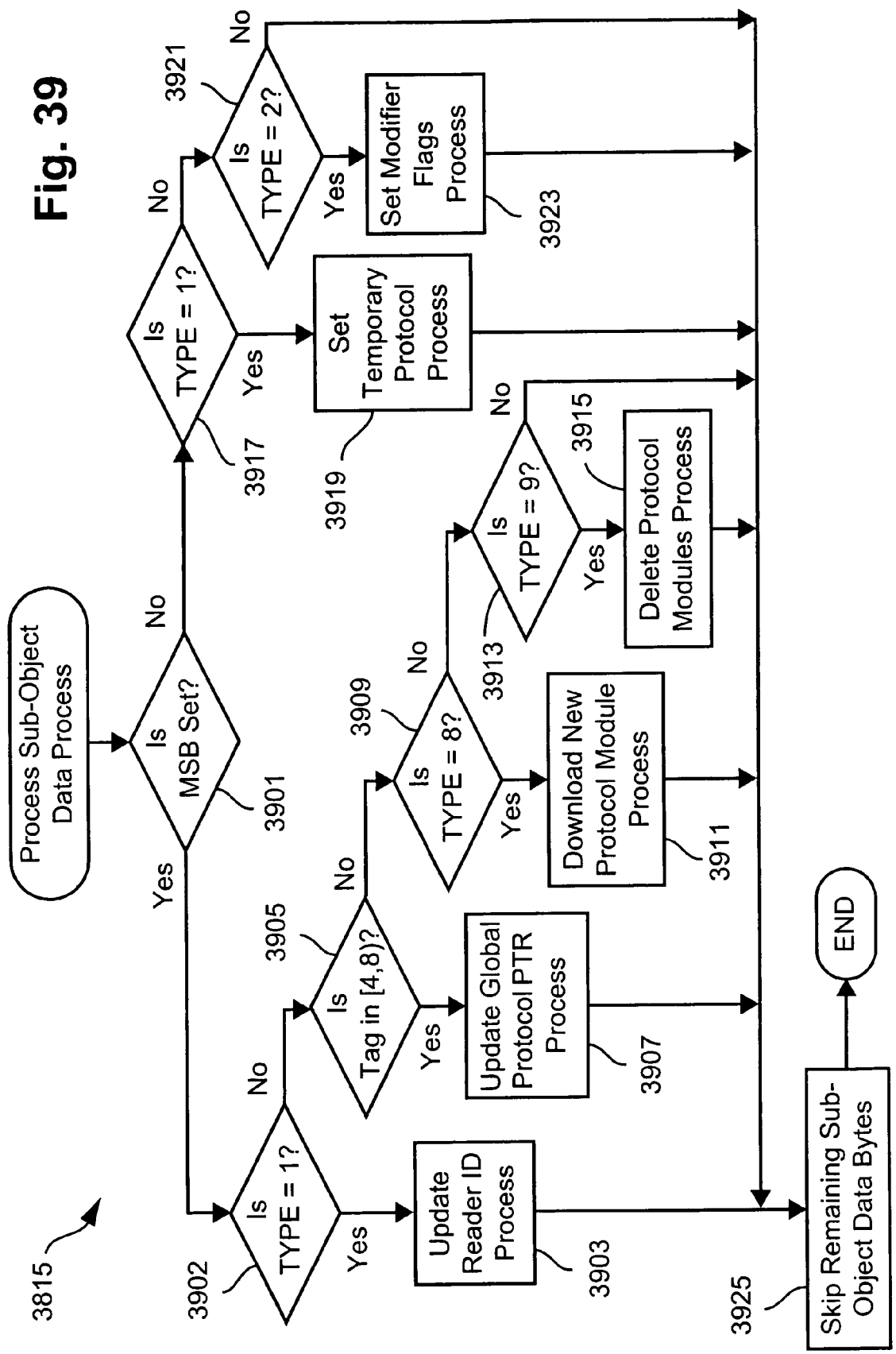
FIG. 39 is a flow diagram showing a process sub-object data process for checking a tag associated with a current sub-object of a user interface object, as performed during the process of FIG. 38.

FIG. 39 is a flow diagram showing a process sub-object data process for checking the tag associated with a current sub-object of a user interface object, as performed at steps 3815. Tag values are represented in hexadecimal format. The process of step 3815 updates the state of the reader 300 according to the retrieved sub-object value. The process of step 3815 is preferably implemented as software resident in memory 1046 and is executed by the CPU 1045. The process begins at step 3901, where if the most significant bit of the tag of the next data byte, read by the CPU 1045 at step 3805, is equal to one, indicating that a non-global change is to be effected in the reader 300, then the process of step 3815 proceeds to step 3902. Otherwise, the process of step 3815 proceeds to step 3917. At step 3902, if the value of the tag of the next data byte, read by the CPU 1045 at step 3805, is equal to one, indicating that the data byte comprises part of an update reader identifier sub-object, then the process of step 3815 proceeds to step 3903. At step 3903, an update reader identifier process is executed by the CPU 1045 and the process then proceeds to step 3925. Otherwise, the process proceeds to step 3905. As described above, with reference to FIGS. 23(a) and (b), the value of a tag is indicated by the bits labeled X in the tags 2301 and 2302 and the value of the tags indicates the type of sub-object associated with the tag. The update reader identifier process processes the data contained in an update reader identifier sub-object and will be described in more detail below with reference to FIG. 41.

At step 3905, if the value of the tag is in the range of [4, 8), indicating that the next sub-object is an update global protocol pointer sub-object, then the process of step 3815 proceeds to step 3907 where an update global protocol pointer process is executed by the CPU 1045. Otherwise, the process proceeds to step 3909. The update global protocol pointer process processes the data contained in an update global protocol pointer sub-object and will be described in more detail below with reference to FIG. 40. Separate global protocol pointers are maintained for the user interface card, remote-control, keyboard and mouse modes of the reader 300, as described above with reference to Tables 9 and 10. The value of the least significant two bits of the tag determines which mode the reader 300 is to be set to.

At step 3909, if the value of the tag is equal to eight, indicating that the next sub-object is a protocol module sub-object, then the process of step 3815 proceeds to step 3911 where a download new protocol module process is executed by the CPU 1045. Otherwise, the process proceeds to step 3913. The download new protocol module process processes data in a protocol module sub-object and will be described in more detail below with reference to FIG. 42. If a protocol already in memory 1046 exists with the same identifier as the protocol to be loaded, then the existing protocol is initially removed.

At step 3913, if the value of the tag is equal to nine, indicating that the next sub-object is a delete protocol module sub-object, then the process of step 3815 proceeds to step 3915 where a delete protocol modules process is executed by the CPU 1045. Otherwise, the process proceeds to step 3925. The delete protocol modules process processes data contained in a delete protocol module sub-object and will be described in more detail below with reference to FIG. 43. The success of each module deletion requested within the sub-object is indicated by a BEEP sounded by the reader 300.

At step 3917, if the value of the type field of the tag is equal to one, indicating that the next sub-object is a temporary protocol sub-object, then the process of step 3815 proceeds to step 3919 where a set temporary protocol process is executed by the CPU 1045. Otherwise, the process proceeds to step 3921. The set temporary protocol process will be described in more detail below with reference to FIG. 45.

At step 3921, if the value of the type field of the tag is equal to one, indicating that the next sub-object is a set modifier flags sub-object, then the process of step 3815 proceeds to step 3923 where a set modifier flags process is executed by the CPU 1045. Otherwise, the process proceeds to step 3925. The set modifier flags process is configured to process the data contained in a set modifier flags sub-object and will be described in more detail below with reference to FIG. 46.

At step 3925, the CPU 1045 skips the remaining sub-object data bytes of the sub-object detected by the CPU 1045 at step 3316 and the process of step 3815 concludes.

7.10 Update Global Protocol Pointer Process

Separate global protocol pointers, configured within memory 1046 of the reader 300, are maintained for the user interface card, remote-control, keyboard and mouse modes of the reader 300. The value of the least significant two bits of the tag for the current sub-object determines which mode the reader 300 is to be set to.

Figure 40:
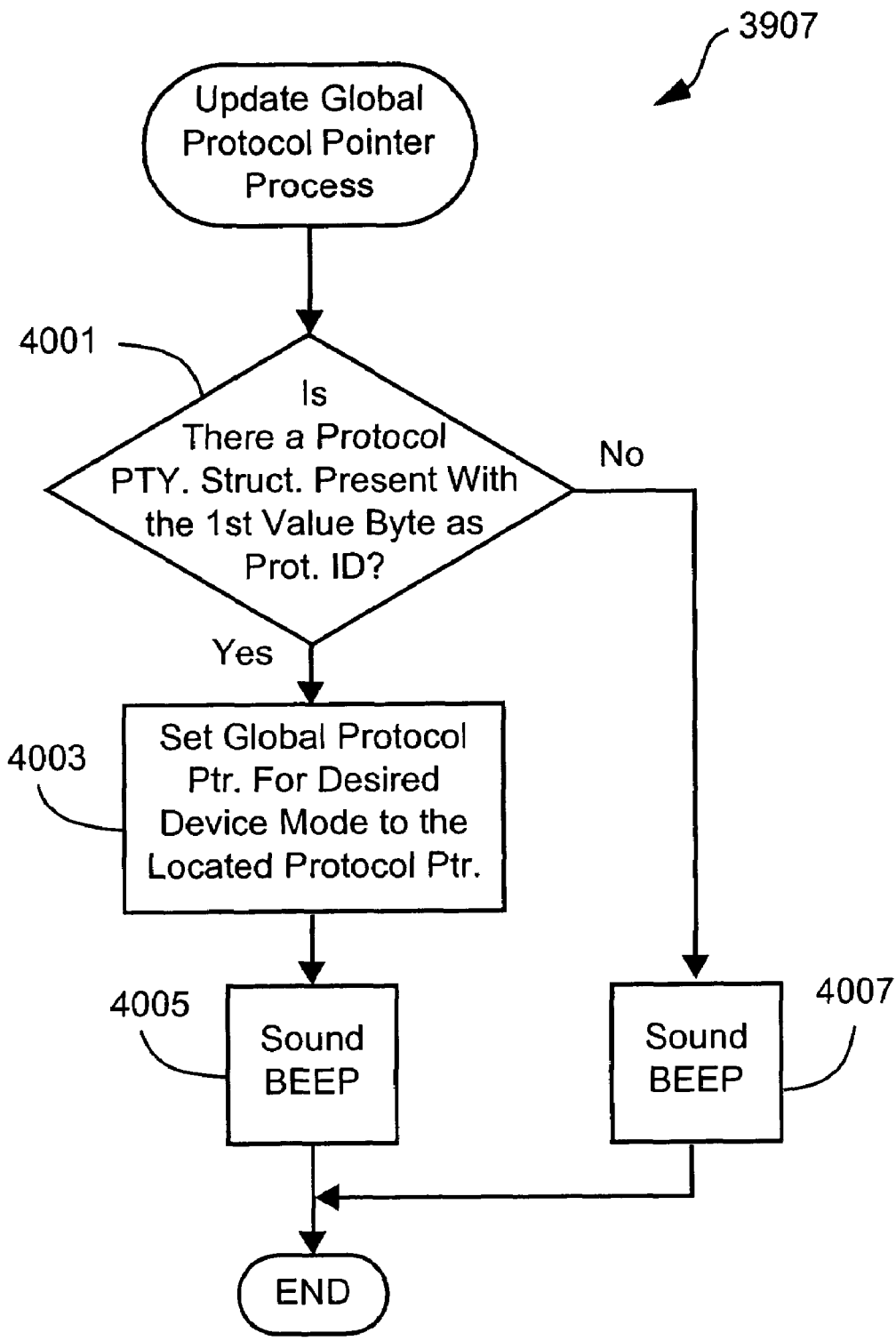
FIG. 40 is a flow diagram showing an update global protocol pointer process, as performed during the process of FIG. 39.

FIG. 40 is a flow diagram showing the update global protocol pointer process, as performed at step 3907. The process of step 3907 is preferably implemented as software resident in memory 1046 and being executed by the CPU 1045. The process begins at step 4001, where if a protocol module is found within the protocol module list in memory 1046, having a property structure which contains a protocol identifier equal to the data byte, then the process of step 3907 proceeds to step 4003. The value of the first byte of the sub-object identifies the global protocol being used by the system 600. At the next step 4003, the global protocol pointer configured within memory 1047 is set according to the desired device mode (i.e., user interface card reader, mouse, keyboard or remote control), to the protocol pointer identified by the first byte. The process of step 3907 concludes at the next step 4005 where a BEEP is sounded by the reader 300 indicating the success of the process.

If a matching property structure was not found at step 4001, then the process of step 3907 proceeds to step 4007 where a BOOP is sounded by the reader 300 indicating such.

7.11 Update Reader Identifier Process

Figure 41:
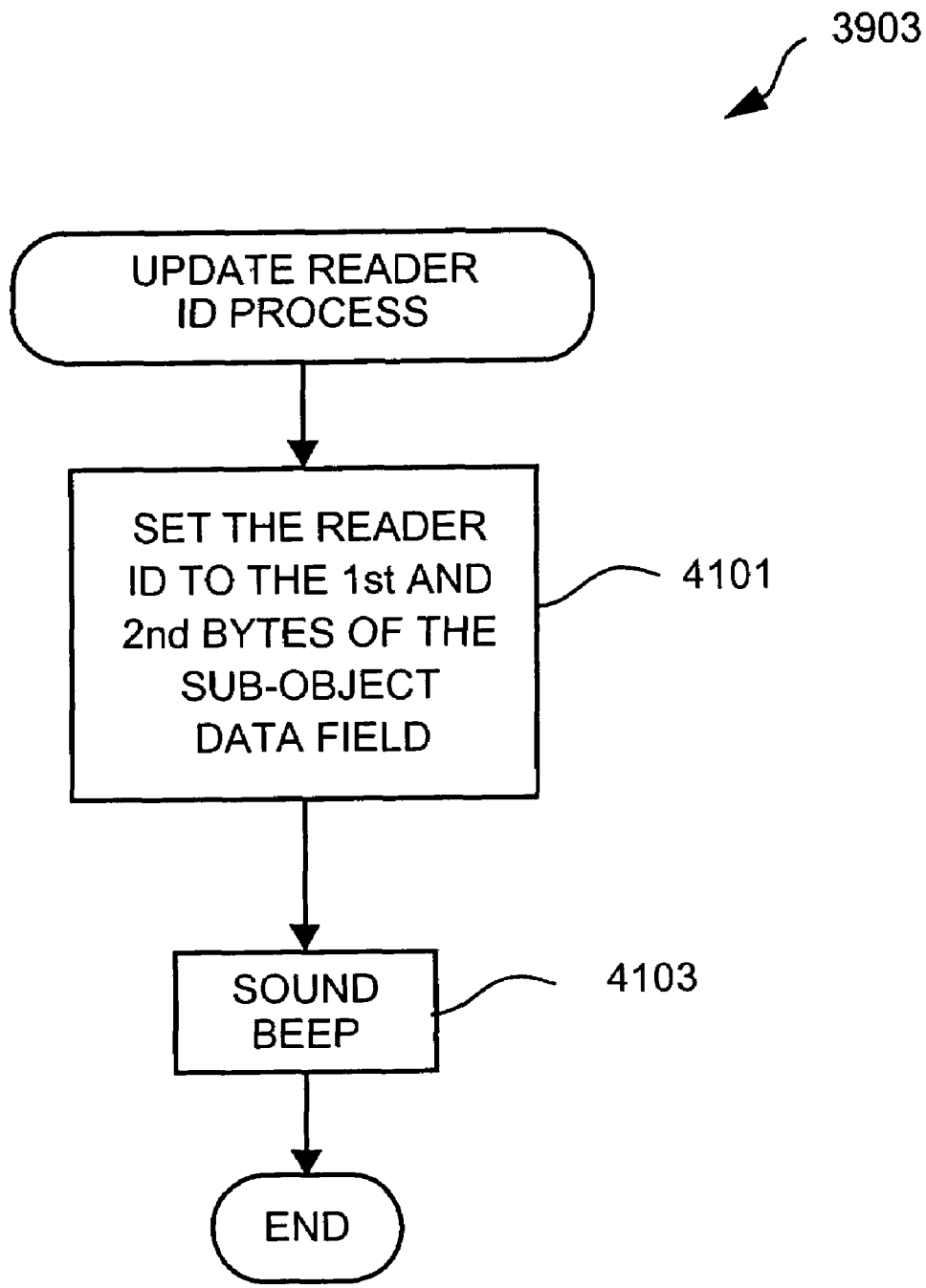
FIG. 41 is a flow diagram showing an update reader identifier process for processing data contained in an update reader identifier sub-object, as performed during the process of FIG. 39.

FIG. 41 is a flow diagram showing an update reader identifier process for processing the data contained in an update reader identifier sub-object, as performed at steps 3903. The process is preferably implemented as software resident in memory 1047. The process of step 3903 is executed by the CPU 1045 and begins at step 4101, where the reader identifier configured within memory 1046 is set to be value of the first and second bytes of the sub-object data field of the object. The process of step 3903 concludes at step 4103 where a BEEP is sounded by the reader 300.

7.12 Download New Protocol Module Process

Figure 42:
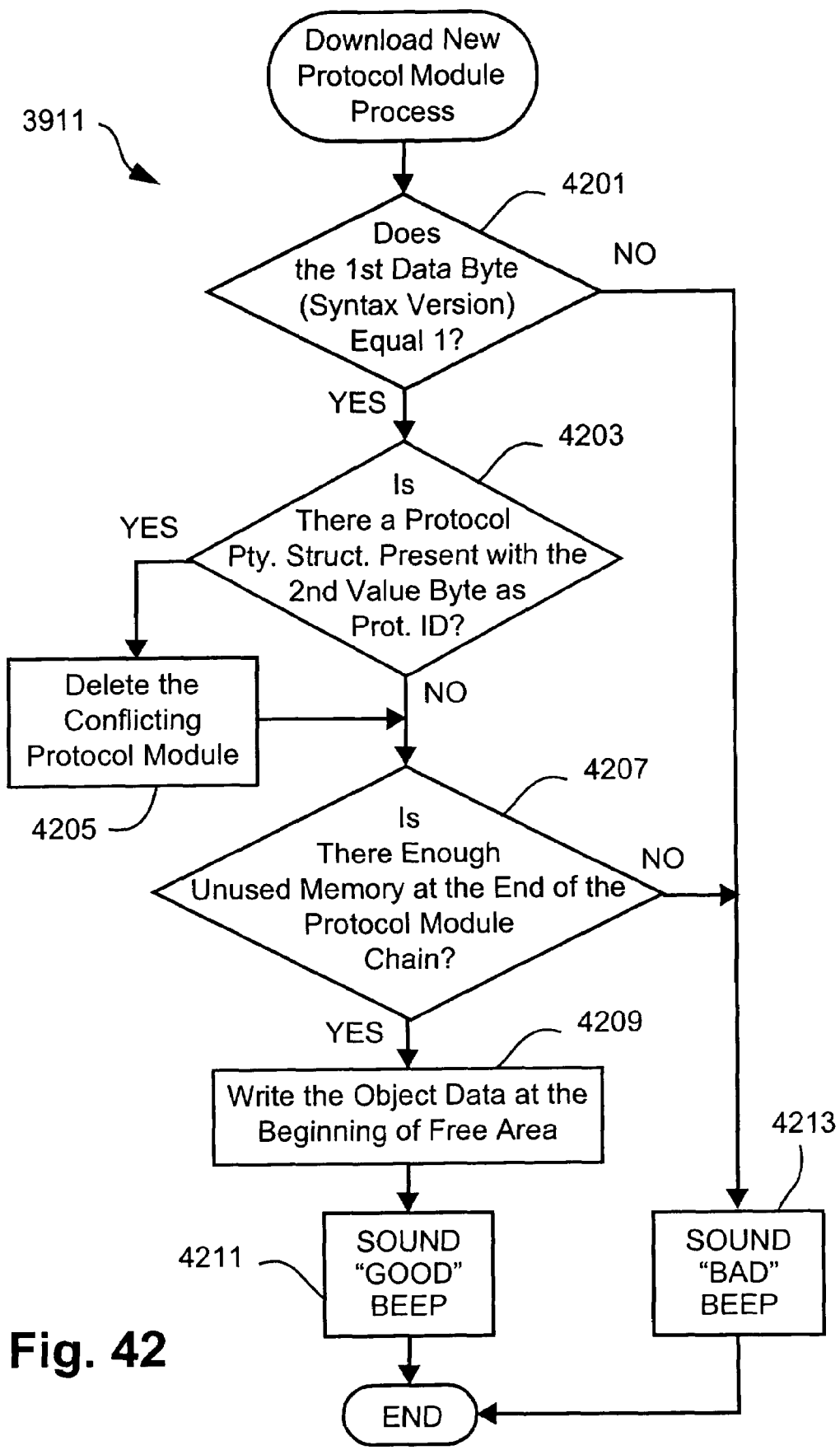
FIG. 42 is a flow diagram showing a download new protocol module process as performed during the process of FIG. 39.

FIG. 42 is a per flow diagram showing the download new protocol module process, as performed at step 3911. As described above, the download new protocol module process processes data in a protocol module sub-object and will be described in more detail below with reference to FIG. 42. If a protocol already exists in memory 1046 with the same identifier as the protocol to be loaded, then the existing protocol is initially removed from memory 1046. The process of step 3911 is implemented as software resident in memory 1046 and is executed by the CPU 1045. The process begins at step 4201, where if the value of the first data byte of the current sub-object is equal to one then the process proceeds to step 4203. Otherwise, the process proceeds to step 4213 where a BOOP is sounded by the reader 300 and the process concludes. At step 4203, if a protocol module already exists in memory 1046 with the same identifier as the protocol to be loaded into memory 1046 then the process of step 3911 proceeds to step 4205 where the conflicting protocol module is deleted from memory 1046. As described above with reference to FIG. 27, the identifier for a protocol is stored in the protocol properties portion 2701 of the associated protocol module 2700. The conflicting protocol is deleted from memory 1046 using a delete protocol module process, which will be described below with reference to FIG. 44. The delete protocol module process deletes a single protocol module from memory 1046. At the next step 4207, if there is enough unused space in memory 1046 at the end of a protocol module chain containing the deleted protocol module stored within the memory 1046, then the process of step 3911 proceeds to step 4209. Otherwise, the process proceeds to step 4213 where a BOOP is sounded by the reader 300. At step 4209, object data associated with the current sub-object is written to the beginning of the free area of memory 1046. The process of step 3911 concludes at step 4211 where a BEEP is sounded by the reader 300.

7.13 Delete Protocol Modules Process

Figure 43:
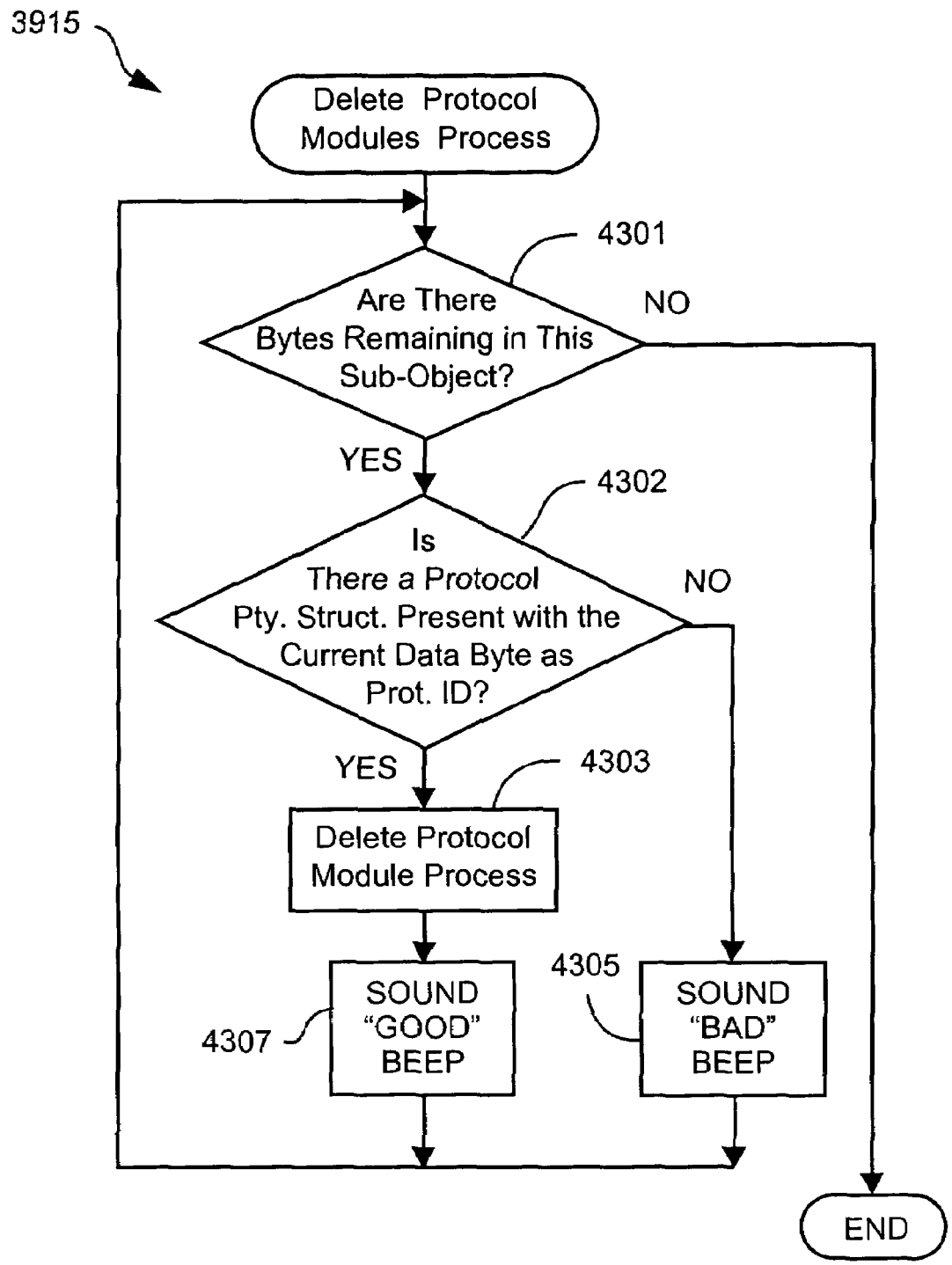
FIG. 43 is a flow diagram showing a delete protocol modules process, as performed during the process of FIG. 39.

FIG. 43 is a flow diagram showing the delete protocol modules process, as performed at step 3915. The process of step 3915 is preferably implemented as software resident in memory 1046 and being executed by the CPU 1045. The process begins at step 4301, where if there are any bytes of the current sub-object remaining to be processed then the process proceeds to step 4302. Otherwise, the process of step 3915 concludes. At step 4302, if a protocol module already exists in memory 1046 with the same identifier as the protocol to be deleted from memory 1046 then the process of step 3915 proceeds to step 4303. Otherwise, the process proceeds to step 4305 where a BOOP is sounded by the reader 300. As described above with reference to FIG. 27, the identifier for a protocol is stored in the protocol properties portion 2701 of the associated protocol module 2700. At step 4303, the protocol module is deleted from memory 1046 using the delete protocol module process, which will described in detail below with reference to FIG. 44. As described above, the delete protocol module process deletes a single protocol module from memory 1046. The process of step 3915 concludes at the next step 4307 where a BEEP is sounded by the reader 300. If there is no protocol module existing in memory 1046 with the same identifier as the protocol to be loaded into memory 1046, at step 4302, then the process proceeds to step 4305 where a BOOP is sounded by the reader 300 concludes.

7.14 Delete Protocol Module Process

Figure 44:
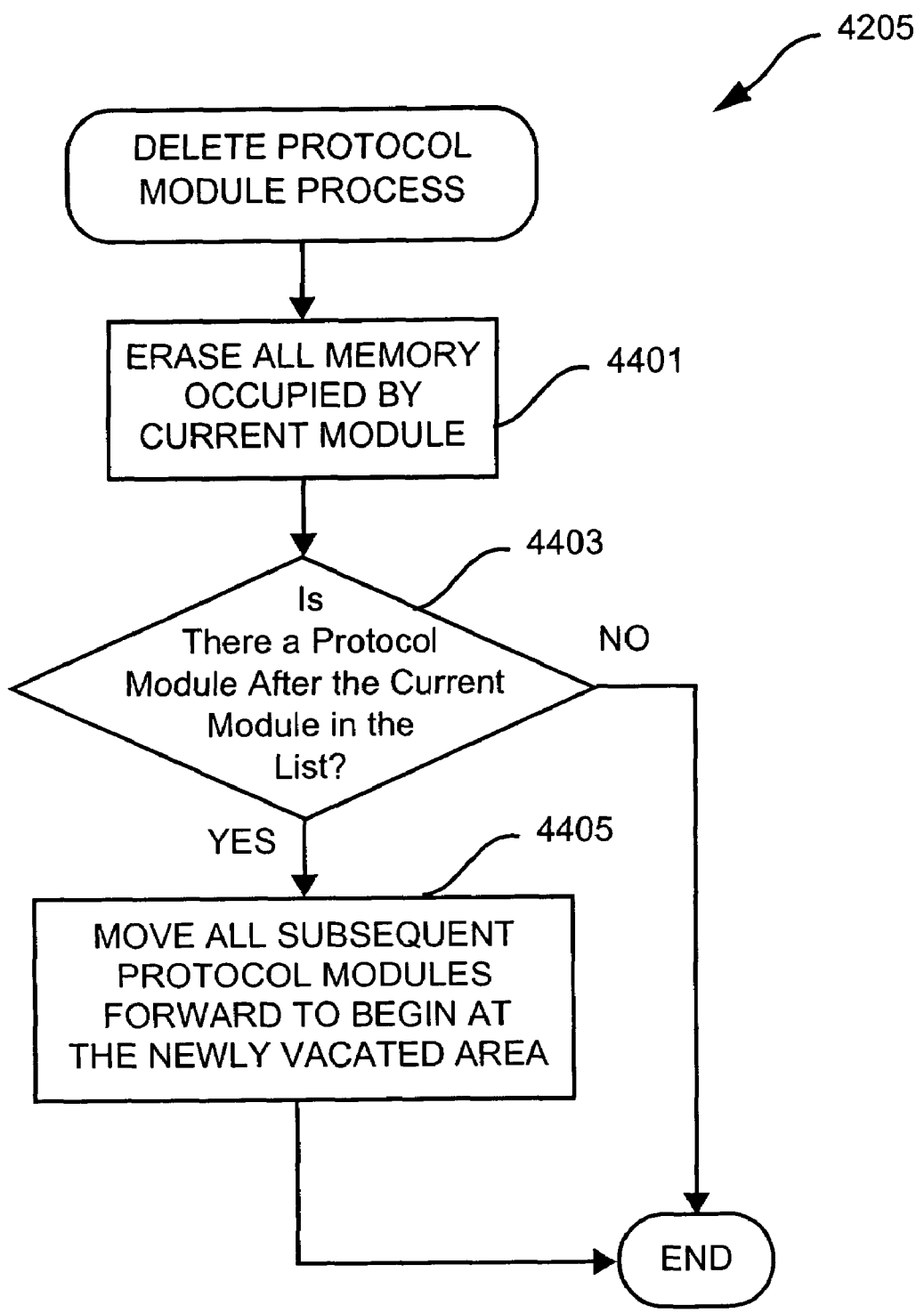
FIG. 44 is a flow diagram showing a delete protocol module process, as performed during the processes of FIGS. 42 and 43.

FIG. 44 is a flow diagram showing the delete protocol module process, as performed at steps 4205 and 4303. The delete protocol module process erases the flash memory 1046 containing a protocol module to be erased and also compacts the associated protocol module list 2800, stored in memory 1046, each time a protocol module is erased. The process of step 4205 is executed by the CPU 1045 and begins at step 4401, where all memory 1046 occupied by the protocol module to be erased is cleared by the CPU 1045. At the next step 4403, if there are one or more protocol modules after the erased protocol module in the associated protocol module list 2800, then the process of step 4205 and 4303 proceeds to step 4405. Otherwise, the process concludes. At step 4405 all subsequent protocol modules of the protocol module list 2800 are moved forward in memory 1046 to begin at the newly vacated area of the memory 1046.

7.15 Set Temporary Protocol Process

Figure 45:
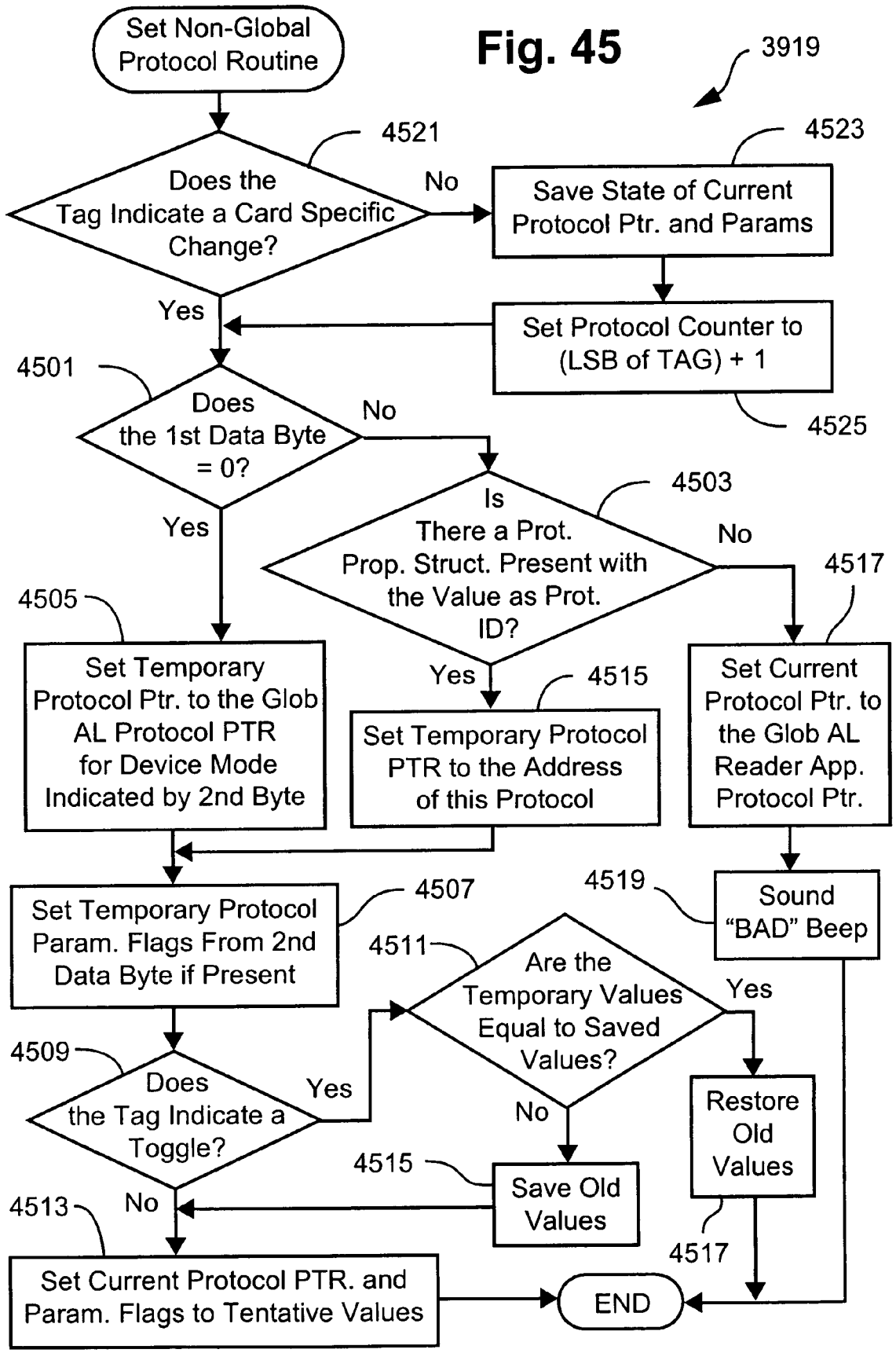
FIG. 45 is a flow diagram showing a set temporary protocol module process as performed during the process of FIG. 39.

FIG. 45 is a flow diagram showing the set temporary protocol module process, as performed at step 3919. The set temporary protocol module process is executed by the CPU 1045 and begins at step 4501, where if the tag of the current temporary protocol sub-object indicates a card specific change, then the process proceeds to step 4501. Otherwise, the process proceeds to step 4523, where the state of a current protocol pointer, configured within memory 1047, and parameters for the current protocol are saved in memory 1047. At the next step 4525, a temporary protocol counter is set to the value of the least significant bit of the tag for the temporary protocol sub-object, plus one, and the process proceeds to step 4501.

At step 4501, if the value of the first data byte of the temporary protocol sub-object is equal to zero, then the process proceeds to step 4505. Otherwise, the process proceeds to step 4503. At step 4505, a temporary protocol pointer configured within memory 1047 is set to the value of a global protocol pointer according to a specific device mode (i.e., as indicated by the second byte of the temporary protocol sub-object) and the process of step 3919 proceeds to step 4507.

At step 4503, if there is a protocol module existing in memory 1046 having the same identifier as the protocol module for the protocol specified by the temporary protocol sub-object, then the process of step 3919 proceeds to step 4515. Otherwise, the process proceeds to step 4517. At step 4515, the temporary protocol pointer configured within memory 1047 is set to the address of the existing protocol module stored in memory 1046 and the process proceeds to step 4507.

At step 4507, protocol parameter flags (see Table 19) configured within memory 1046 are set according to the second data byte of the temporary protocol sub-object and the process proceeds to step 4509. At step 4509, if the tag of the temporary protocol sub-object indicates that the CPU 1045 is to execute a toggle between the temporary proctocol and the current protocol, then the process proceeds to step 4511. Otherwise, the process proceeds to step 4513.

At step 4511, if the parameter values for the temporary protocol are equal to the parameter values for the current protocol, as were saved by the CPU 1045 at step 4523, then the process of step 3919 proceeds to step 4517. Otherwise the process proceeds to step 4515 where the CPU 1045 saves the parameter values for the current protocol in memory 1047. At step 4517, the CPU 1045 restores the parameter values that were saved at step 4523.

The process of step 3919 continues at the next step 4513, where the current protocol pointer configured in memory 1046 is set to the point to the protocol module corresponding to the temporary protocol, and the parameter flags are set to the values for the temporary protocol module.

At step 4517 the current protocol pointer configured within memory 1047 is set to the global protocol pointer configured within memory 1046. The process of step 3919 concludes at the next step 4519 where a BOOP is sounded by the reader 300.

7.16 Set Modifier Flags Process

Figure 46:
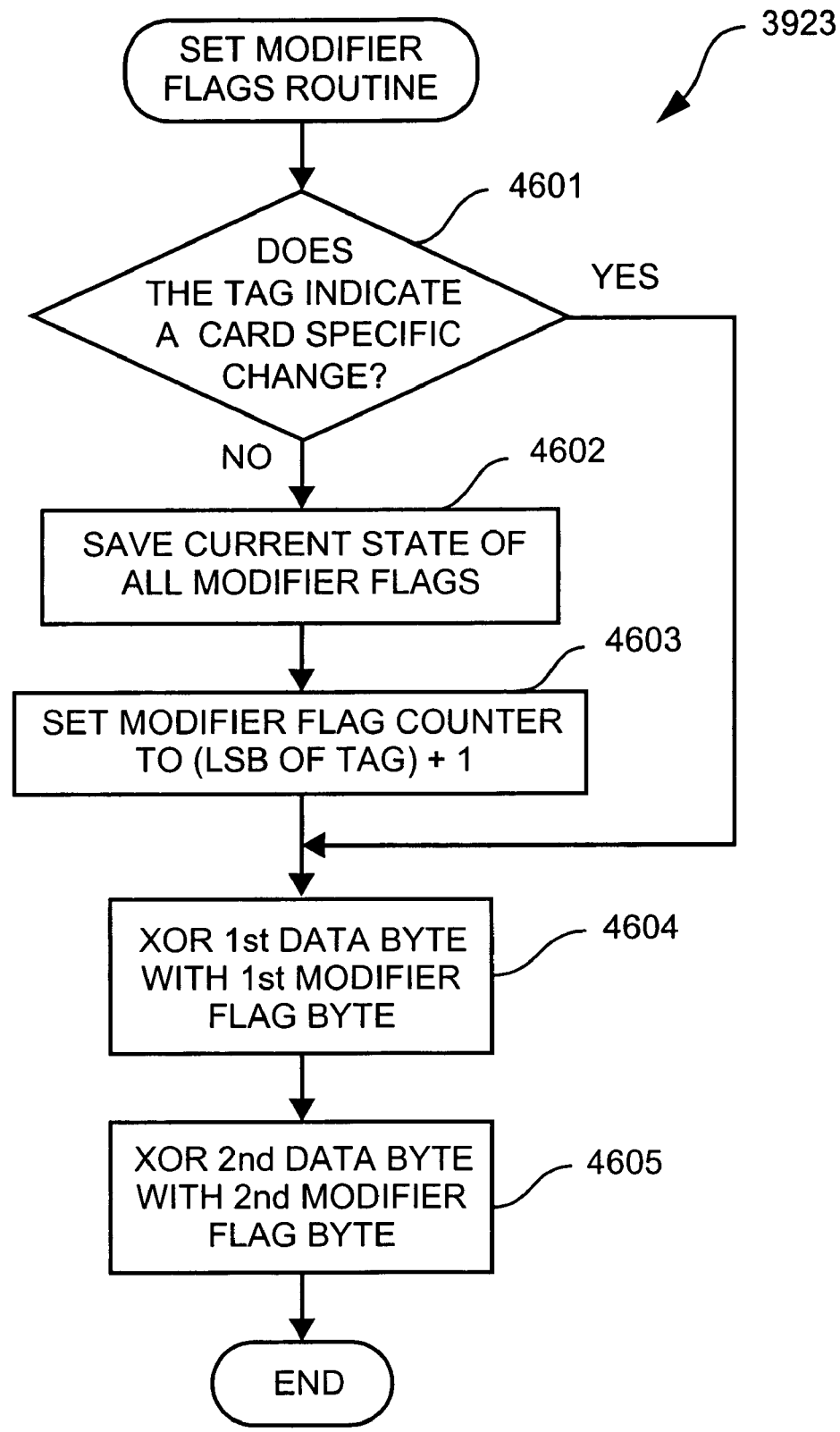
FIG. 46 is a flow diagram showing a set modifier flags process, as performed during the process of FIG. 39.

FIG. 46 is a flow diagram showing the set modifier flags process, as performed at step 3923. As described above, the set modifier flags process processes the data contained in a set modifier flags sub-object. See Table 10 above for a description of the set modifier flags sub-object. The set modifier flags process is executed by the CPU 1045 and begins at step 4601, where the CPU 1045 determines whether the tag of the current sub-object indicates a card specific change. If so, the process of step 3923 proceeds to step 4604. Otherwise, the process proceeds to step 4602 where the current state of all modifier flags is saved in memory 1047. At the next step 4603, a modifier flag counter configured within memory 1046 is set to the value of the lowest significant bit of the tag of the current sub-object, plus one. The process of step 3923 continues at the next step 4604, where the CPU 1045 executes an exclusive OR operation on the first data byte of the current sub-object and the first modifier flags byte configured within memory 1046. At the next step 4605, the CPU 1045 executes an exclusive OR operation on the second data byte of the current sub object and the second modifier flags byte configured within memory 1047. The process of step 3923 then concludes.

7.17 Transmit Message Character Process

Figure 47:
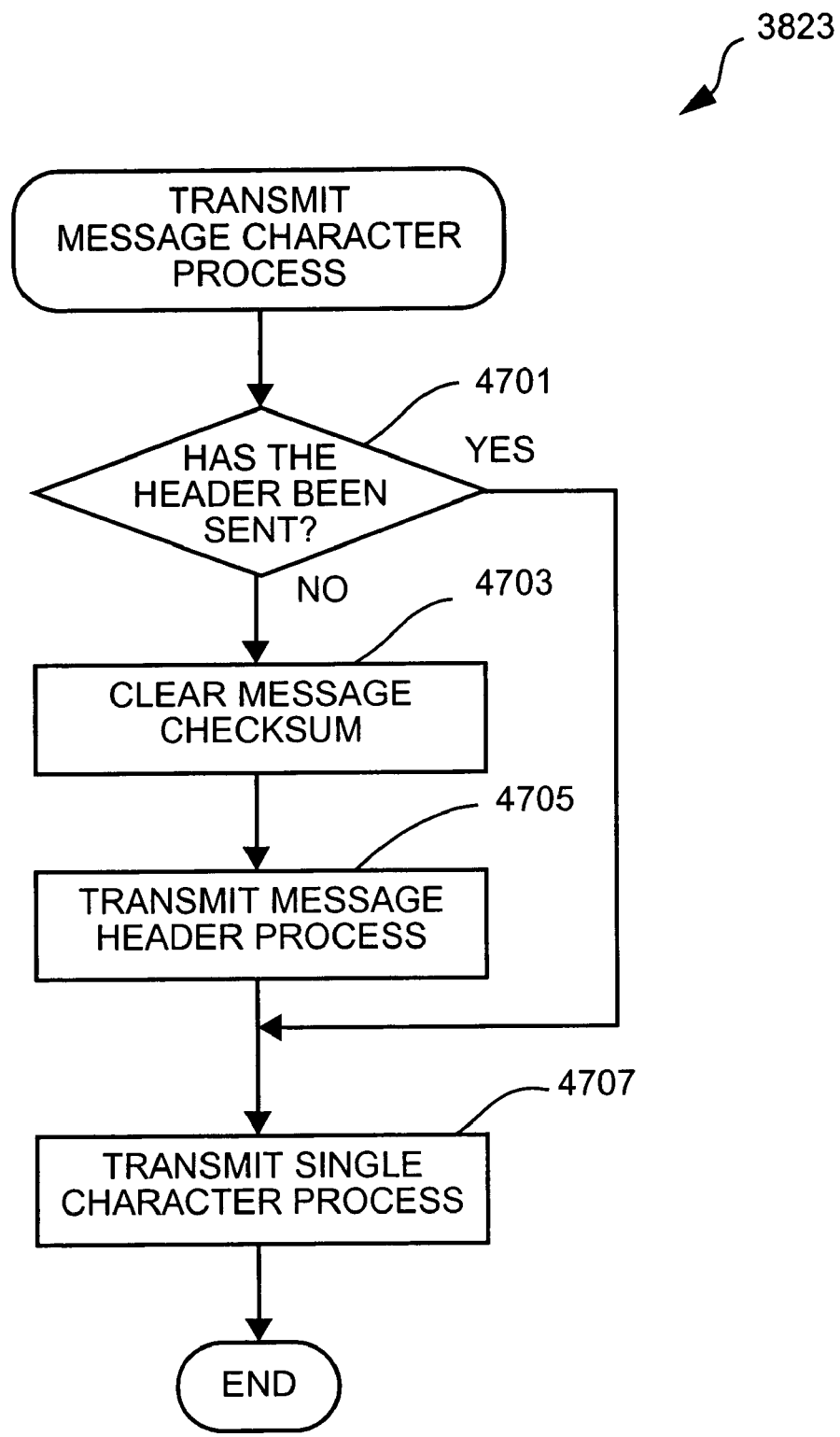
FIG. 47 is a flow diagram showing a transmit message character process, as performed during the process of FIG. 38.

FIG. 47 is a flow diagram showing the transmit message character process, as performed at step 3823. The transmit message character process is preferably implemented as software resident in memory 1046 and being executed by the CPU 1045, in order for the reader 300 to transmit a single character forming part of a current message body. If the message header 1100 for a current message has not been transmitted by the reader 300 then the message header 1100 is transmitted before the single character. The transmit message character process begins at step 4701, where if the CPU 1045 determines that a message header 1100 for the current message has not been transmitted then the process of step 3823 proceeds directly to step 4707. Otherwise, the CPU 1045 clears the message checksum at the next step 4703. Then at step 4705, the CPU 1045 executes a transmit message header process. The transmit message header process will described in more detail with reference to FIG. 9 . The process of step 3823 concludes at the next step 4707 where the CPU 1045 executes a transmit single character process. The transmit single character process will be described in further detail below with reference to FIG. 49

7.18 Transmit Checksum Routine

Figure 9:
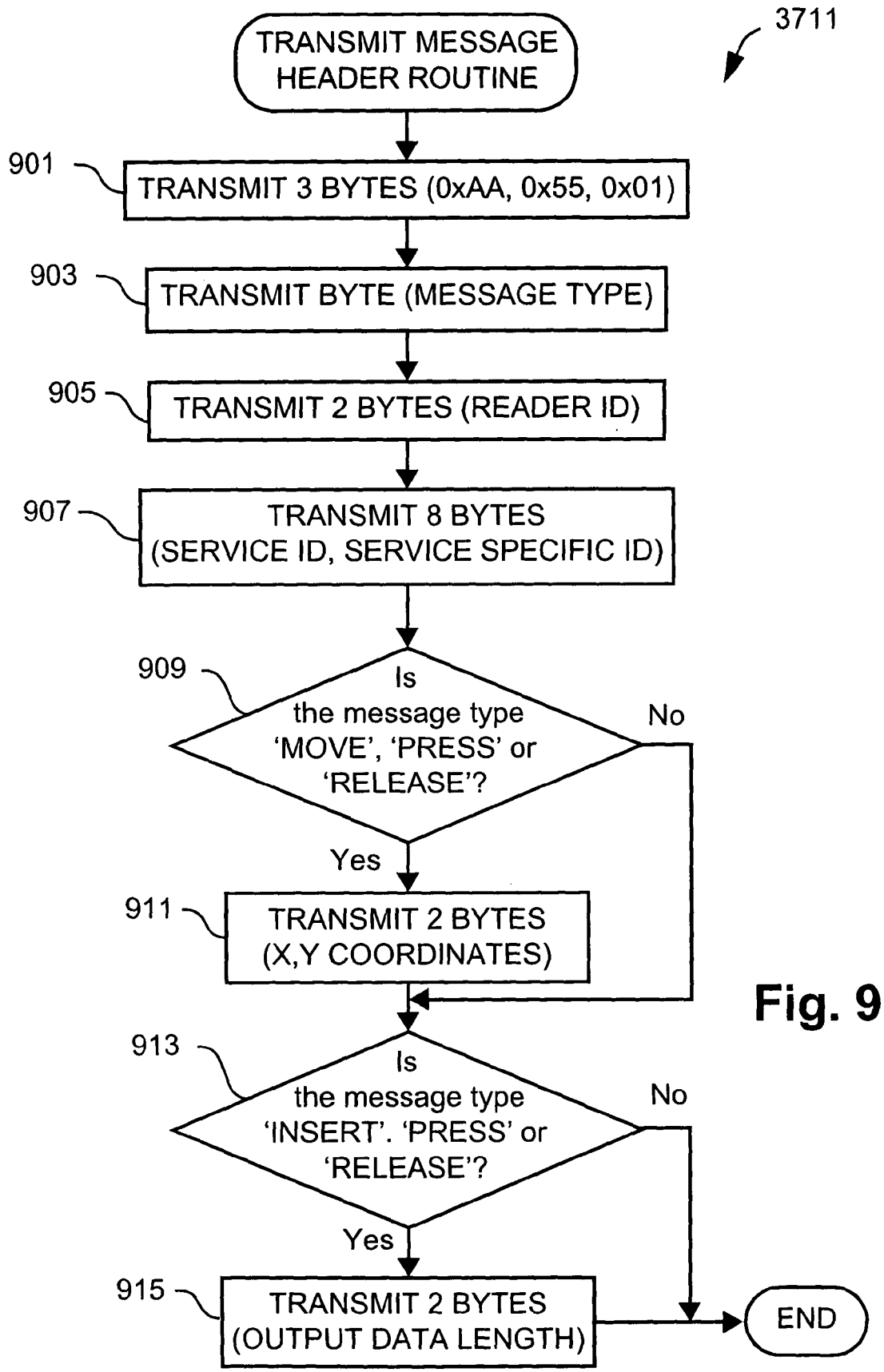
FIG. 9 is a flow diagram showing a transmit message header process, as performed during the processes of FIGS. 37, 47 and 48.
Figure 48:
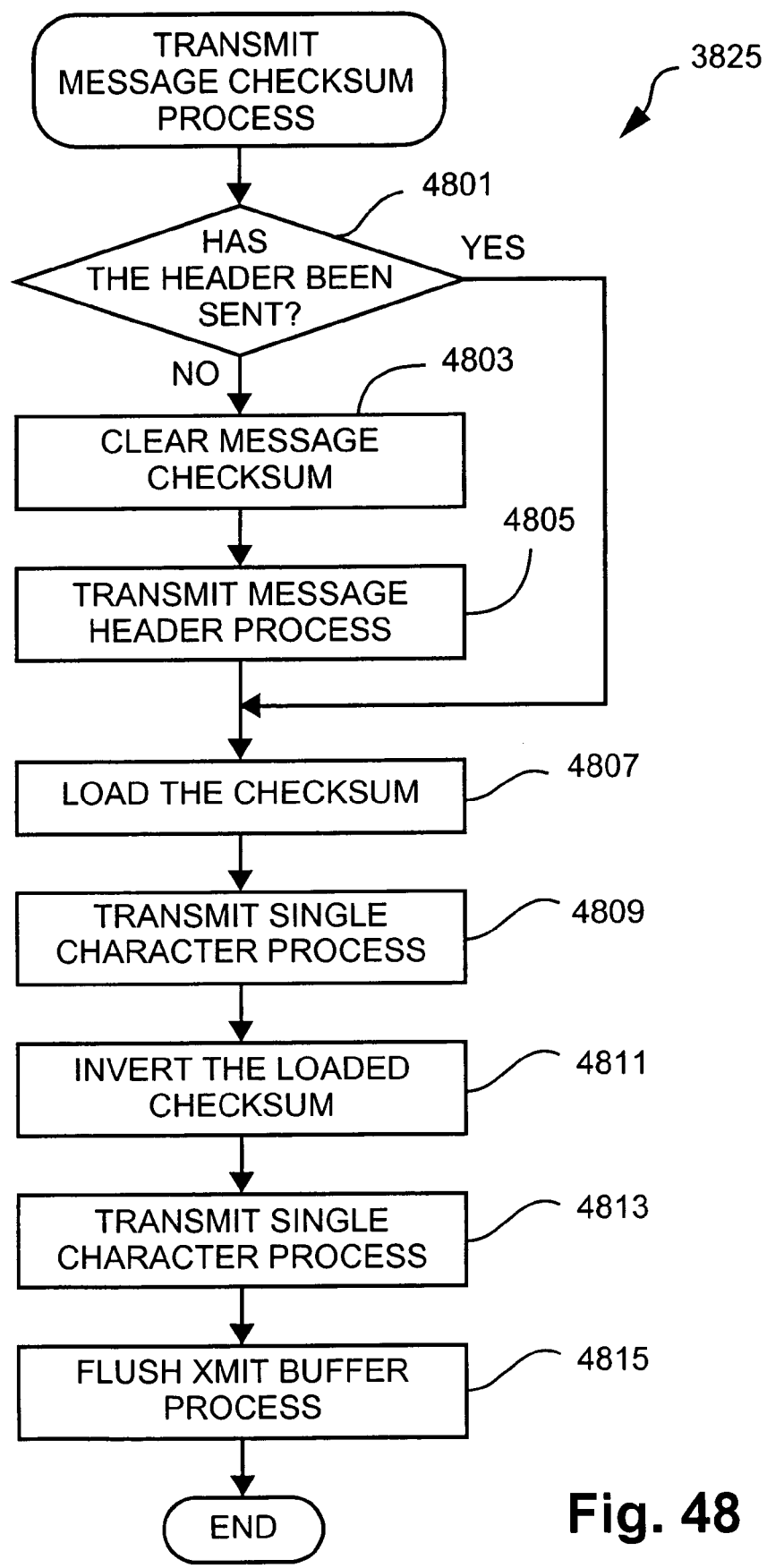
FIG. 48 is a flow diagram showing a transmit message checksum process, as performed during the process of FIG. 38.

FIG. 48 is a flow diagram showing the transmit message checksum process, as performed at step 3825. The transmit message checksum process is preferably implemented as software resident in memory 1046 and being executed by the CPU 1045, in order for the reader 300 to transmit the checksum following a message body. If the message header 1100 for the current message has not been transmitted by the reader 300 then the message header 1100 is transmitted before the message checksum. The transmit message checksum process begins at step 4801, where if the CPU 1045 determines that the message header 1100 of the current message has been transmitted by the reader 300 then the process of step 3825 proceeds directly to step 4807. Otherwise the process proceeds to step 4803 where the message checksum is cleared. At the next step 4805 the transmit message header process of FIG. 9 is executed by the CPU 1045. Then, at step 4807 the CPU 1045 loads the checksum of the current message into memory 1047. The process of step 3825 continues at the next step 4809 where the CPU 1045 executes the transmit single character process, which will be described below with reference to FIG. 49. At the next step 4811, the checksum loaded into memory 1047 at step 4807 is inverted by the CPU 1045. The process of step 3825 continues at the next step 4813, where the transmit single character process is again executed by the CPU 1045. The process concludes at step 4815 where the CPU 1045 executes a flush transmit buffer process in order to send all of the data present in a transmission buffer configured within memory 1046 before clearing the buffer. The flush transmission buffer process will be described in detail below with reference to FIG. 50.

7.19 Transmit Single Character Process

Figure 49:
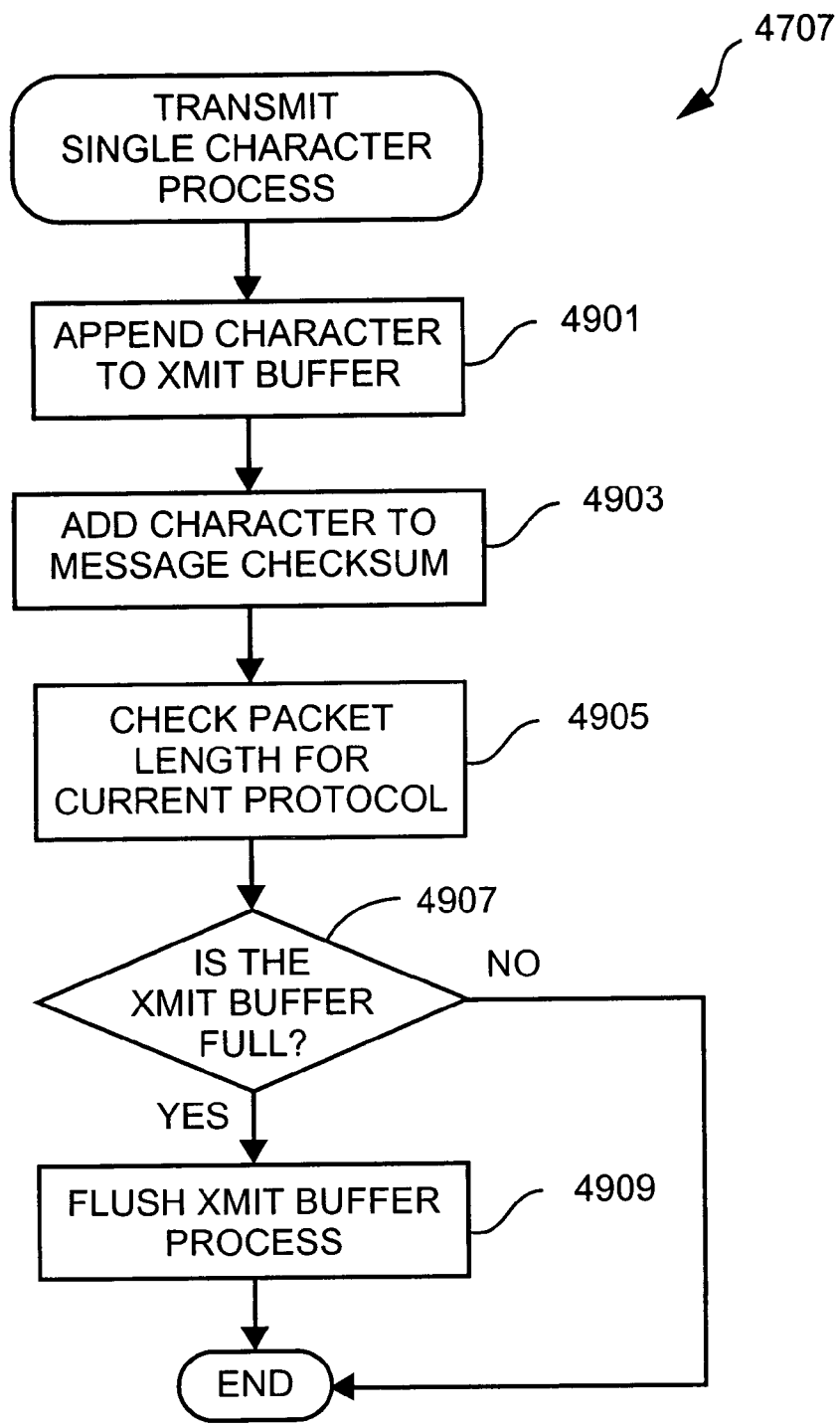
FIG. 49 is a flow diagram showing a transmit single character process, as performed during the processes of FIGS. 47 and 48.

FIG. 49 is a flow diagram showing the transmit single character process, as performed at steps 4707, 4809 and 4813. The transmit single character process is executed by the CPU 1045 and begins at step 4901, where a next character of the current message is appended to the transmission buffer. At the next step 4903, the character is added to the message checksum by the CPU 1045. Then at step 4905, the length of the packet formed by the single character and the message checksum is checked against the output buffer length element of the protocol properties portion 2701 for the current protocol. The process of step 4707 continues at the next step 4907 where if the transmission buffer is full then the process concludes. Otherwise, the process of step 4707 proceeds to step 4909 where a flush transmission buffer process is executed by the CPU 1045, as at step 4815.

7.20 Flush Transmit Buffer Process

Figure 50:
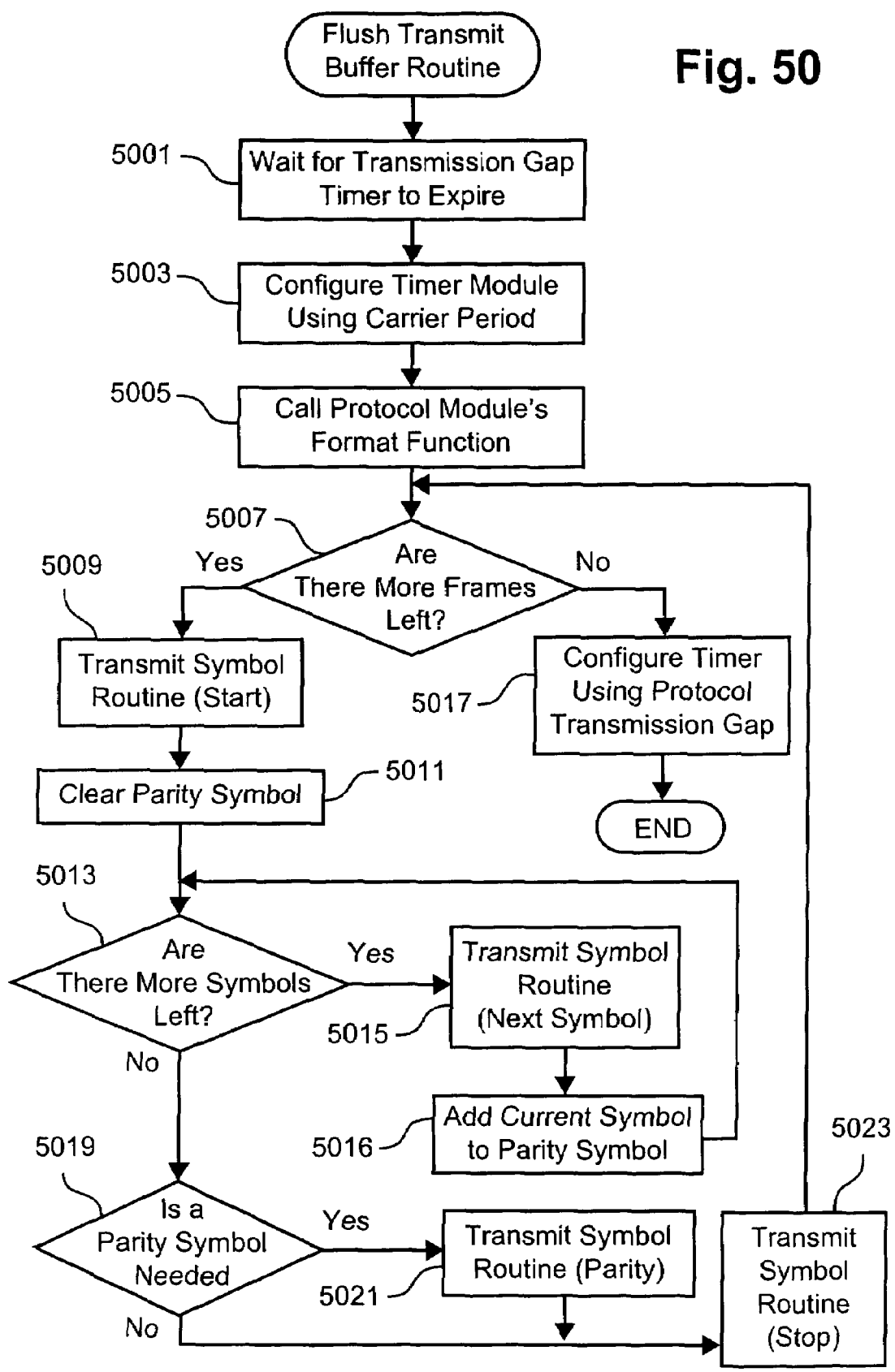
FIG. 50 is a flow diagram showing a flush transmission buffer process, as performed during the processes of FIGS. 48 and 49.

FIG. 50 is a flow diagram showing the flush transmission buffer process, as performed at steps 4815 and 4909. The flush transmission buffer process is preferably implemented as software being resident in memory 1046 and being executed by the CPU 1045. The process begins at step 5001, where the CPU 1045 waits until a transmission gap timer, configured within the timer interface module 1060, has expired. Then at step 5003 the CPU 1045 prepares the timer module 1060 of the microcontroller 1044 for transmission using the carrier period for the current protocol as defined by the current protocol module. At the next step 5005, the CPU 1045 invokes the format function from the protocol module (e.g. the module 2700) for the current protocol from memory 1046. If there are any more frames left in the current message at the next step 5007 then the process of step 4815 proceeds to step 5009. Otherwise, the process proceeds to step 5017. At step 5009 the CPU 1045 executes a transmit symbol process to transmit a first symbol for a current frame of the current message. The transmit symbol process will be explained in more detail below with reference to FIG. 18.

The process of step 4815 continues at the next step 5011, where the parity symbol for the current frame is cleared. At the next step 5011, if there are no more symbols of the current frame left to be transmitted then the process proceeds to step 5019. Otherwise the process proceeds to step 5015 where the CPU 1045 executes the transmit symbol process to transmit a next symbol for the current frame. Then at step 5016, the current symbol is added to the parity symbol for the current frame and the process of step 4815 returns to step 5013.

At step 5019, if the CPU 1045 determines that a parity symbol needs to be transmitted for the current frame then the process proceeds to step 5021. Otherwise, the process proceeds directly to step 5023. At step 5021, the transmit symbol process is executed by the CPU 1045 to transmit the parity symbol. Then at step 5023, the transmit symbol process is executed by the CPU 1045 to transmit the stop symbol of the current frame and the process of step 4815 returns to step 5007.

At step 5017, the CPU 1045 configures the gap timer to expire after the protocol transmission gap between frames for the current message, and the process of step 4815 concludes.

7.21 Wait 10 Millisecond Process

Figure 51:
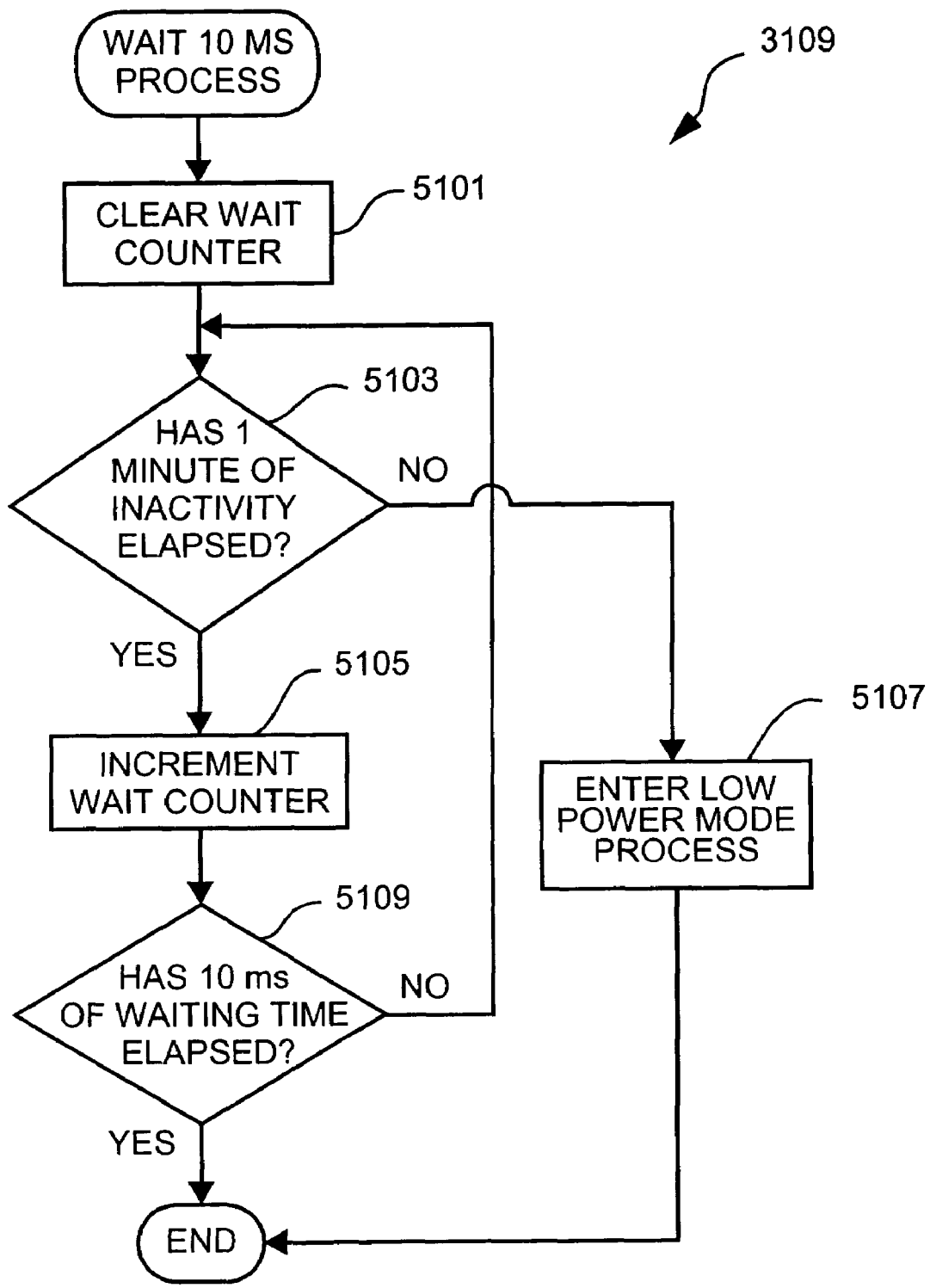
FIG. 51 is a flow diagram showing a wait ten millisecond process, as performed during the process of FIG. 31.

FIG. 51 is a flow diagram showing the wait 10 ms process, as performed at step 3109 of the initialization process of FIG. 31. The wait 10 millisecond process is executed by the CPU 1045 to loop in order to consume processor cycles until 10 milliseconds has elapsed. The process of step 3109 begins at step 5101 where a wait counter configured within memory 1047 is cleared. At the next step 5103 if one minute of user inactivity has elapsed then the process proceeds to step 5105. Otherwise the process proceeds to step 5107 where the reader 300 enters low-power mode in accordance with an enter low-power mode process which will be described below with reference to FIG. 52, and the process of step 3109 concludes. The enter low power mode process is executed by the CPU 1045 to prepare the reader 300 and the card 100 to enter low power mode. At step 5105 the wait counter configured within memory 1047 is incremented. If 10 milliseconds of waiting time has not elapsed at the next step 5109 then the process returns to step 5103. Otherwise, the process of step 3109 concludes.

7.22 Enter Low Power Mode

Figure 52:
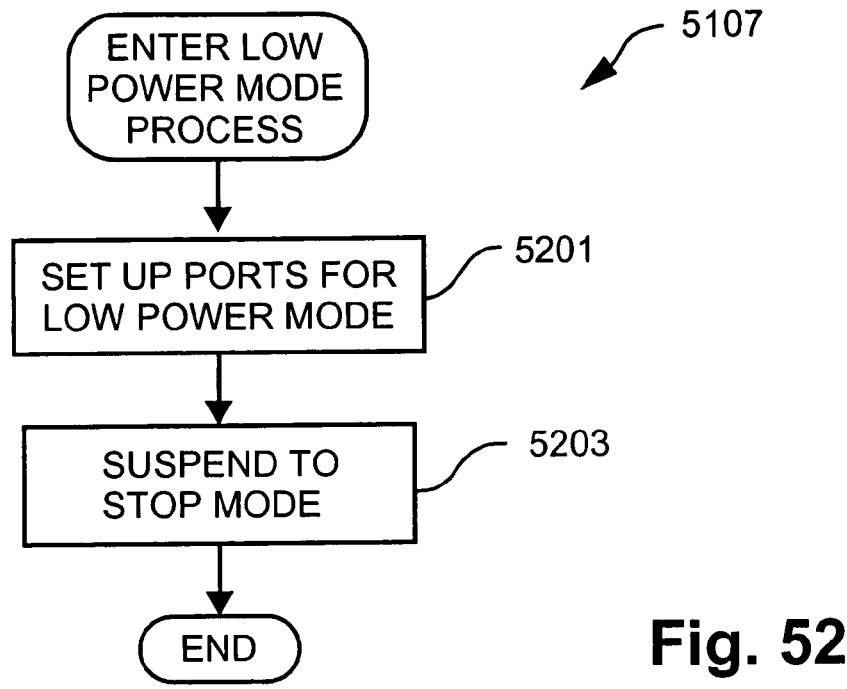
FIG. 52 is a flow diagram showing an enter low power mode process, as performed during the process of FIG. 51.

As well as preparing the reader 300 and the card 100 to enter low power mode process, as described above, this process also controls wait mode timer wake-ups when the card 100 is inserted into the reader 300. FIG. 52 is a flow diagram showing the enter low power mode process, as performed at step 5107, of the wait 10 millisecond process of FIG. 51. The process of step 5107 begins at step 5201 where the CPU 1045 sets up the output ports of the microcontroller 1044 to minimise current consumption during low power mode. The process concludes at the next step where the reader 300 is suspended to stop mode.

7.23 Timer Overflow Interrupt Service Routine

Figure 53:
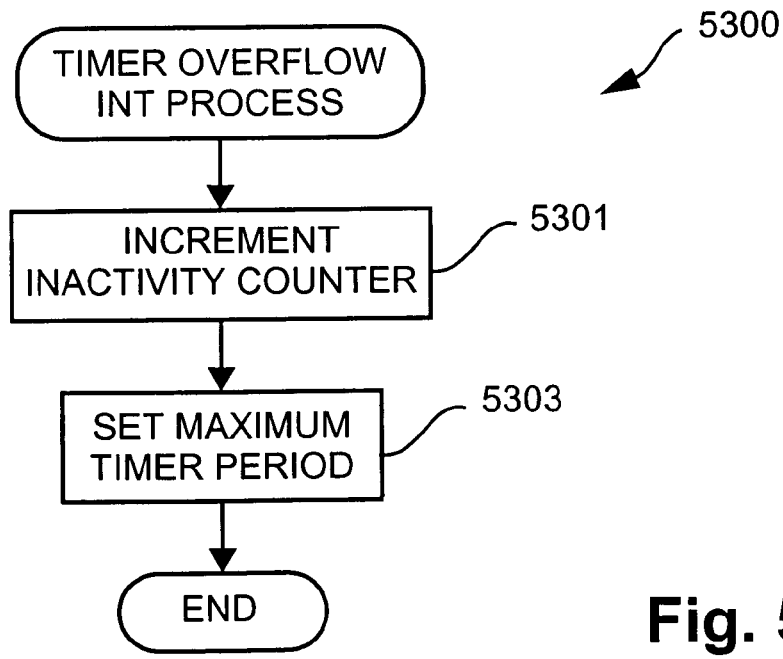
FIG. 53 is a flow diagram showing a timer overflow interrupt service process.

FIG. 53 is a flow diagram showing a timer overflow interrupt service process 5300, which is executed by the CPU 1045 when an overflow of a 16-bit free-running counter configured within the timer interface counter 1060, occurs. An initial timer interrupt following any transmission by the reader 300 indicates the expiry of the transmission gap time set by a currently active protocol module for the reader 300. Subsequent interrupts are triggered at the maximum period supported by the timer interface module 1060 in order to count idle time required before the reader 300 enters low power mode. The timer interface module 1060 generates an interrupt, which vectors to the process 5300. The timer overflow interrupt service process calculates how long the reader 300 has been idle (i.e., no user input). The process 5300 is preferably implemented as software resident in memory 1046. The process 5300 begins at step 5301, where the CPU 1045 increments a counter configured within memory 1047. At the next step 5303 the process 5300 sets a maximum period for the timer, indicating also that the transmission gap has expired, and the process 5300 concludes.

7.24 Transmit Message Header Process

FIG. 9 is a flow diagram showing the transmit message header process, as performed at steps 3711, 4705 and 4805. The transmit message header process is preferably implemented as software resident in memory 1046 and being executed by the CPU 1045. As described above, the transmit message header process transmits a reader application message header and any other information that is not read from the card 100, for the current message.

The process of step 3711 begins at step 901, where the CPU 1045 transmits three constant bytes of the message, which includes a two byte preamble and a one byte protocol version number. At the next 903, the CPU 1045 transmits the next byte of the current message, which specifies the type of message. The process continues to the next step 905, where the next two bytes of the current message, representing the identifier for the reader 300, are transmitted by the CPU 1045. At the next step 907, the CPU 1045 transmits eight bytes representing the service identifier and the service specific identifier for the card 100. Then at step 909, if the message type is a "MOVE", "PRESS" or "RELEASE" type message then the process proceeds directly to step 911.

Otherwise, the process proceeds to step 913.

At the next step 911, the CPU 1045 transmits the next two bytes of the current message, representing the coordinates of the move, press or release event. Then at step 913, if the message type is an "INSERT", "PRESS" or "RELEASE" type message then the process proceeds to step 915. Otherwise the process of step 3711 concludes. At step 915, the CPU 1045 transmits the final two bytes of the current message header, indicating the length of data to follow in the variable length part of the message and the process concludes.

7.25 Transmit Symbol Process

Figure 18:
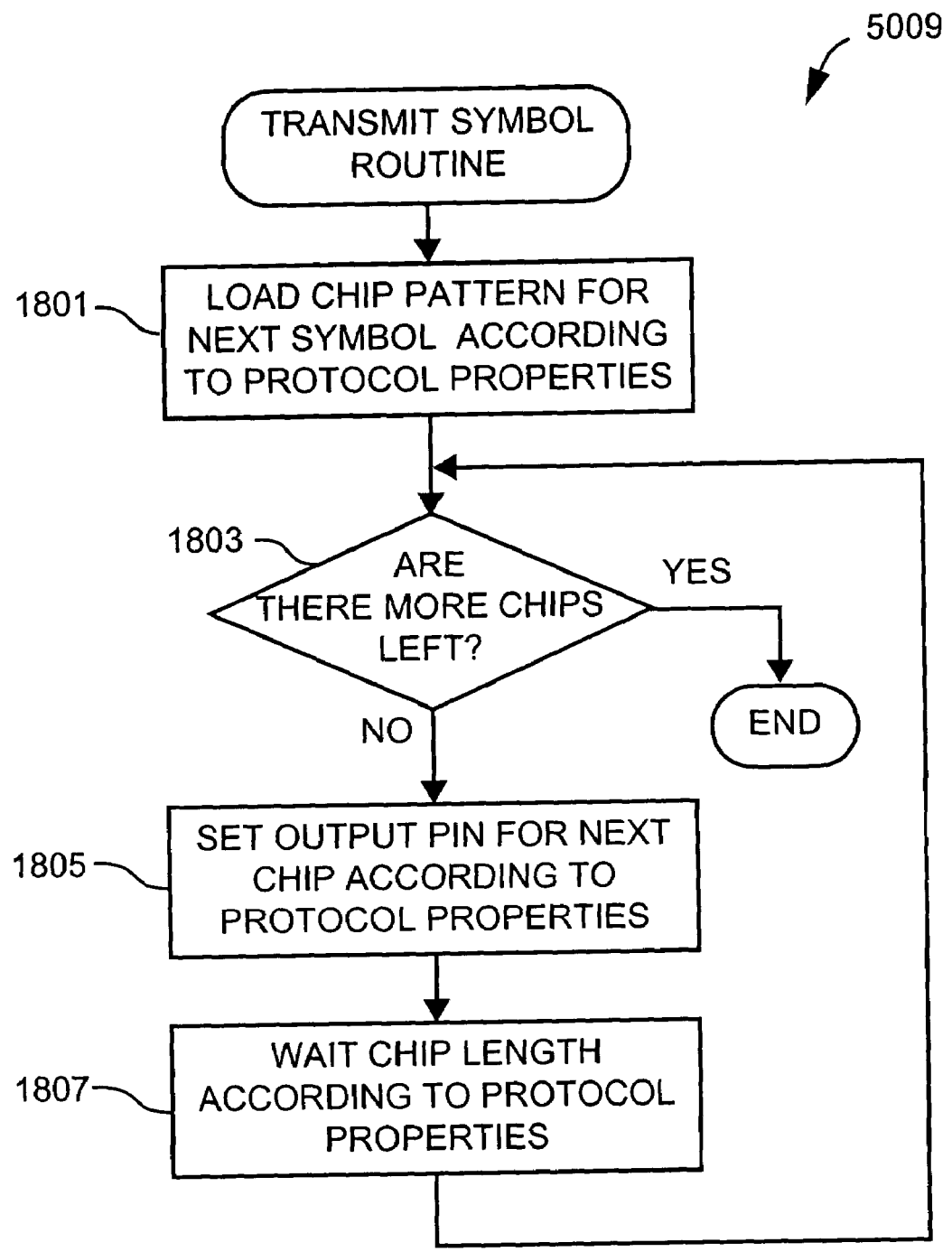
FIG. 18 is flow diagram showing a transmit symbol process as performed during the processes of FIG. 48.

FIG. 18 is a flow diagram showing the transmit symbol process, as performed at steps 5009, 5015 and 5021. The transmit symbol process is preferably implemented as software resident in memory 1046 and being executed by the CPU 1045. As described above, the transmit symbol process transmits a symbol of a current frame for the current message.

The process of step 5009 begins at step 1801, where the CPU 1045 loads a chip pattern (see Table 19) for a next symbol according to the symbol definition for the next symbol. Then at step 1803, if there are no more chips left to be processed for the current symbol, then the process of step 5009 concludes. Otherwise, the process proceeds to step 1805 where the CPU 1045 sets the output pin for the next chip according to the protocol properties for the current protocol. Then at step 1807, the CPU 1045 waits for a period of time corresponding to the chip length (see table 19) according to the protocol properties of the current protocol. After step 1807, the process of step 5009 returns to step 1803.

The aforementioned methods comprise a particular control flow. There are many other variants of the preferred methods, which use different control flows without departing the spirit or scope of the invention. Furthermore one or more of the sub-steps of the preferred method(s) may be executed in parallel rather sequential.

8.0 FURTHER EXAMPLES

The arrangements described above will be further described by way of several examples with particular reference to the system 600B of FIG. 6(b).

8.1 Multiple Set-top Boxes

Example 1

A typical cable television operator has many subscribers using set-top boxes (e.g. the set top box 601). The set top boxes are typically supplied to subscribers from different manufacturers and each set top box typically employs a different set of communication protocols to receive keyboard, mouse and remote control input. In order to deploy readers similar to the reader 300, which will work with these varying set top boxes, without conflicting with other devices (e.g., VCRs, remote controlled doors, air conditioners etc), different infrared protocols must be used and installed as part of the firmware on the readers.

Figure 54:
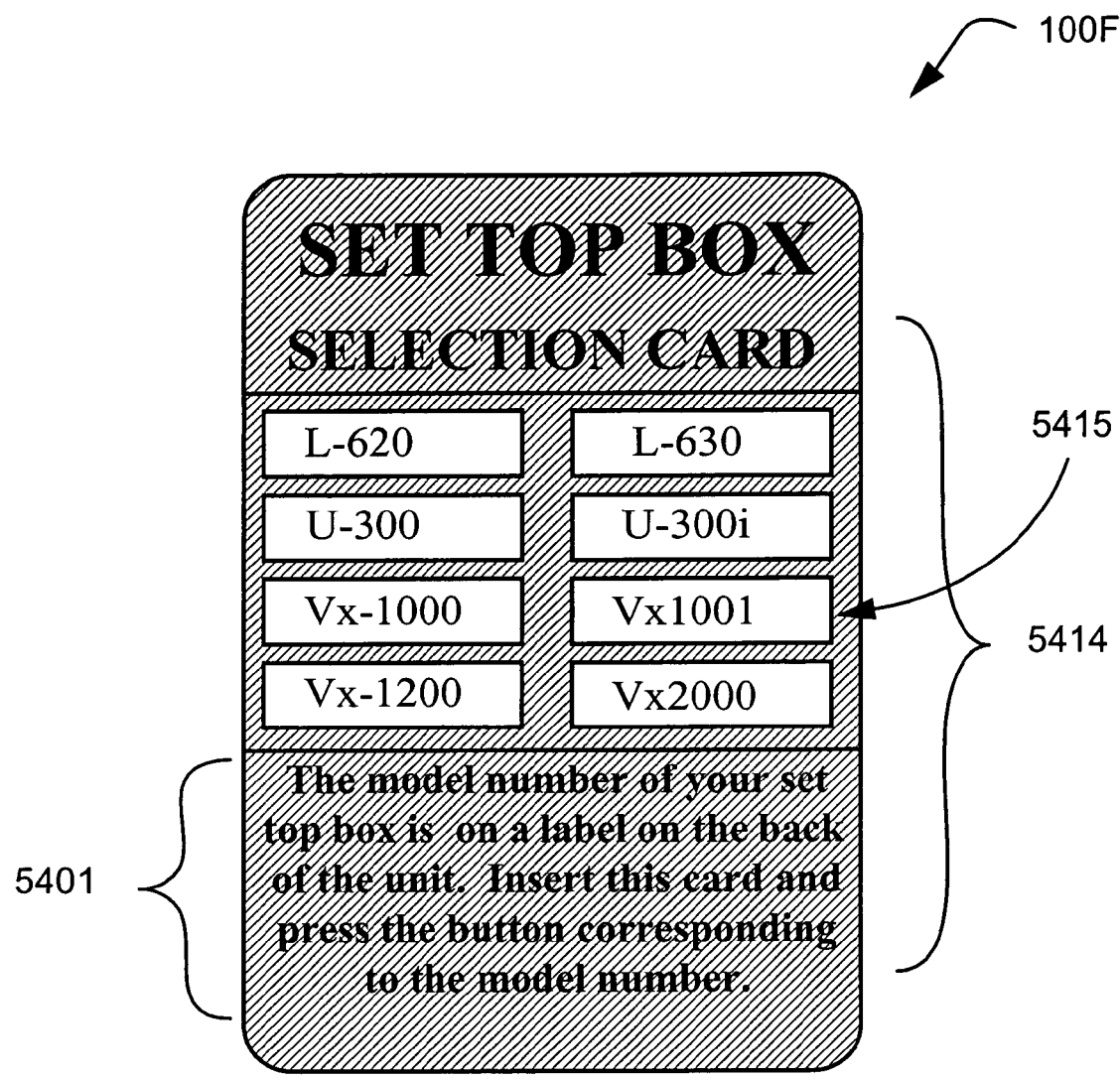
FIG. 54 shows the front face of a smart card configured for selecting a model number corresponding to a remotely controlled appliance.

Most cable television operators would prefer to have a single model of reader, such as the reader 300, with the same firmware stored thereon. Such a reader 300 can be transported to the subscriber, on subscription to the network, together with a card 100F, as shown in FIG. 54. The card 100F is configured for selecting a transmission protocol to be used by the reader 300 for a particular set top box 601 as owned by the subscriber. For the card 100F, user interface elements 5414 printed on the card 100F are in the form of buttons, which are labelled with model numbers of set top boxes (e.g. L-620, U-300, etc).

Each of the user interface elements 5414 has an associated user interface object, stored in a memory (not shown) of the card 100F, containing protocol configuration data. The protocol configuration data specifies which protocols a particular set top box uses for each of the four device modes (i.e., keyboard, mouse, user interface card reader and remote control) of the reader. The memory of the card 100F also has a number of protocol modules (e.g. the module 2700), defining the specified protocols (i.e., L-620, L-630, U-300 etc) stored therein.

The reader 300 has firmware stored in memory 1046 such that when the card 100F is inserted into the reader 300, the user can select one of the user interface elements 5414 according to which model of set-top box 601 the user owns. In response to such a selection, the reader 300 will be automatically configured to operate using the same protocol(s) as the particular set-top box.

Figure 20:
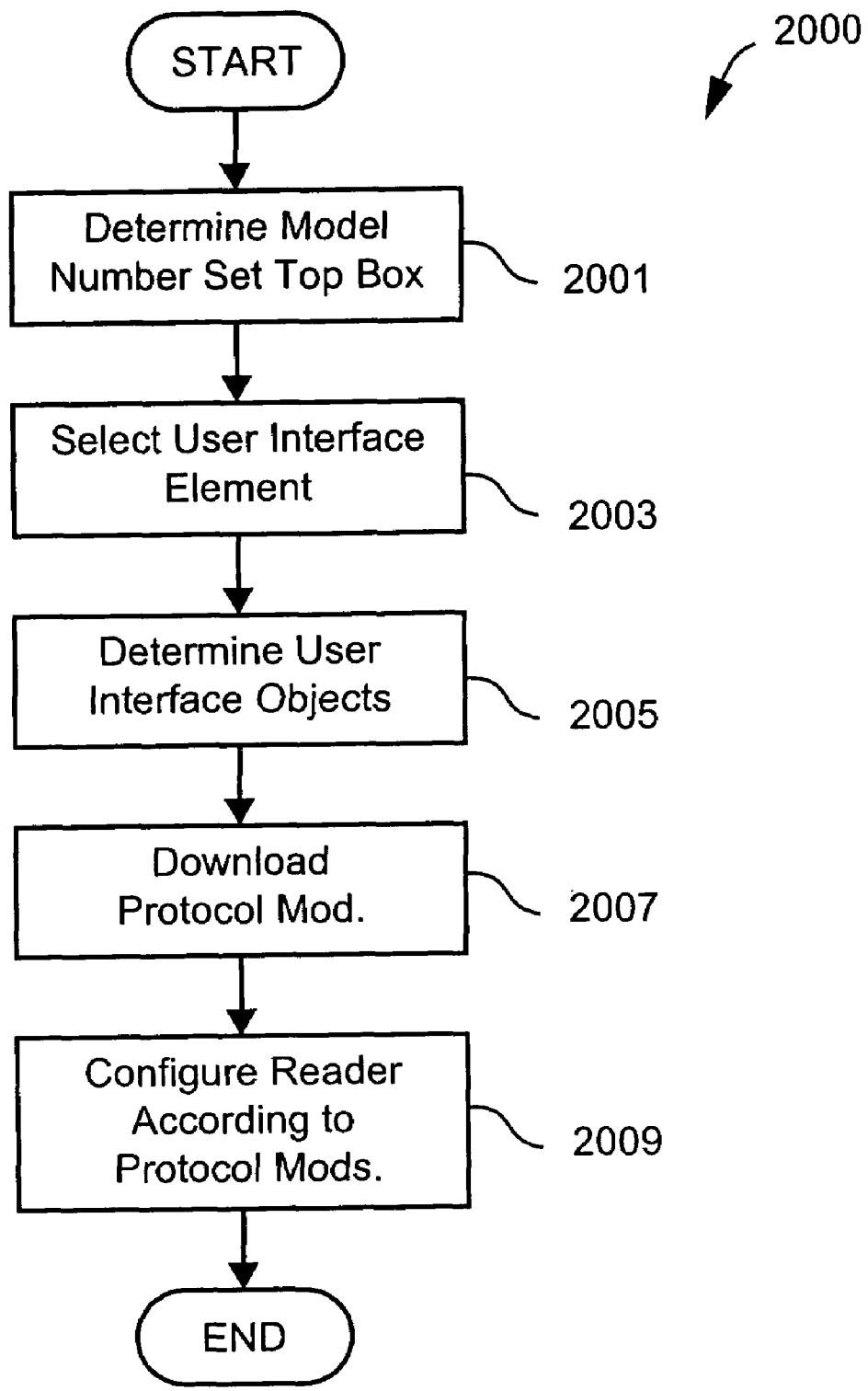
FIG. 20 is a flow diagram showing a process for configuring the reader of FIG. 6(b) to communicate with the set top box of FIG. 6(a)
Figure 21:
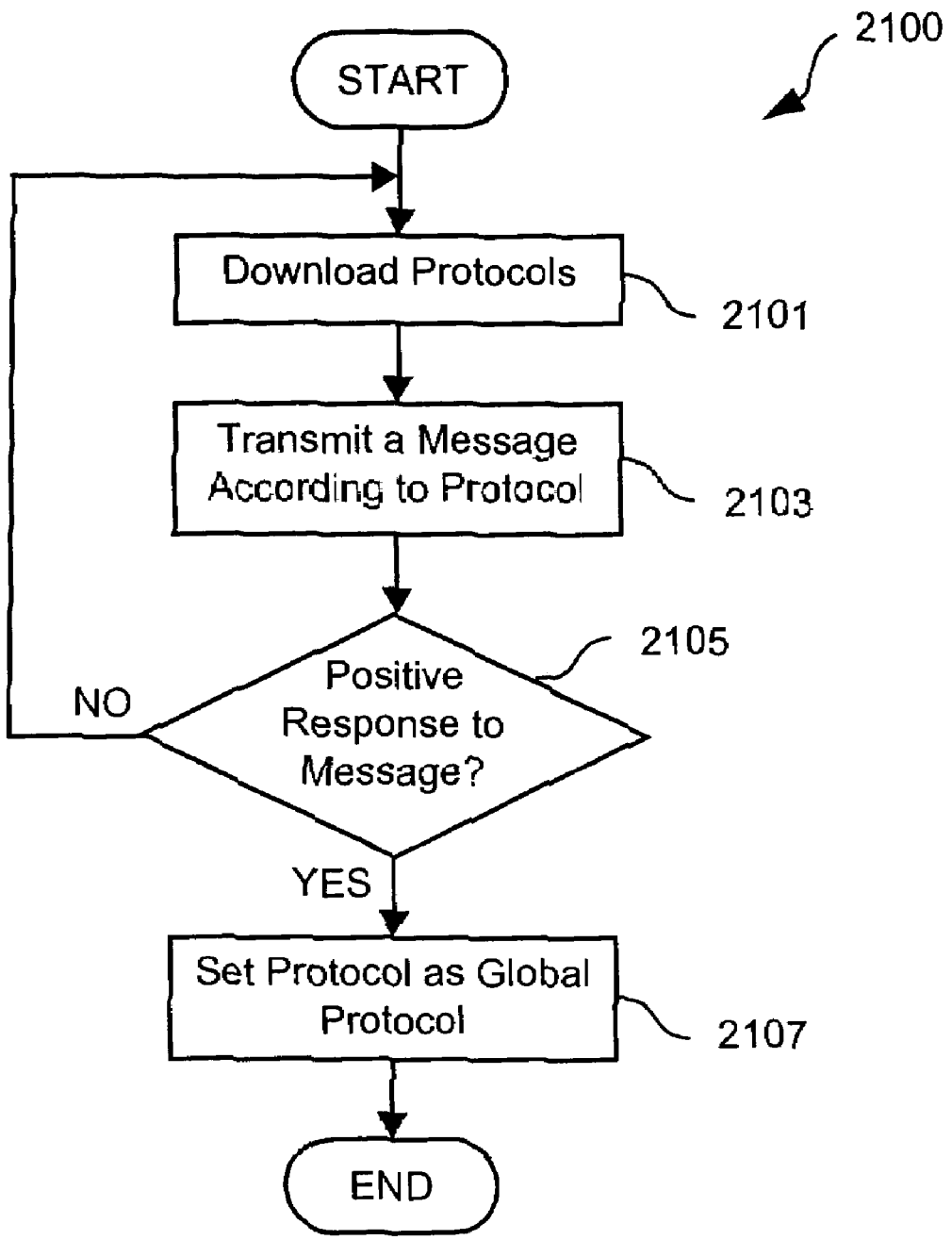
FIG. 21 is a flow diagram showing a process for determining a communication protocol for the reader of FIG. 6(b)

FIG. 20 is a flow diagram showing a process 2000 for configuring a reader 300 to communicate with a set top box 601, in one implementation. The process begins at step 2001, where the model number of the set top box is determined. The model number can be determined according to an identifier label printed on the back of the set top box 601. Instructions on how to determine the, model number can be printed on the card 100F, as shown in FIG. 54. At the next step 2003, one of the user interface elements 5414 can be selected depending on which model the set top box 601 is determined to be. If, for example, the value of the identifier is "Vx-1001", then card 100F can be inserted into the reader 300 and the user interface element 5415 labelled Vx-1001 can be selected. Then at step 2005, the reader 300 compares the coordinates of the selected user interface element (i.e., user interface element 5415) against data stored in the memory of the card 100F, according to the process 3608, and determines that the coordinates correspond to a user interface object containing protocol configuration data. In this example, the protocol configuration data specifies that for a Vx-1001 model reader, user interface card messages should be transmitted by the reader 300 to the set top box 601 using the RC-MM protocol (as known to those in the relevant art), remote control messages should be transmitted using the RC5 protocol (as known to those in the relevant art), and that keyboard and mouse messages should be transmitted using a proprietary protocol created by the manufacturer of the Vx-1001 model set top box 601.

The user interface object stored in a memory of the card 100F and being associated with the user interface element 5415 thus contains the following sub-objects:
(i) Download Protocol Module (RC-MM);
(ii) Download Protocol Module (RC5);
(iii) Download Protocol Module (Vx-1001);
(iv) Set Global Reader Application Protocol (RC-MM);
(v) Set Global Keyboard Protocol (Vx-1001);
(vi) Set Global Mouse Protocol (Vx-1001); and
(vii) Set Global Remote Control Protocol (RC5).

The process 2000 continues at the next step 2007, where the reader 300 down-loads protocol modules (e.g., 2700) defining the specified protocols (i.e., RC-MM, RC5 and the Vx1001 proprietary protocol) from the memory of the card 100F and stores the specified protocols in memory 1046. The specified protocols are downloaded by the reader 300 in accordance with the process 3911. At the next step 2009, the CPU 1045 of the reader 300 executes the firmware stored on the reader 300 such that the reader 300 is configured to use the specified protocols by default when the reader 300 is sending messages of the designated types by setting each global protocol pointer to refer to one of the newly down-loaded protocols.

8.2 Multiple Set-Top Boxes

Example 2

Figure 29:
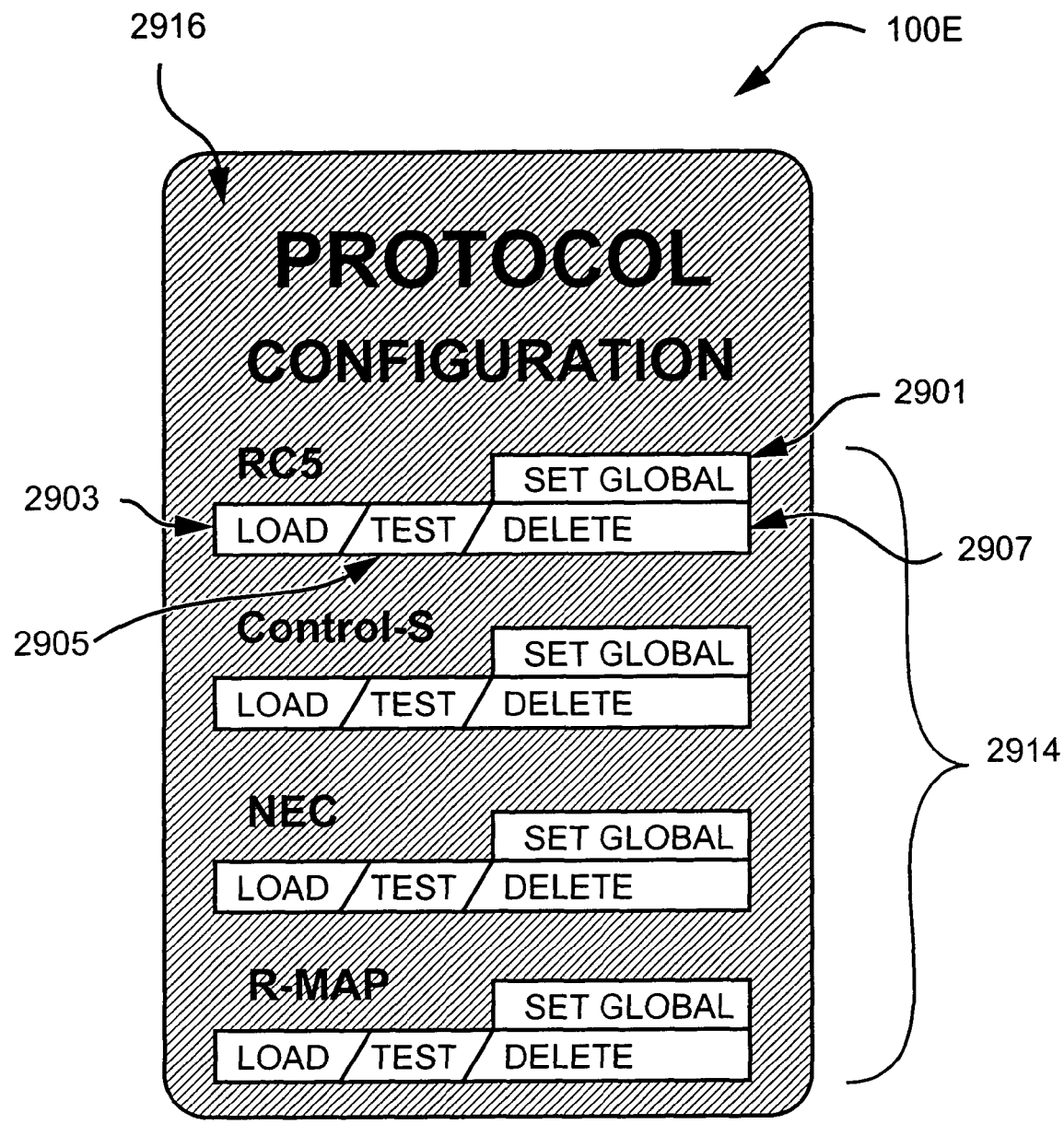
FIG. 29 shows the front face of a smart card configured for selecting a protocol to be used by the reader of FIG. 3.

FIG. 29 shows an example of another card 100E, similar to the card 100F described above. However, the card 100E is configured for selecting a transmission protocol to be used by the reader 300 in the system 600 and in particular in the system 600B. User interface elements 2914 of the card 100E are in the form of a "SET GLOBAL" button 2901, a "LOAD" button 2903, a "TEST" button 2905 and a "DELETE" button 2907, printed on a front face 2916 of the card 100E, for each of four particular protocols (i.e., RC5, Control-S, NEC and R-MAP as known to those in the relevant art) of a reader 300 or system 600. The labels on each of the user interface elements suggest the function of each of the elements 114 and will not be described in detail.

In this example, similar to Example 1 above, a user is provided with the card 100E of FIG. 29. The card 100E includes protocol modules for each of a set of protocols (i.e., RC5, Control-S, NEC and R-MAP as known to those in the relevant art) stored in a memory of the card 100E. The user is then instructed by the supplier of the card 100E and the associated reader 300, to load and test each of the protocols listed on the card 100E until a positive response is observed on a target set top box.

FIG. 60 is a flow diagram showing a process 6000 for determining a communication protocol for the reader 300, in one implementation. The process begins at step 2101, where with the card 100E inserted in the reader 300, a first protocol module corresponding to a first protocol (e.g., 'RC5') is down-loaded by the reader 300 into memory 1047 (i.e., RAM), upon selection of one of the user interface elements 2914 (i.e., element 2903 in the case of protocol RC5). The first protocol is down-loaded by the reader 300 in accordance with the process 3911.

At the next step 2103, the CPU 1045 of the reader 300 transmits a message to the set top box 601 upon selection of one of the user interface elements labelled as 'test' (i.e. element 2905 in the case of protocol RC5). Then at step 2105, if a positive response is observed in response to the transmission then the process 6000 proceeds to step 2107. Otherwise, the process 6000 returns to step 2101 where a next protocol module (e.g. Control-S) is down-loaded by the reader 300. The first protocol module (i.e., RC5) can be deleted from the memory 1046 according to the process 4205 if there is not enough available space in memory 1046 to accept the next protocol module. The positive response can take the form, for example, of an indicator LED (not shown) on the set top box flashing or a function being performed by the audio visual output device 616 such as a menu being displayed.

The process 6000 concludes at the next step 2107, where the reader 300 is configured to use the protocol producing the positive response (i.e., RC5), by default, as the global protocol for the system 600B, upon a user interface element labelled "SETGLOBAL" (i.e., element 2901 in the case of the protocol RC5) being selected. In this instance, and a global protocol pointer configured within memory 1046 is set to point to the RC5 protocol module in memory 1046.

8.3 Set-Top Box Upgrade

Example 3

Figure 55:
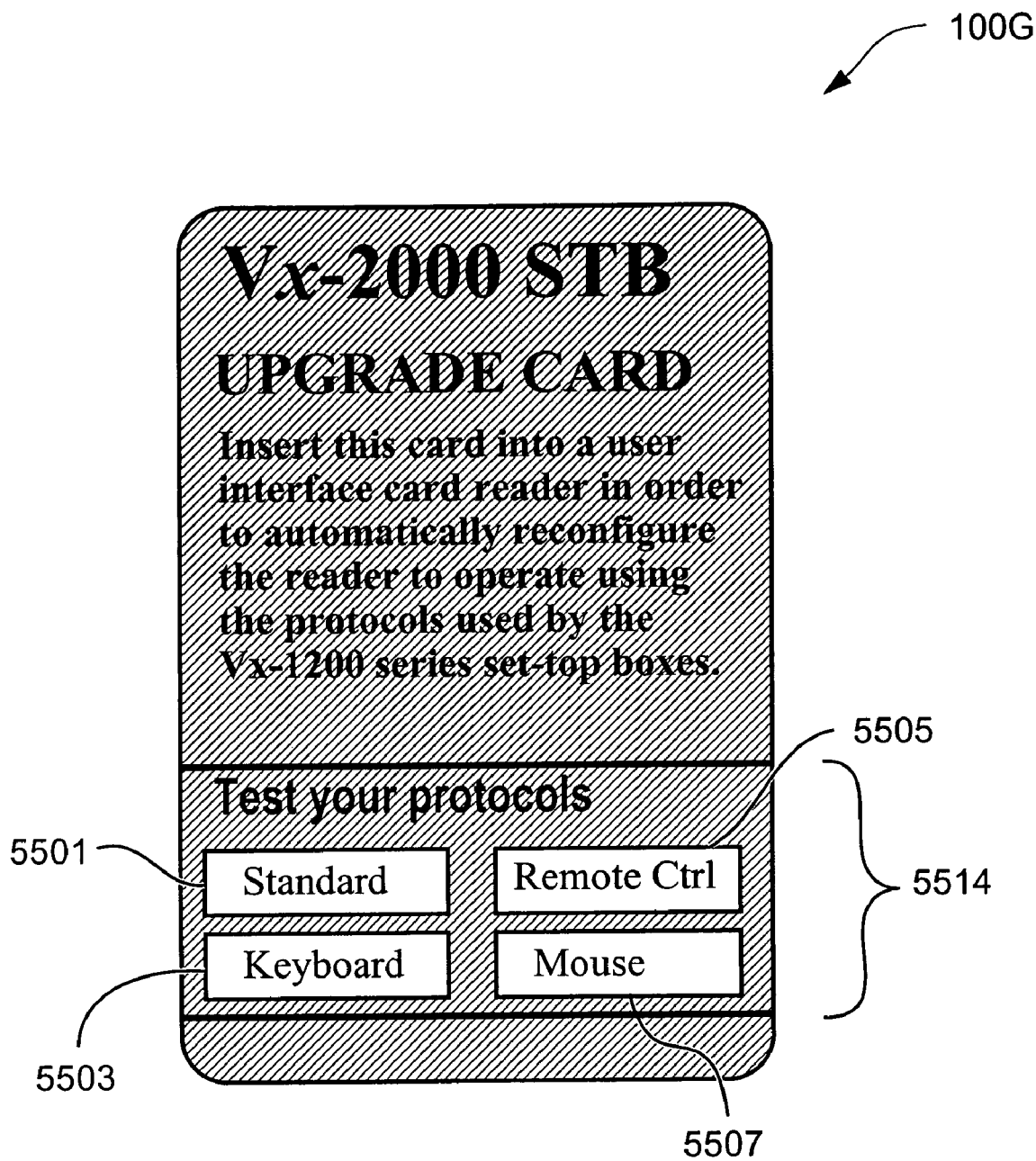
FIG. 55 shows the front face of a smart card configured for upgrading a protocol used by the set top box of FIG. 6(b)

In another example, an operator wishes to upgrade the set top boxes owned by subscribers, some of whom already own a reader 300, to a new type of set-top box (e.g. a new and improved Vx-2000 series set top box). A technician can be assigned to each of the subscriber's homes or offices to install the new set top boxes. Unfortunately, the new type of set top boxes use a different set of infrared communication protocols to the current set top boxes. Preferably, those subscribers who own a reader 300 would not be required to be issued with a different reader capable of communicating with the new set top box. Therefore, the technician carries a special card 100G, as seen in FIG. 55, which is configured to enable reconfiguration of the reader 300 to use the different set of infrared communications protocols as soon as the card 100G is inserted in the reader 300.

The card 100G is similar to the cards 100E and 100F, described above, and is configured for selecting the transmission protocol to be used by the reader 300. However, in the case of the card 100G, only the new set of protocols specified by the operator are stored in a memory of the card 100G. The new set of protocols are stored using a card data object, which contains the following sub-objects:

(i) Download Protocol Module (Vx-2000);
(ii) Set Global Reader Application Protocol (Vx-2000);
(iii) Set Global Keyboard Protocol (Vx-2000);
(iv) Set Global Mouse Protocol (Vx-2000); and
(v) Set Global Remote Control Protocol (Vx-2000).

The card 100G also includes user interface elements 5514 in the form of buttons 5501, 5503, 5505 and 5507, which are labeled 'Standard', Remote Ctrl', 'Keyboard' and 'Mouse' according to the device modes of the reader 300. Each of the user interface elements 5514 of the card 100G preferably has an associated Change Non-Global Protocol sub-object, as described above, which is effective for only one user interface element 5514 selection of the associated user interface element. The Change Non-Global Protocol sub-object contains the Vx-2000 protocol identifier followed by flags to indicate the device mode being by the associated user interface element 5514. An Output Data sub-object would contain data which will be recognised by the the set-top box 601 as a particular known command. Additionally, the user interface element 5507 marked as Mouse requires that a Move flag associated with the element 5507 is set, in order to allow movement messages to be sent.

Once the reader 300 has been configured to use the different set of infrared communications protocols, the technician can test the operation of the reader 300 for each of the supported device modes, by selecting the elements 5501 to 5507. Thus, the card 100G allows a technician to ensure that the new protocols have been successfully stored in the firmware of the reader 300.

Figure 22:
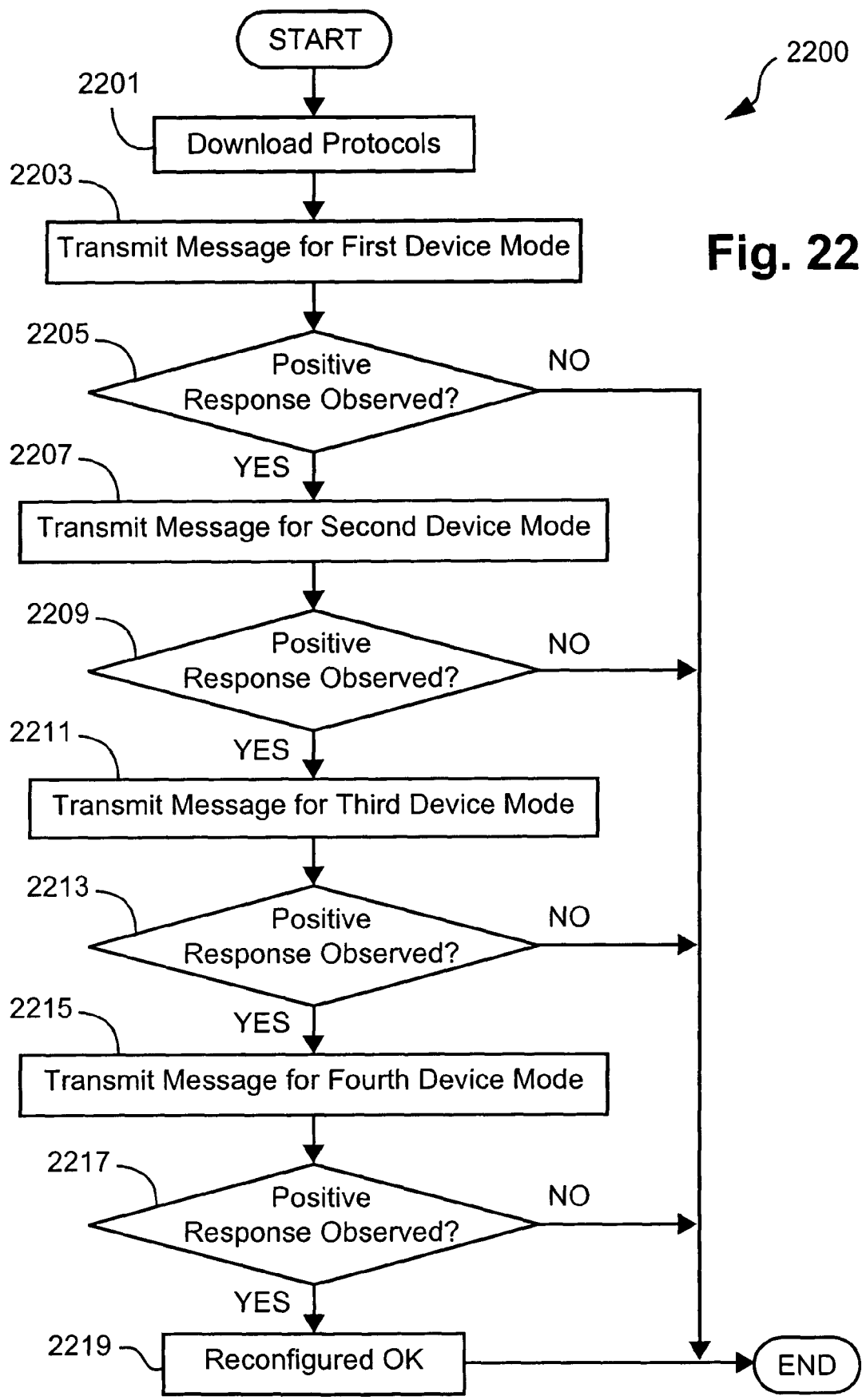
FIG. 22 is a flow diagram showing a process for reconfiguring the reader of FIG. 6(b).

FIG. 22 is a flow diagram showing a process 2200 for reconfiguring the reader 300 according to a new set of communications protocols. The process begins at step 2201, where upon insertion of the card 100G into the reader 300, protocol modules stored in a memory of the card 100G, and corresponding to the protocols for the new set top boxes, are down-loaded by the reader 300 into memory 1047 (i.e., RAM). The protocols are down-loaded by the reader 300 in accordance with the process 3911.

The process 2200 continues at the next step 2203, where the CPU 1045 of the reader 300 transmits a message to the set top box 601 upon selection of the user interface element 5501 labelled as 'Standard'. The message is transmitted in accordance with a protocol module stored in memory 1046, which is specified as the user interface card reader mode protocol by the card 100G. Then at step 2205, if a positive response is observed in response to the transmission then the process 2200 proceeds to step 2207. Otherwise, the process 2200 concludes and can be repeated with another card 100 and/or reader 300.

The process 2200 continues at step 2207, where the CPU 1045 of the reader 300 transmits a message to the set top box 601 upon selection of the user interface element 5505 labelled as 'Remote Ctrl'. The message is transmitted in accordance with a protocol module stored in memory 1046, which is specified as the remote control mode protocol by the card 100G. Then at step 2209, if a positive response is observed in response to the transmission then the process 2200 proceeds to step 2211. Otherwise, the process 2200 concludes and can be repeated with another card 100 and/or reader 300.

The process 2200 continues at step 2211, where the CPU 1045 of the reader 300 transmits a message to the set top box 601 upon selection of the user interface element 5503 labelled as 'Keyboard'. The message is transmitted in accordance with a protocol module stored in memory 1046, which is specified as the keyboard protocol by the card 100G. Then at step 2213, if a positive response is observed in response to the transmission then the process 2200 proceeds to step 2215. Otherwise, the process 2200 concludes and can be repeated with another card 100 and/or reader 300.

The process 2200 continues at step 2215, where the CPU 1045 of the reader 300 transmits a message to the set top box 601 upon selection of the user interface element 5503 labelled as 'Mouse'. The message is transmitted in accordance with a protocol module stored in memory 1046, which is specified as the mouse protocol by the card 100G. Then at step 2217, if a positive response is observed in response to the transmission then the reader 300 can be certified as 'reconfigured OK' by the technician, at the next step 2219, and the process 2200 concludes. Otherwise, the process 2200 concludes and can be repeated with another card 100 and/or reader 300.

8.4 Use of Existing Input Methods

Example 4

Figure 56:
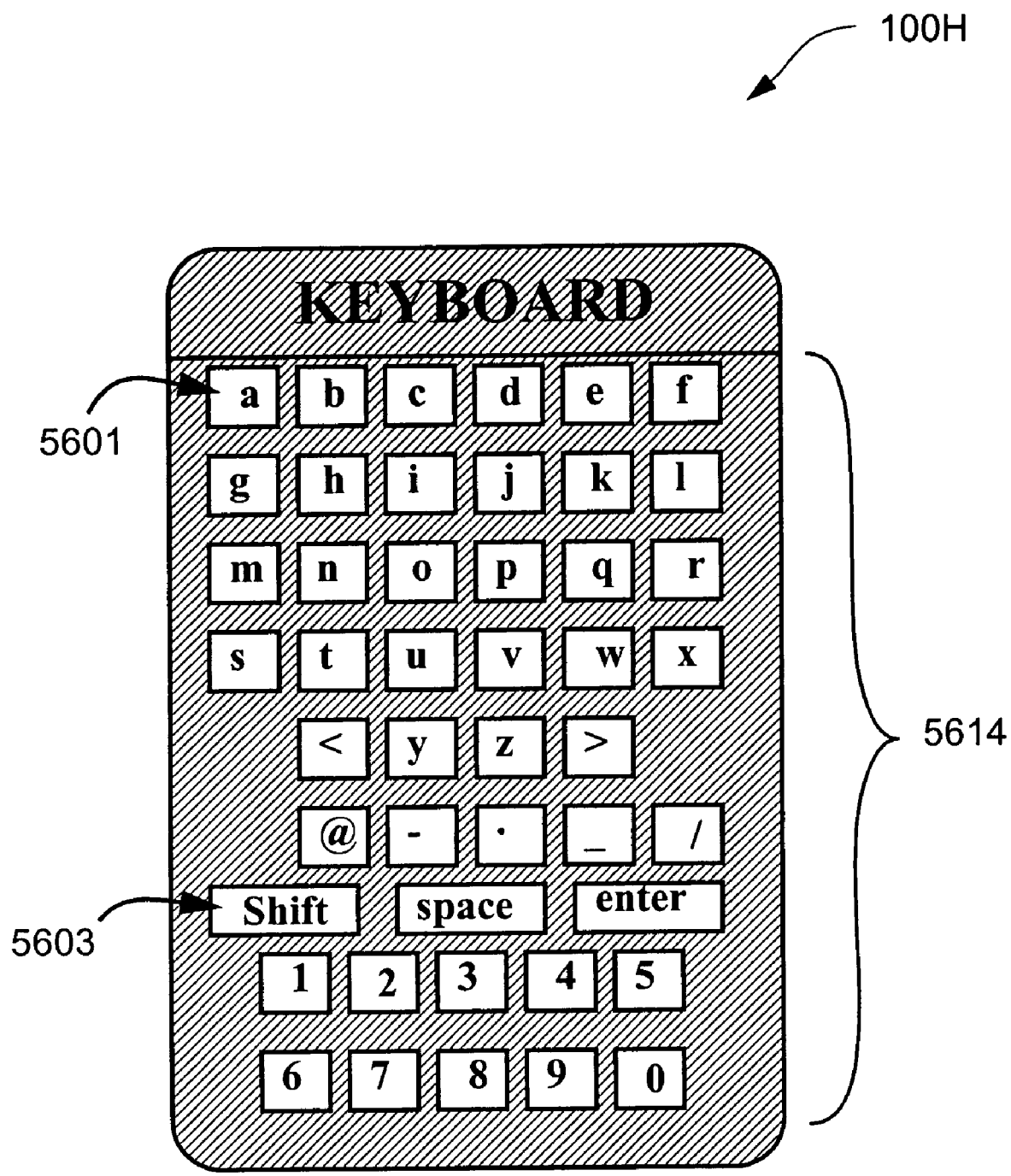
FIG. 56 shows the front face of a smart card configured for use as a wireless keyboard.

In another example, the system 600B including the set-top box 601 may have several possible applications. One of these applications is an e-mail software program, which is designed to accept input from a standard wireless keyboard as known to those in the relevant art. In order to accept user interface card specific input from the reader 300, such an e-mail application would need to be modified, which would require the application to go through the normal process of design, implementation and testing. However, the reader 300 is capable of sending existing keyboard codes already supported by the set top box 601, using a card such as the card 100H as shown in FIG. 56, and can circumvent such a design, implementation and testing process.

The card 100H is configured for sending keyboard codes to the set top box 601. A card data object stored in a memory of the card 100H contains a card-specific Change Non-Global Protocol sub-object, which indicates that a default protocol is to be used in keyboard mode. The card 100H includes user interface elements 5614, which are labeled with alphabetic characters, numbers and functions emulating a typical alpha/numeric keyboard. Each of the user interface elements 5614 of the card 100H includes one or more user interface objects stored in a memory of the card 100H. Each of the user interface objects stored on the card 100H includes data corresponding to an existing keyboard code. For example, the user interface element 5601 of the card 100H has a user interface object stored in the memory of the card 100H. The user interface object includes the coordinates of the user interface element 5601 and a generic code representing the letter 'a'. A code representing the letter 'a' can be transmitted by the reader 300 to the set top box 601 if the user interface element 5601 is selected by a user. As another example, the card 100H can include a user interface element 5603, labeled as 'shift'. A code representing a shift function can be transmitted by the reader 300 to the set top box 601, upon the user interface element 5603 being selected by a user, in order to shift a cursor (not shown) on the screen of the television 616, for example. Similarly, the other user interface elements 5614 have associated user interface element objects, stored in memory of the card 100H and can contain a communications code (e.g. ASCII) for the letters or symbols printed on the user interface element.

In this example, if a protocol currently defined as the global keyboard protocol for the system 600B, specifies non-generic key codes for one or more user interface elements 5614, then a mapping table can be defined within the protocol module for the particular global keyboard protocol. Such a mapping table can be used by the protocol module to map from a generic code to a protocol-specific code corresponding to the global keyboard protocol. For example, upon selection of the user interface element 5601, the CPU 1045 can match the generic code representing the letter 'a', using the mapping table, to determine a correct code corresponding to the particular global keyboard protocol. The protocol-specific key code, representing the letter 'a' can then be transmitted in place of the generic code.

Using a mapping table described above, a generic keyboard card, such as the card 100H, can be used with many different keyboard protocols, even though many of these protocols may use different values to represent the same key (e.g. the letter 'a' user interface element 5601).

8.5 A Combined Television and Set Top Box/Video Cassette Recorder (VCR) Controller Set top boxes and VCRs are typically sold independently of an associated television (e.g. the audio visual output device 616) that the set top box and VCR are used in conjunction with. As described in the Background section of this specification, set top boxes, VCRs and TVs are typically sold with individual remote control devices. A typical session using a set top box or VCR would require use of each of these remote control devices.

The following sequence shows a typical session for using a TV and VCR:
 (i) TV: Switch on;
 (ii) TV: Switch to VCR mode;
 (iii) VCR: Select channel to record;
 (iv) VCR: Rewind tape;
 (v) VCR: Begin recording;
 (vi) TV: Switch to another channel while VCR is recording;
 (vii) TV: Switch to VCR mode when show being recorded is finished;
 (viii) VCR: Stop tape; and
 (ix) TV: Switch off.

Each of the above functions (i) to (ix) requires a user to make a selection on the remote control device for the TV or the VCR, which may require the user to continually juggle such remote control devices to make the selections.

Figure 57:
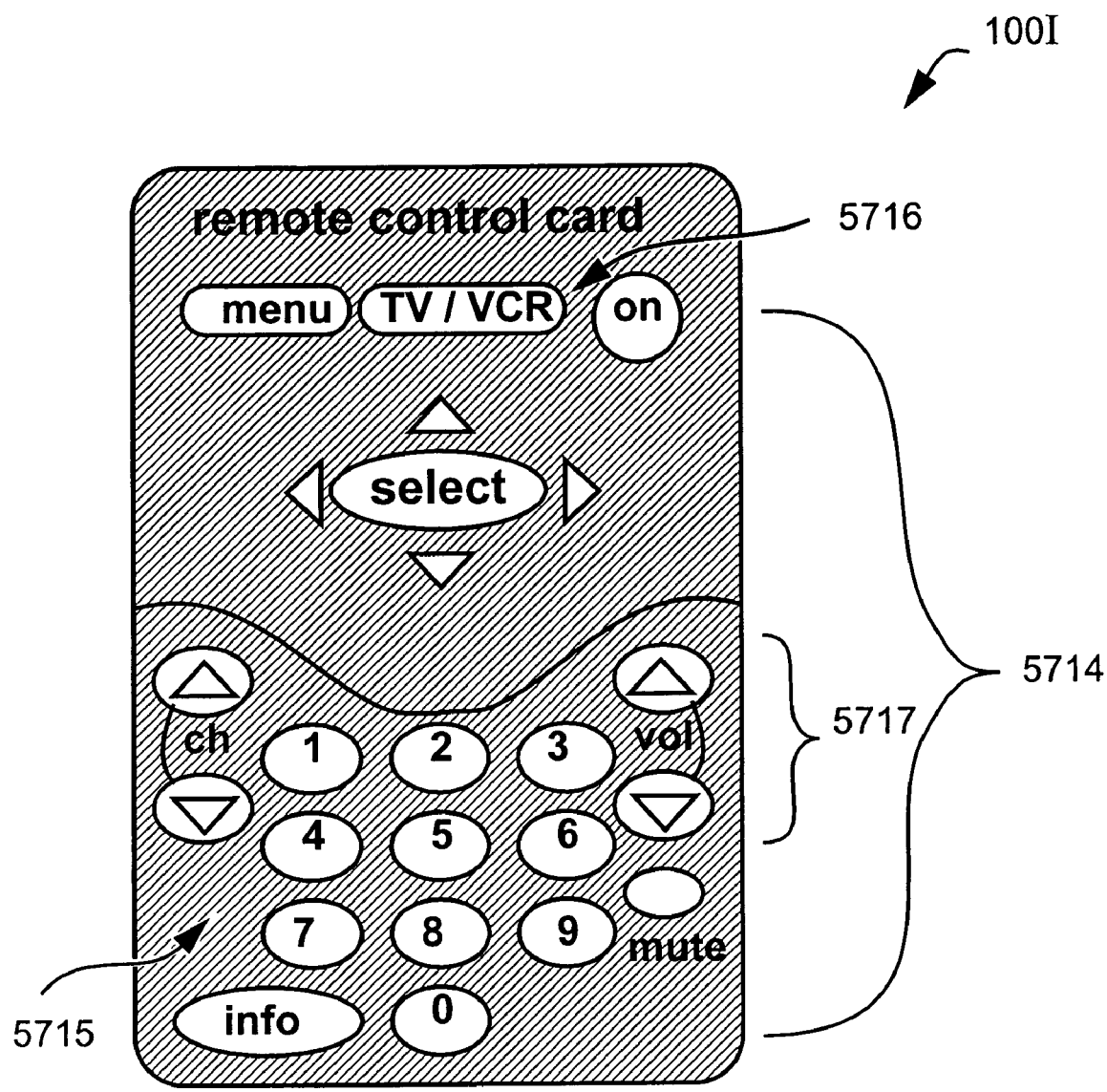
FIG. 57 shows the front face of a smart card configured for use as a universal remote control device.

FIG. 57 shows a card 1001 configured for supporting the most frequently used commands used by both a TV and a VCR. The card 1001 is similar to the cards described above and includes user interface elements 5714, which are labeled with alphabetic characters, numbers and symbols emulating the keys of a typical TV and VCR remote control device. Each of the user interface elements 5714 of the card 100I includes a user interface object stored in a memory of the card 1001. Each of the user interface objects stored on the card 1001 includes data corresponding to an existing code representing the alphabetic characters, numbers and functions of a typical VCR and TV. Once a reader 300 has been configured to use the protocols of the TV and VCR, for example, using the card 100E described above, the card 1001 can be used with the reader 300 to prevent the need for switching conventional remote control devices constantly to perform these and similar tasks.

Certain keys, such as the number keys 5715, may be recognised in different ways by both a TV and a VCR. In order to enable such keys 5715 to be used easily for either appliance, a user interface element 5716 labeled as "TV/VCR" can be configured to toggle the default protocol for the reader 300 between the protocol used by the particular TV and VCR. Such toggling can be implemented by storing a Change Non-Global Protocol sub-object on the card 100H and associating the sub-object with the user interface element 5716. The change non-global protocol sub-object can be configured to toggle the card specific protocol of the card 100H.

In contrast, the user interface elements of the card 100H which are configured as appliance specific keys (e.g. the user interface elements 5717 configured as volume keys) can be configured to always use the protocol of the television. The elements 5717 can be associated with a Change Non-Global Protocol sub-object stored on the card 100H, where the sub-object is configured with 'one button only' effectiveness.

8.6 Multi-Player Gaming

In a multi-player gaming example, two or more card readers (not shown) similar to the reader 300 can be used simultaneously. Each reader must be able to uniquely identify itself to a computer (e.g., the computer 700) of a system such as the system 600A so that no transmission interference occurs between the readers whilst playing a game on the computer 700. In this example, the user of each reader is able to select their own identifier by choosing a color.

Figure 19:
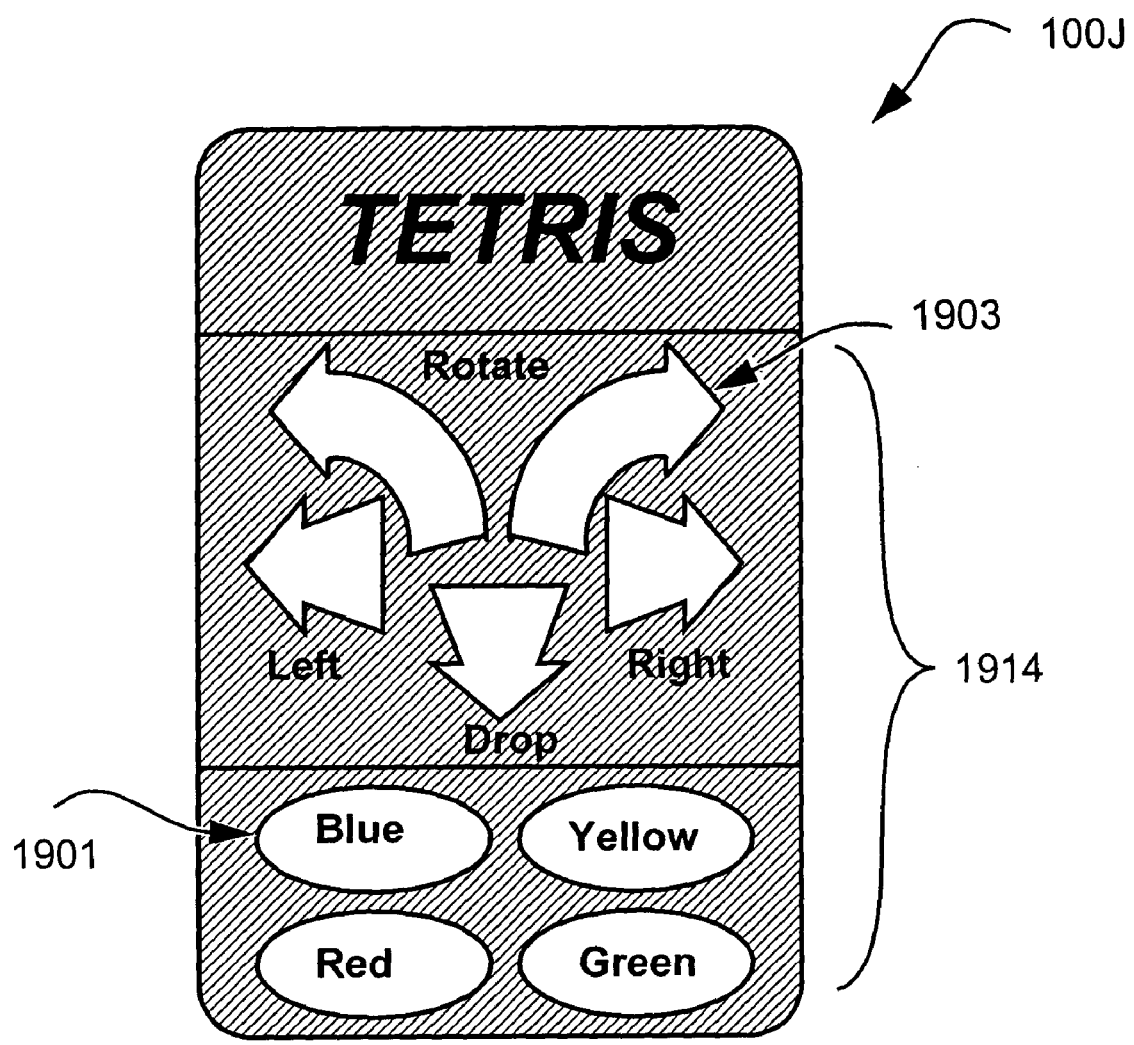
FIG. 19 shows the front face of a smart card configured for use in playing a computer game.

FIG. 19 shows a card 100J which is configured to play a popular computer/arcade game called 'Tetris'. The card 100J includes user interface elements 1914. Five of the user interface elements (e.g. the user interface element 1903) are labeled with symbols representing functions performed during the game (e.g. rotating a graphical object clockwise in the case of the element 1903). Further, four of the user interface elements (e.g. the element 1901) are labeled with colors. Each of the color user interface elements have associated user interface element objects stored on the card 100J including data representing one of the colors blue, red, yellow and green. Therefore, a user of the card 100J can select one of the colors as identifying the particular user. For example, if a user selects the user interface element 1901 using the reader 300, then the CPU 1045 of the reader 300 matches the coordinates of the element 1901 with a corresponding object stored on the card 100J. In this example, the corresponding object includes a Change User Identifier sub-object which contains a value corresponding to the colour blue. The value for the colour blue can be subsequently used as the reader identifier included in the headers (e.g. the header 1100) of all outgoing reader application protocol messages. Such an identifer can also be used within designated areas of lower-level packets sent by a protocol module. For each subsequent transmission of a message from the reader 300 to the computer 700, the data corresponding to the matched object and representing the color blue, is included in a sub-object transmitted with the message. The processor 705 of the computer 601 reads the transmitted sub-object and recognizes the message as originating from the card 100J. Any function data also transmitted with the message is read by the processor 1005 and a corresponding function can result in the Tetris game application executing on the computer 700, performing a function for the particular user.

The foregoing describes only some embodiments of the present invention, and modifications and/or changes can be made thereto without departing from the scope and spirit of the invention, the embodiments being illustrative and not restrictive. For example, the user interface elements 114, 154 can be positioned otherwise than on the smart card 100. The user interface elements 114, 154 may, for example, be displayed on a display device (e.g. 616). Further, the embodiments described above, and in particular the cards 100 of the example section, have largely been described with reference to memory cards such as the card 100A. However, a person skilled in the relevant art would appreciate that the cards 100 (including the cards 100F, 100G, 100H, 100I and 100J) can be implemented using a CPU card similar to the CPU card 100B of FIG. 2(b). User identifiers can represent any features that distinguish one user from another, such as numbers, colours, characters, teams, vechicles etc.

8.7 Set-Top Box Unable to Process Reader Application Protocol Messages

The system 600B as described in the example of section 1.7 above, can be modified in order to avoid sending reader application protocol messages (e.g. INSERT, REMOVE, BAD CARD, PRESS, RELEASE, MOVE, LOW BATT) when the set-top box 601 is not configured to process such messages. In this instance, each of the user interface elements 1414 of the card 100C can be mapped to a single keyboard key-stroke, which the CPU 805 of the set-top box 601 can be configured to recognise and interpret as the relevant command corresponding to a particular reader application protocol message. For example, the two-way directional controller user interface elements 1413 can be mapped to "up" and "down" cursor keys available on a keyboard such as the keyboard 704.

Those user interface elements of the card 100C that do not have an equivalent keyboard key (and associated code) can be mapped to a key unused in any other context by a particular application, for example, executing on the computer 700. As an example of such mapping, the "stop" button 1407 can be mapped to the "S" key of the keyboard 704.

In order to implement the mapping described above, the card 100C can contain a card data object stored thereon. In this instance, the card data object includes a Change Non-Global Protocol sub-object instructing the reader 300 to use the global keyboard protocol, where the user interface elements would contain generic key codes as defined by a provider of the card 100C.

The above example shows that, by emulating key codes, the reader 300 can be used with an unrelated set-top box that is not necessarily configured to recognise the reader 300. Further, such a card 100C and reader 300 can also be used to control other software applications that normally rely on keyboard input to scroll through menus and make certain selections.

In the context of this specification, the word "comprising" means "including principally but not necessarily solely" or "having" or "including" and not "consisting only of". Variations of the word comprising, such as "comprise" and "comprises" have corresponding meanings.

The claims defining the invention are as follows:

1. A remote control device for communicating transmission data, according to one of a plurality of communications protocols, to at least one of a plurality of predetermined apparatuses, said remote control device being initially configured to communicate said transmission data according to a first one of said communications protocols, said remote control device, comprising:
   a receiving means for receiving at least one portion of protocol data and an associated format function, from a second device, said portion of the protocol data describing properties of a second one of said communications protocols for communicating said transmission data with one or more of said plurality of predetermined apparatuses, said second communications protocol being substantially different from said first communications protocol; and
   a central processing unit for executing said format function so that the format function transforms at least a portion of said transmission data into a bit stream, using the properties of said second communications protocol defined by the portion of the protocol data, for communication of said bit stream to said at least one apparatus according to said second communications protocol.

2. A remote control device according to claim 1, wherein said bit stream comprising said transmission data is communicated to said at least one apparatus via a wireless communication link.

3. A remote control device according to claim 1, wherein said protocol data and said format function are configured for independent use in a further device.

4. A remote control device according to claim 1, wherein said second communications protocol is utilized by said remote control device for a specified period.

5. A remote control device according to claim 1, wherein said second communications protocol is utilized by said remote control device until further protocol data and a format function associated with said further protocol data is selected by said central processing device.

6. A remote control device according to claim 1, wherein said first and second communications protocols are infrared communication protocols.

7. A remote control device according to claim 1, wherein said remote control device is hard wired to one of said plurality of predetermined apparatuses.

8. A remote control device according to claim 1, wherein firmware of said remote control device accesses said portion of the protocol data and cooperates with said format function to communicate said bit stream comprising said transmission data.

9. A remote control device according to claim 8, wherein said firmware of said remote control device is configured according to one of a plurality of software architectures depending on a particular application of said device.

10. A remote control device according to claim 1, wherein said format function corresponds to one of four device modes.

11. A remote control device according to claim 10, wherein one of the four device modes is a remote control mode.

12. A remote control device according to claim 10, wherein one of the four device modes is a keyboard mode.

13. A remote control device according to claim 10, wherein one of the four device modes is a mouse mode.

14. A remote control device according to claim 10, wherein one of the four device modes is a user interface card reader mode.

15. A remote control device according to claim 1, wherein said second device is a control card, said control card comprising a memory with at least said portion of the protocol data and/or said format function stored therein.

16. A remote control device according to claim 15, further comprising a substantially transparent touch sensitive membrane arranged to overlay said card when said card is inserted into said remote control device.

17. A remote control device according to claim 16, wherein said central processing unit is configured for accepting specific data related to a selection of at least one of said indicia using said membrane.

18. A remote control device according to claim 15, wherein said control card has indicia formed thereon and is configured for insertion into said remote control device.

19. A remote control device according to claim 18, wherein said indicia of said interface card forms a keyboard.

20. A remote control device according to claim 18, wherein said remote control device further comprises an array stored thereon, said array being configured to map communication codes associated with one or more of said indicia to one or more of said protocols.

21. A method of communicating transmission data, according to one of a plurality of communications protocols, from a remote control device to at least one of a plurality of predetermined apparatuses, said remote control device being initially configured to communicate said transmission data according to a first one of said communications protocols, said method comprising the steps of:
   receiving at least one portion of protocol data and an associated format function from a second device, said portion of the protocol data describing properties of a second one of said communications protocols for communicating said transmission data with one or more of said plurality of predetermined apparatuses,
   said second communications protocol being substantially different from said first communications protocol;
   executing said format function using a processor of said remote control device, said format function being configured to transform at least a portion of said transmission data into a bit stream, using the properties of said second communications protocol defined by the portion of the protocol data; and
   communicating said bit stream to said at least one other apparatus according to said second communications protocol.

22. A method of configuring a remote control device for communicating transmission data, according to one of a plurality of communications protocols, to at least one of a plurality of predetermined apparatuses, said remote control device being initially configured to communicate said transmission data according to a first one of said communications protocols, said remote control device being configured to accept an interface card, said interface card having indicia formed thereon and a memory configured adjacent said indicia, said memory having at least a portion of protocol data and an associated format function stored therein, said portion of the protocol data describing properties of a second one of said communications protocols for communicating said transmission data with one or more of said predetermined apparatuses, said second communications protocol being substantially different from said first communications protocol, said method comprising the steps of:

providing said interface card to a user for insertion into said remote control device, wherein a processor of said remote control device is configured to perform the following steps:

determining specific data related to a selection of at least one of said indicia;

selecting said portion of the protocol data and said format function depending on said specific data; and executing said format function so that the format function transforms at least a portion of said transmission data into a bit stream, using the properties of said second communications protocol defined by said portion of the protocol data, for communication of said bit stream to said at least one predetermined apparatus according to said second communications protocol.

* * * * *

UNITED STATES PATENT AND TRADEMARK OFFICE
CERTIFICATE OF CORRECTION

PATENT NO. : 7,259,710 B2
APPLICATION NO. : 10/635491
DATED : August 21, 2007
INVENTOR(S) : Kisliakov It is certified that error appears in the above-identified patent and that said Letters Patent is hereby corrected as shown below:

DRAWINGS:
Sheet, 9, FIG. 9, at step 913, "'INSERT'." should read -- 'INSERT', --.

COLUMN 1:
Line 38, "modulation," should read -- modulation', --.

COLUMN 3:
Line 67, "suitable" should read -- suitably --.

COLUMN 7:
Line 2, "protocols" should read -- protocol --; and
Line 14, "device device," should read -- device, --.

COLUMN 10:
Line 6, "and" should be deleted; and
Line 8, "FIG.6(b)." should read -- FIG.6(b); --.

COLUMN 13:
Line 39, "Cards." should read -- Cards'. --.

COLUMN 14:
Line 48, "can any" should read -- can --.

COLUMN 22:
Table 5, "Description)" should read -- Description --.

COLUMN 23:
Table 6, "X value of the bottom-right hand corner co-ordinates" should read -- X value of the bottom-right-hand corner co-ordinate --.

COLUMN 28:
Table 11, "ScrollLock The Scroll Lock function is currently active 0x0008" (second occurrence) should be deleted.

UNITED STATES PATENT AND TRADEMARK OFFICE
CERTIFICATE OF CORRECTION

PATENT NO. : 7,259,710 B2
APPLICATION NO. : 10/635491
DATED : August 21, 2007
INVENTOR(S) : Kisliakov It is certified that error appears in the above-identified patent and that said Letters Patent is hereby corrected as shown below:

COLUMN 31:
Table 12, "(e.g., the settop" should read -- (e.g., the set-top --.

COLUMN 33:
Line 59, "a" should read -- as --.

COLUMN 38:
Line 58, "unambiguous" should read -- unambiguous. --.

COLUMN 39:
Line 12, "describe" should read -- described --.

COLUMN 42:
Table 18-continued, "Keymap Table A pointer to an lookup" should read -- Keymap Table A pointer to a lookup --.

COLUMN 44:
Line 59, "long" should read -- long. --.

COLUMN 46:
Line 15, "modeis" should read -- mode is --.

COLUMN 47:
Line 48, "te" should read -- the --.

COLUMN 49:
Line 46, "7.0 Fireware Routines" should read -- 7.0 Firmware Routines --.

COLUMN 51:
Line 6, "te" should read -- the --;
Line 26, "FIG.38" should read -- FIG. 38. --; and
Line 57, "proceeds" should read -- proceeds to --.

COLUMN 52:
Line 53, "12C" should read -- I2C --; and
Line 64, "that" should be deleted.

UNITED STATES PATENT AND TRADEMARK OFFICE
CERTIFICATE OF CORRECTION

PATENT NO. : 7,259,710 B2 Page 3 of 3
APPLICATION NO. : 10/635491
DATED : August 21, 2007
INVENTOR(S) : Kisliakov It is certified that error appears in the above-identified patent and that said Letters Patent is hereby corrected as shown below:

COLUMN 53:
Lines 59-60, "Background Move" should read -- Background-Move --.

COLUMN 56:
Lines 13, "[4," should read -- (4, --.

COLUMN 60:
Line 24, "will" should read -- will be --;
Line 24, "FIG. 9" should read -- FIG. 9. --;
Line 25, ".The" should read -- The --; and
Line 28, "FIG. 49" should read -- FIG. 49. --.

COLUMN 64:
Line 28, "the," should read -- the --.

COLUMN 69:
Line 13, "1001." should read -- 100I. --;
Line 14, "1001" should read -- 100I. --; and
Line 19, "1001" should read -- 100I. --.

Signed and Sealed this

Twenty-sixth Day of August, 2008

JON W. DUDAS
*Director of the United States Patent and Trademark Office*